(12) United States Patent
Takahashi

(10) Patent No.: US 11,641,027 B2
(45) Date of Patent: May 2, 2023

(54) SECONDARY BATTERY SYSTEM AND METHOD OF ESTIMATING AN INTERNAL STATE OF SECONDARY BATTERY

(71) Applicant: Toyota Jidosha Kabushiki Kaisha, Toyota (JP)

(72) Inventor: Kenji Takahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 723 days.

(21) Appl. No.: 16/568,969

(22) Filed: Sep. 12, 2019

(65) Prior Publication Data
US 2020/0091567 A1 Mar. 19, 2020

(30) Foreign Application Priority Data

Sep. 14, 2018 (JP) .............................. JP2018-172614
Aug. 6, 2019 (JP) .............................. JP2019-144603

(51) Int. Cl.
*H01M 10/48* (2006.01)
*H01M 10/0525* (2010.01)

(52) U.S. Cl.
CPC ....... *H01M 10/0525* (2013.01); *H01M 10/48* (2013.01); *H01M 10/482* (2013.01)

(58) Field of Classification Search
CPC ............. H01M 10/48; H01M 10/0525; H01M 10/482; H01M 10/052; H01M 10/44;
(Continued)

(56) References Cited

U.S. PATENT DOCUMENTS

| 2010/0033132 A1 | 2/2010 | Nishi et al. |
| 2011/0127958 A1 | 6/2011 | Ishishita et al. |

(Continued)

FOREIGN PATENT DOCUMENTS

| EP | 2746796 A1 | 6/2014 |
| JO | 2019106285 A | 6/2019 |

(Continued)

OTHER PUBLICATIONS

Dash et al. "Theoretical Limits of Energy Density in Silicon-Carbon Composite Anode Based Lithium Ion Batteries." Nature: Scientific Reports, 6:27449, Jun. 2016 (Year: 2016).*

(Continued)

*Primary Examiner* — Michael L Dignan
(74) *Attorney, Agent, or Firm* — Dinsmore & Shohl LLP

(57) ABSTRACT

A secondary battery system includes a secondary battery having a positive electrode including a positive electrode active substance and a negative electrode including first and second negative electrode active substances, and a control device that estimates an internal state of the secondary battery based on an active substance model of the secondary battery. The control device calculates a charge carrier amount in the first negative electrode active substance based on a first active substance model, under a condition that the first and second negative electrode active substances are at the same potential, calculates an amount of change in open circuit potential of the first negative electrode active substance based on surface stress of the first negative electrode active substance, and calculates an open circuit potential of the negative electrode from the open circuit potential and the amount of change in open circuit potential of the first negative electrode active substance.

8 Claims, 21 Drawing Sheets

(58) Field of Classification Search
CPC ........... H01M 10/425; H01M 10/4207; H01M 10/4257; H01M 10/4285; H01M 10/42; Y02E 60/10; Y02T 10/70; B60L 3/12; B60L 58/10; G01R 31/36; H02J 7/00
See application file for complete search history.

(56) References Cited

U.S. PATENT DOCUMENTS

| | | | | |
|---|---|---|---|---|
| 2014/0159736 | A1* | 6/2014 | Morimoto | H01M 10/48 324/426 |
| 2015/0253389 | A1* | 9/2015 | Arai | G01R 31/3828 324/427 |
| 2015/0355285 | A1 | 12/2015 | Nishigaki et al. | |
| 2018/0313905 | A1* | 11/2018 | Takahashi | G01R 31/3842 |
| 2018/0313906 | A1 | 11/2018 | Takahashi et al. | |
| 2019/0178944 | A1* | 6/2019 | Rango | H02J 7/0029 |
| 2019/0181510 | A1 | 6/2019 | Takahashi | |

FOREIGN PATENT DOCUMENTS

| | | |
|---|---|---|
| JP | 2014139521 A | 7/2014 |
| JP | 2015166710 A | 9/2015 |
| JP | 2015167127 A | 9/2015 |
| JP | 2018185259 A | 11/2018 |
| JP | 2019106285 A | 6/2019 |
| WO | 2010005079 A1 | 1/2010 |

OTHER PUBLICATIONS

Bartlett et al. "Electrochemical Model-Based State of Charge and Capacity Estimation for a Composite Electrode Lithium-Ion Battery." IEEE Transactions on Control Systems Technology, vol. 24, No. 2, Mar. 2016 (Year: 2016).*

Zheng et al. "Analytical Model on Stress-Regulated Lithiation Kinetics and Fracture of Si—C Yolk-Shell Anodes for Lithium-Ion Batteries." Journal of the Electrochemical Society, 163, (6) A940-A946 (2016) (Year: 2016).*

"In Situ Measurements of Stress-Potential Coupling in Lithiated Silicon", V.A. Sethuraman, V. Srinivasan, A.F. Bower, and P.R. Guduru. Journal of The Electrochemical Society, 157 (11) A1253-A1261 (2010).

* cited by examiner

FIG. 7A

| SYMBOL | UNIT | ITEM |
|---|---|---|
| $U_1$ | V | OPEN CIRCUIT POTENTIAL (OCP) OF POSITIVE ELECTRODE PARTICLE |
| $U_2$ | V | OPEN CIRCUIT POTENTIAL (OCP) OF MIXED NEGATIVE ELECTRODE PARTICLE |
| $U_{Si}$ | V | OPEN CIRCUIT POTENTIAL (OCP) OF SILICON PARTICLE |
| $U_{gra}$ | V | OPEN CIRCUIT POTENTIAL (OCP) OF GRAPHITE PARTICLE |
| $\Delta V_{stress}$ | V | AMOUNT OF CHANGE IN OPEN CIRCUIT POTENTIAL OF SILICON PARTICLE DUE TO SURFACE STRESS |
| $\Delta V_{Si\_sta}$ | V | OPEN CIRCUIT POTENTIAL OF SILICON PARTICLE IN CASE WHERE SURFACE STRESS IS ZERO |
| $V_1$ | V | POSITIVE ELECTRODE POTENTIAL |
| $V_2$ | V | NEGATIVE ELECTRODE POTENTIAL |
| $\Delta V_e$ | V | SALT CONCENTRATION OVERVOLTAGE |
| $\eta_i$ | V | REACTION OVERVOLTAGE (+: Li DESORPTION, −: Li INSERTION) |
| $c_{s,i}$ | mol/cm$^3$ | LITHIUM CONCENTRATION IN ACTIVE SUBSTANCE |
| $\theta_i$ | − | LOCAL LITHIUM AMOUNT (= LITHIUM CONCENTRATION/LIMIT LITHIUM CONCENTRATION) |
| $\theta_{i\_surf}$ | − | LOCAL LITHIUM AMOUNT ON ACTIVE SUBSTANCE SURFACE |
| $\theta_{i\_ave}$ | − | AVERAGE LITHIUM AMOUNT IN ACTIVE SUBSTANCE |
| $\theta_{1\_fix}$ | − | POSITIVE ELECTRODE-NEGATIVE ELECTRODE LOCAL LITHIUM AMOUNT CORRESPONDENCE POINT (POSITIVE ELECTRODE SIDE) |
| $\theta_{2\_fix}$ | − | POSITIVE ELECTRODE-NEGATIVE ELECTRODE LOCAL LITHIUM AMOUNT CORRESPONDENCE POINT (NEGATIVE ELECTRODE SIDE) |
| $\theta_{rate}$ | − | RATIO (CAPACITY RATIO) OF CAPACITY OF POSITIVE ELECTRODE TO CAPACITY OF NEGATIVE ELECTRODE |
| $I_T$ | A/cm$^2$ | TOTAL CURRENT (+: DISCHARGE, −: CHARGE) |
| $I_i$ | A/cm$^2$ | CURRENT FLOWING IN SILICON PARTICLE OR GRAPHITE PARTICLE |
| $\sigma_{surf}$ | Pa | STRESS APPLIED TO SURFACE OF SiO (+: TENSILE, −: COMPRESSIVE) |
| $\sigma_{com}$ | Pa | STRESS WHEN SiO IS YIELDED (AT COMPRESSION) |
| $\sigma_{ten}$ | Pa | STRESS WHEN SiO IS YIELDED (AT TENSION) |

FIG. 7B

| SYMBOL | UNIT | ITEM |
|---|---|---|
| $\Omega$ | $cm^3/mol$ | CHANGE IN VOLUME OF SiO PER 1 mol LITHIUM |
| $\alpha$ | $Pa/(mol/cm^3)$ | PROPORTIONAL CONSTANT |
| $R_d$ | $\Omega\, cm^3$ | DIRECT-CURRENT RESISTANCE |
| $\Delta c_e$ | $mol/cm^3$ | POSITIVE ELECTRODE-NEGATIVE ELECTRODE SALT CONCENTRATION DIFFERENCE |
| $\alpha_e$ | - | COEFFICIENT OF SALT CONCENTRATION DIFFUSION EQUATION |
| $\beta$ | - | COEFFICIENT OF SALT CONCENTRATION DIFFUSION EQUATION |
| $i_{0i}$ | $A/cm^2$ | EXCHANGE CURRENT DENSITY |
| $a_s$ | - | ACTIVE SUBSTANCE SPECIFIC SURFACE AREA |
| $L_i$ | cm | ELECTRODE THICKNESS |
| $\beta_i$ | - | BUTLER-VOLMER CORRECTION COEFFICIENT |
| $c_{Si,max}$ | $mol/cm^3$ | LIMIT LITHIUM CONCENTRATION OF SILICON PARTICLE (CAPACITY WHEN $\theta_{Si}$ is 0 TO 1) |
| $c_{gra,max}$ | $mol/cm^3$ | LIMIT LITHIUM CONCENTRATION OF GRAPHITE PARTICLE (CAPACITY WHEN $\theta_{gra}$ is 0 TO 1) |
| $c_{i\_SOC0}$ | $mol/cm^3$ | LITHIUM CONCENTRATION CORRESPONDING TO SOC = 0% |
| $c_{i\_SOC100}$ | $mol/cm^3$ | LITHIUM CONCENTRATION CORRESPONDING TO SOC = 100% |
| F | C/mol | FARADAY CONSTANT |
| R | $J/(mol\cdot K)$ | GAS CONSTANT |

FIG. 8

| SYMBOL | ITEM |
|---|---|
| 1 | PARAMETER OF POSITIVE ELECTRODE PARTICLE |
| Si | PARAMETER OF SILICON PARTICLE |
| gra | PARAMETER OF GRAPHITE PARTICLE |
| 2 | PARAMETER OF MIXED NEGATIVE ELECTRODE PARTICLE |
| surf | VALUE ON ACTIVE SUBSTANCE SURFACE |
| ave | AVERAGE VALUE IN ACTIVE SUBSTANCE |

# SECONDARY BATTERY SYSTEM AND METHOD OF ESTIMATING AN INTERNAL STATE OF SECONDARY BATTERY

CROSS REFERENCE TO RELATED APPLICATION

This application claims priority to Japanese Patent Application No. 2018-172614 filed on Sep. 14, 2018, incorporated herein by reference in its entirety.

BACKGROUND

1. Technical Field

The present disclosure relates to a secondary battery system and a method of estimating an internal state of a secondary battery.

2. Description of Related Art

An electrified vehicle (for example, a hybrid vehicle, an electric vehicle, or the like) mounted with a secondary battery has become widespread. In the secondary battery, there is a system in which a "charging curve" as a state of charge (SOC)-open circuit voltage (OCV) curve to be obtained in charging the secondary battery from a completely discharged state and a "discharging curve" as an SOC-OCV curve to be obtained in discharging the secondary battery from a fully charged state markedly deviate from each other. In a case where the charging curve and the discharging curve deviate from each other in this way, it is said that there is a "hysteresis" in the secondary battery. For example, Japanese Unexamined Patent Application Publication No. 2015-166710 (JP 2015-166710 A) discloses a technique that estimates an SOC from an OCV taking into consideration a hysteresis of the secondary battery.

SUMMARY

In the present disclosure, an internal state of the secondary battery is estimated. The estimation of the internal state of the secondary battery includes calculation of various potential components, such as a positive electrode open circuit potential, a positive electrode potential, a negative electrode open circuit potential, and a negative electrode potential of the secondary battery. For example, an OCV of the secondary battery can be calculated from the positive electrode open circuit potential and the negative electrode open circuit potential of the secondary battery and an SOC of the secondary battery can be estimated from the calculated OCV. In a case where the positive electrode potential of the secondary battery becomes lower than a predetermined lower limit potential or becomes higher than a predetermined upper limit potential, a side reaction in a positive electrode is induced, and the positive electrode may be deteriorated. Similarly, in a case where the negative electrode potential is outside a predetermined potential range, the negative electrode may be deteriorated. Thus, calculation accuracy of a single electrode potential (the positive electrode potential or the negative electrode potential) of the secondary battery is improved, whereby it is possible to suppress deterioration of the positive electrode and the negative electrode of the secondary battery.

In order to improve various characteristics of the secondary battery, a technique in which a negative electrode (a so-called composite negative electrode) including a plurality of negative electrode active substances is employed has been examined. For example, a negative electrode of a lithium-ion secondary battery disclosed in Japanese Unexamined Patent Application Publication No. 2015-167127 (JP 2015-167127 A) includes a carbon-based material (in more detail, a carbon-based material, such as nanocarbon or carbon nanotube) and a silicon-based material.

In the lithium-ion secondary battery, the negative electrode including the silicon-based material is employed, whereby it is possible to increase a full charge capacity compared to a case where a negative electrode not including a silicon-based material is employed. In a case the silicon-based material is included in the negative electrode, it is known that a hysteresis of an SOC-OCV curve increases compared to a case where a silicon-based material is not included in a negative electrode (for example, see Japanese Unexamined Patent Application Publication No. 2014-139521 (JP 2014-139521 A)).

In the estimation of the internal state of the secondary battery having the composite negative electrode, a case where an estimation method of an internal state of the related art is applied is considered. However, in the estimation method of the related art, since the hysteresis of the secondary battery is not taken into consideration, the estimation accuracy of the internal state of the secondary battery may be relatively lowered. For this reason, in the secondary battery having the composite negative electrode, it is desirable to estimate the internal state of the secondary battery taking into consideration the hysteresis.

The present disclosure provides a technique capable of improving estimation accuracy of an internal state of a secondary battery having a negative electrode including a plurality of negative electrode active substances.

A first aspect of the present disclosure relates to a secondary battery system. The secondary battery system includes a secondary battery and a control device. The secondary battery has a positive electrode and a negative electrode. The positive electrode includes a positive electrode active substance. The negative electrode includes first and second negative electrode active substances. The control device is configured to estimate an internal state of the secondary battery based on an active substance model of the secondary battery. An amount of change in volume of the first negative electrode active substance with change in charge carrier amount in the first negative electrode active substance is greater than an amount of change in volume of the second negative electrode active substance with change in charge carrier amount in the second negative electrode active substance. The control device is configured to, under a condition that the first negative electrode active substance and the second negative electrode active substance are at the same potential, calculate a charge carrier amount in the first negative electrode active substance based on a first active substance model. The control device is configured to calculate an amount of change in open circuit potential of the first negative electrode active substance based on surface stress of the first negative electrode active substance to be determined according to the charge carrier amount in the first negative electrode active substance. The control device is configured to calculate an open circuit potential of the negative electrode from the open circuit potential and the amount of change in open circuit potential of the first negative electrode active substance in a state in which surface stress is not generated in the first negative electrode active substance.

The amount of change in volume of the first negative electrode active substance with the change in charge carrier amount in the first negative electrode active substance (for example, a silicon-based material) is greater than the amount of change in volume of the second negative electrode active substance with the change in charge carrier amount in the second negative electrode active substance (for example, a carbon-based material). For this reason, the influence of a hysteresis in the first negative electrode active substance is greater than the influence of a hysteresis in the second negative electrode active substance. In view of this point, according to the first aspect, the charge carrier amount (for example, a lithium amount) in the first negative electrode active substance is calculated based on the first active substance model, and the charge carrier amount in the second negative electrode active substance is calculated based on the second active substance model. That is, since the charge carrier amount is calculated separately for each negative electrode active substance, it is possible to accurately reflect the influence of the hysteresis in an estimation result of the internal state of the secondary battery (details will be described below). Therefore, it is possible to improve the estimation accuracy of the internal state of the secondary battery.

In the secondary battery system according to the first aspect of the present disclosure, the control device may be configured to, under a condition that the first negative electrode active substance and the second negative electrode active substance are at the same potential, separately calculate a current flowing in the first negative electrode active substance and a current flowing in the second negative electrode active substance through convergence computation processing such that a predetermined convergence condition is established. The control device may be configured to calculate a concentration distribution of charge carriers in the first negative electrode active substance and the second negative electrode active substance by solving a diffusion equation under a boundary condition relating to the current flowing in the first negative electrode active substance and the second negative electrode active substance. The control device may be configured to calculate the charge carrier amount in the first negative electrode active substance and the second negative electrode active substance from the concentration distribution of the charge carriers in the first negative electrode active substance and the second negative electrode active substance.

The secondary battery system according to the first aspect of the present disclosure may further include a voltage sensor configured to detect a voltage between the positive electrode and the negative electrode. The control device may be configured to calculate a concentration distribution of charge carriers in the positive electrode active substance by solving a diffusion equation under a boundary condition relating to a current flowing in the positive electrode active substance. The control device may be configured to calculate a charge carrier amount in the positive electrode active substance from the concentration distribution of the charge carriers in the positive electrode active substance. The control device may be configured to calculate a potential of the positive electrode based on an open circuit potential of the positive electrode active substance to be determined according to the charge carrier amount in the positive electrode active substance. The control device may be configured to calculate a potential of the negative electrode based on the open circuit potential of the negative electrode. The control device may be configured to calculate the current flowing in the first negative electrode active substance with a condition that a potential difference between the potential of the positive electrode and the potential of the negative electrode coincides with the voltage detected by the voltage sensor as the convergence condition.

According to the first aspect, the current flowing in the first negative electrode active substance and the current flowing in the second negative electrode active substance are separately calculated. With this, the concentration distribution of the charge carriers in the first negative electrode active substance based on the diffusion equation under the boundary condition relating to the current flowing in the first negative electrode active substance and the concentration distribution of the charge carriers in the second negative electrode active substance based on the diffusion equation under the boundary condition relating to the current flowing in the second negative electrode active substance are obtained with higher accuracy. Since the internal state (an open circuit potential or surface stress) of the secondary battery is calculated based on the concentration distribution of the charge carriers (described below), according to the first aspect, it is possible to improve the estimation accuracy of the internal state of the secondary battery.

In the secondary battery system according to the first aspect of the present disclosure, the control device may be configured to divide the current flowing in the first negative electrode active substance into a reaction current involved in insertion and desorption of the charge carriers and a capacitor current uninvolved in insertion and desorption of the charge carriers, and calculate a reaction overvoltage of the first negative electrode active substance by substituting the reaction current in a Butler-Volmer's relational expression. The control device may be configured to calculate the potential of the negative electrode from the open circuit potential of the negative electrode and the reaction overvoltage of the first negative electrode active substance.

According to the first aspect, the influence of an electric double layer to be formed on an active substance surface is taken into consideration, and the reaction overvoltage of the first negative electrode active substance is calculated based on the reaction current as a current component involved in the insertion and desorption of the charge carriers. The capacitor current uninvolved in the insertion and desorption of the charge carriers is removed, whereby the calculation accuracy of the reaction overvoltage is improved. For this reason, it is possible to improve calculation accuracy of a negative electrode potential (=a negative electrode open circuit potential+the reaction overvoltage).

In the secondary battery system according to the first aspect of the present disclosure, the control device may be configured to calculate a total amount of charge carriers in the first and second negative electrode active substances from a charge carrier amount in the positive electrode active substance according to a relational expression in which a relationship to be established between the charge carrier amount in the positive electrode active substance and the total amount of the charge carriers in the first and second negative electrode active substances is defined using a capacity ratio of a capacity of the positive electrode to a capacity of the negative electrode. The control device may be configured to calculate the charge carrier amount in the first negative electrode active substance and the second negative electrode active substance using a charge amount conservation law to be established between an amount of temporal change of the total amount of the charge carriers in the first and second negative electrode active substances and a current flowing in the positive electrode active substance.

According to the first aspect, the relational expression is used, whereby the diffusion equations in the first and second negative electrode active substances do not need to be solved. Furthermore, it is possible to reduce parameters to be used in the convergence computation processing. Therefore, it is possible to further reduce the amount of computation (a computation load, the amount of memory, and the like) of the control device (details will be described below).

In the secondary battery system according to the first aspect of the present disclosure, the control device may be configured to calculate a total amount of charge carriers in the first and second negative electrode active substances from a charge carrier amount in the positive electrode active substance according to a relational expression in which a relationship to be established between the charge carrier amount in the positive electrode active substance and the total amount of the charge carriers in the first and second negative electrode active substances is defined using a capacity ratio of a capacity of the positive electrode to a capacity of the negative electrode. The control device may be configured to calculate the charge carrier amount in the first negative electrode active substance and the second negative electrode active substance from an amount of temporal change in the total amount of the charge carriers in the first and second negative electrode active substances according to a predetermined relational expression approximating that a potential of the first negative electrode active substance changes linearly with the change in the charge carrier amount in the first negative electrode active substance and approximating that a potential of the second negative electrode active substance changes linearly with the change in the charge carrier amount in the second negative electrode active substance.

According to the first aspect, the predetermined relational expression using linear approximation is used, whereby it is possible to further reduce the amount of computation of the control device (details will be described below).

In the secondary battery system according to the first aspect of the present disclosure, the secondary battery may be a lithium-ion secondary battery. The control device may be configured to, in a case where a potential of the negative electrode to be calculated from the open circuit potential of the negative electrode falls below a predetermined potential higher than a potential of metallic lithium, more suppress charging electric power to the secondary battery than in a case where the potential of the negative electrode exceeds the predetermined potential.

According to the first aspect, charging electric power to the secondary battery is controlled based on the negative electrode potential estimated with high accuracy. With this, it is possible to appropriately protect the negative electrode from deterioration (lithium precipitation described below) of the negative electrode.

In the secondary battery system according to the first aspect of the present disclosure, the first negative electrode active substance may be a silicon-based material, and the second negative electrode active substance may be a carbon-based material.

A second aspect of the present disclosure relates to a method of estimating an internal state of a secondary battery. The secondary battery has a positive electrode and a negative electrode. The positive electrode includes a positive electrode active substance. The negative electrode includes first and second negative electrode active substances. An amount of change in volume of the first negative electrode active substance with change in charge carrier amount in the first negative electrode active substance is greater than an amount of change in volume of the second negative electrode active substance with change in charge carrier amount in the second negative electrode active substance. The method is a method of estimating the internal state of the secondary battery based on an active substance model. The method includes, under a condition that the first negative electrode active substance and the second negative electrode active substance are at the same potential, calculating a charge carrier amount in the first negative electrode active substance based on a first active substance model, calculating an amount of change in open circuit potential of the first negative electrode active substance based on surface stress of the first negative electrode active substance to be determined according to the charge carrier amount in the first negative electrode active substance, and calculating an open circuit potential of the negative electrode from the open circuit potential and the amount of change in open circuit potential of the first negative electrode active substance in a state in which surface stress is not generated in the first negative electrode active substance.

According to the second aspect, similarly to the first aspect, it is possible to improve the estimation accuracy of the internal state of the secondary battery.

According to the aspects of the present disclosure, in a secondary battery having a negative electrode including a plurality of negative electrode active substances, it is possible to improve estimation accuracy of an internal state of the secondary battery.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 7A is a table illustrating parameters (variables and constants) to be used in a battery model;

FIG. 7B is a table illustrating parameters (variables and constants) to be used in a battery model;

FIG. 8 is a table illustrating additional characteristics (subscripts) to be used in the battery model;

DETAILED DESCRIPTION

Figure 1:
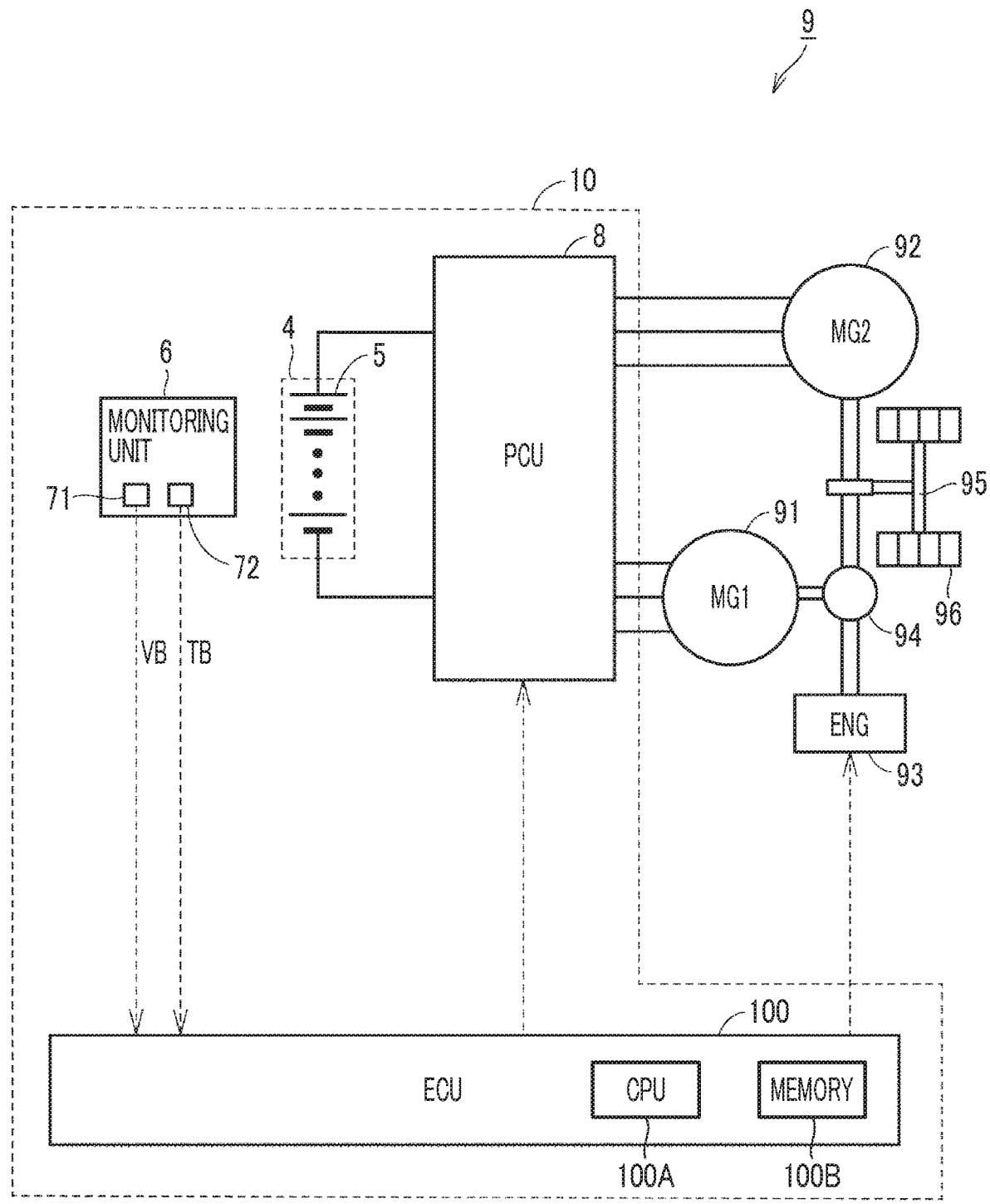
FIG. 1 is a diagram schematically showing the overall configuration of an electrified vehicle in which a secondary battery system according to Embodiment 1 is mounted.

Hereinafter, an embodiment of the present disclosure will be described in detail referring to the drawings. In the drawings, the same or similar portions are represented by the same reference numerals, and description thereof will not be repeated.

In the following description, a configuration in which a secondary battery system according to the embodiment of the present disclosure is mounted in an electrified vehicle will be described as an example. The electrified vehicle may be a hybrid vehicle (including a plug-in hybrid vehicle) or may be an electric vehicle. The electrified vehicle may be a hybrid vehicle in which a fuel cell and a secondary battery are combined. The "secondary battery system" according to the embodiment of the present disclosure is not limited as being applied to a vehicle, or may be stationary.

Embodiment 1

Configuration of Secondary Battery System

FIG. 1 is a diagram schematically showing the overall configuration of an electrified vehicle in which a secondary battery system according to Embodiment 1 is mounted. Referring to FIG. 1, a vehicle 9 is a hybrid vehicle, and includes motor generators 91, 92, an engine 93, a power split device 94, a drive shaft 95, drive wheels 96, and a secondary battery system 10. The secondary battery system 10 includes a battery 4, a monitoring unit 6, a power control unit (PCU) 8, and an electronic control unit (ECU) 100.

Each of the motor generators 91, 92 is an alternating-current rotating electric machine, and is, for example, a three-phase alternating-current synchronous electric motor in which a permanent magnet is embedded in a rotor. The motor generator 91 is primarily used as a power generator that is driven by the engine 93 by way of the power split device 94. Electric power generated by the motor generator 91 is supplied to the motor generator 92 or the battery 4 through the PCU 8.

The motor generator 92 primarily operates as an electric motor and drives the drive wheels 96. The motor generator 92 is driven by receiving at least one of electric power from the battery 4 and generated electric power of the motor generator 91, and drive power of the motor generator 92 is transmitted to the drive shaft 95. At the time of braking of the vehicle or reduction in acceleration on a downward slope, the motor generator 92 operates as a power generator to perform regenerative electric power generation. Electric power generated by the motor generator 92 is supplied to the battery 4 through the PCU 8.

The engine 93 is an internal combustion engine that outputs power by converting combustion energy to be generated by combustion of an air-fuel mixture of air and fuel to kinetic energy of a motion element, such as a piston or a rotor.

The power split device 94 includes, for example, a planetary gear mechanism (not shown) having three rotational shafts of a sun gear, a carrier, and a ring gear. The power split device 94 splits power output from the engine 93 into power for driving the motor generator 91 and power for driving the drive wheels 96.

The battery 4 is an assembled battery including a plurality of cells (single batteries) 5. In the embodiment, each cell 5 is a lithium-ion secondary battery. The configuration of each cell 5 will be described referring to FIG. 2.

The battery 4 stores electric power for driving the motor generators 91, 92, and supplies electric power to the motor generators 91, 92 through the PCU 8. The battery 4 receives and is charged with generated electric power through the PCU 8 at the time of power generation of the motor generators 91, 92.

The monitoring unit 6 includes a voltage sensor 71 and a temperature sensor 72. The voltage sensor 71 detects a voltage of each cell 5 included in the battery 4 as an assembled battery. The temperature sensor 72 detects a temperature of each cell 5. Each sensor outputs a detection result to the ECU 100.

The voltage sensor 71 may detect a voltage VB, for example, with a plurality of cells 5 connected in parallel as a unit of monitoring. The temperature sensor 72 may detect a temperature TB with a plurality of cells 5 disposed to be adjacent to one another as a unit of monitoring. In this way, in the embodiment, the unit of monitoring is not particularly limited. Thus, in the following description, for simplification of description, it is simply described that "the voltage VB of the battery 4 is detected" or "the temperature TB of the battery 4 is detected". In regards to a potential, an OCV, and an SOC, similarly, the battery 4 is described as a unit of execution of each kind of processing.

The PCU 8 executes bidirectional electric power conversion between the battery 4 and the motor generators 91, 92 in response to a control signal from the ECU 100. The PCU 8 is configured to separately control the states of the motor generators 91, 92, and, for example, can bring the motor generator 92 into a powering state while bringing the motor generator 91 into a regeneration state (power generation state). The PCU 8 includes, for example, two inverters that are provided corresponding to the motor generators 91, 92, and a converter that boosts a direct-current voltage supplied to each of the inverters to be equal to or higher than an output voltage of the battery 4 (all are not shown).

The ECU 100 includes a central processing unit (CPU) 100A, a memory (specifically, a read only memory (ROM) and a random access memory (RAM)) 100B, and an input and output port (not shown) that is used to input and output various signals. The ECU 100 estimates the state of the battery 4 based on signals received from sensors of the monitoring unit 6, and a program and a map stored in the memory 100B. As principal processing to be executed by the ECU 100, "potential calculation processing" for calculating various potential components including a positive electrode potential $V_1$ and a negative electrode potential $V_2$ of the battery 4 is exemplified. The ECU 100 estimates an SOC of the battery 4 or controls charging and discharging of the battery 4 according to a result of the "potential calculation processing".

The positive electrode potential $V_1$ is a potential of a positive electrode (see FIG. 2) when the battery 4 is in an electrical conduction state. The negative electrode potential $V_2$ is a potential of a negative electrode when the battery 4 is in the electrical conduction state. When the battery 4 is in a non-electrical conduction state (no-load state), a potential of the positive electrode is called a positive electrode open circuit potential (OCP) $U_1$. A potential of the negative electrode is called a negative electrode open circuit potential $U_2$. Although a potential to be a reference for these potentials (and other potentials described below) can be optionally set, in the embodiment, a potential of metallic lithium is determined as a reference potential.

Figure 2:
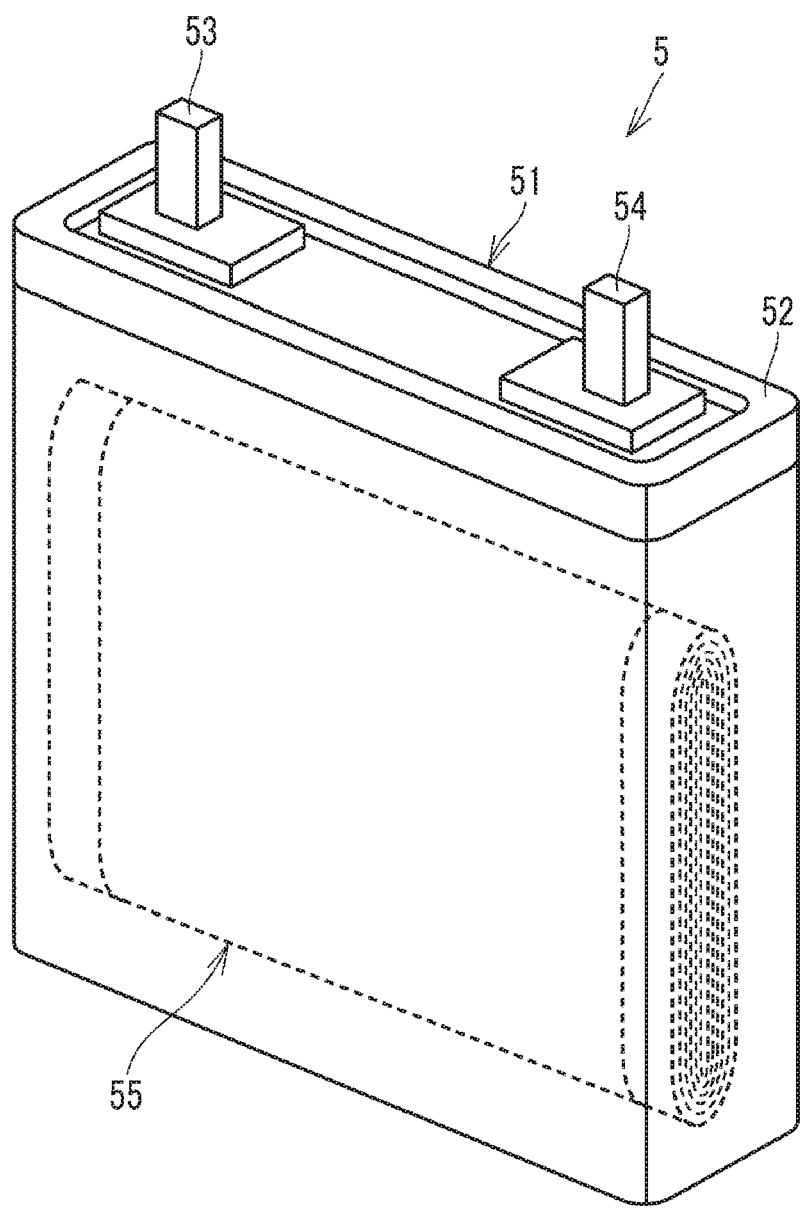
FIG. 2 is a diagram illustrating the configuration of each cell in more detail.

FIG. 2 is a diagram illustrating the configuration of each cell 5 in more detail. In FIG. 2, the cell 5 is shown in a perspective view.

Referring to FIG. 2, the cell 5 has a square (substantially rectangular parallelepiped shape) battery case 51. An upper surface of the battery case 51 is sealed by a lid 52. A first end of each of a positive electrode terminal 53 and a negative electrode terminal 54 protrudes from the lid 52 toward the outside. Second ends of the positive electrode terminal 53 and the negative electrode terminal 54 are connected to an internal positive electrode terminal and an internal negative electrode terminal (both are not shown) inside the battery case 51, respectively. Inside the battery case 51, an electrode assembly 55 is housed. The electrode assembly 55 is formed by laminating the positive electrode and the negative electrode through a separator and winding the laminate. An electrolyte is retained by the positive electrode, the negative electrode, the separator, and the like.

For the positive electrode, the separator, and the electrolyte, known configurations and materials in the related as the positive electrode, the separator, and the electrolyte of the lithium-ion secondary battery can be used, respectively. As an example, for the positive electrode, a ternary material in which a part of lithium cobalt oxide is replaced by nickel and manganese can be used. For the separator, polyolefin (for example, polyethylene or polypropylene) can be used. The electrolyte contains an organic solvent (for example, a mixed solvent of dimethyl carbonate (DMC), ethyl methyl carbonate (EMC), and ethylene carbonate (EC)), lithium salt (for example, $LiPF_6$), an additive (for example, lithiumbis (oxalate)borate (LiBOB) or $Li[PF_2(C_2O_4)_2]$), and the like.

The configuration of the cell is not particularly limited, and the cell may have a configuration in which the electrode assembly has a laminated structure, instead of a wound structure. The battery case is not limited to the square battery case, and a cylindrical or laminated battery case may be employed.

Hysteresis of SOC-OCV Curve

In the related art, a typical negative electrode active substance of the lithium-ion secondary battery is a carbon-based material, such as graphite. In contrast, in the embodiment, a composite material of a silicon-based material (Si or SiO) and graphite is employed as the negative electrode active substance. This is because, in a case where the silicon-based material is included, the energy density of the battery 4 increases, thereby increasing the full charge capacity of the battery 4. On the other hand, in a case where the silicon-based material is included, a hysteresis markedly appears in the battery 4.

Figure 3:
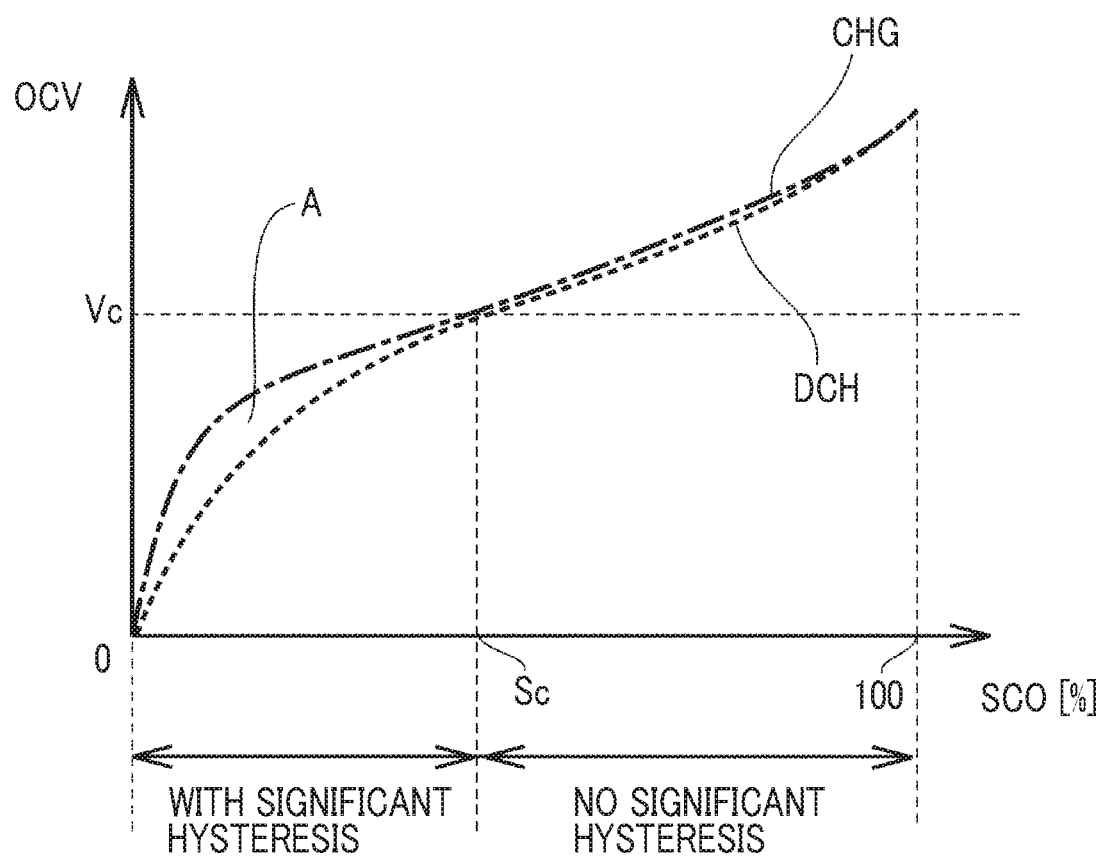
FIG. 3 is a graph showing an example of an SOC-OCV curve of a battery in Embodiment 1.

FIG. 3 is a graph showing an example of an SOC-OCV curve of the battery 4 in Embodiment 1. In FIG. 3, and FIG. 10A to FIG. 11 described below, the horizontal axis represents an SOC of the battery 4, and the vertical axis represents an OCV of the battery 4. In the specification, the OCV means a voltage in a state in which a voltage of the secondary battery is sufficiently relaxed, that is, a state in which a concentration distribution (in the embodiment, a lithium concentration distribution) of charge carriers in an active substance is relaxed.

In FIG. 3, a charging curve CHG and a discharging curve DCH of the battery 4 are shown. The charging curve CHG is acquired by repeating charging and pause (charging stop) after the battery 4 is brought into a completely discharged state. The discharging curve DCH is acquired by repeating discharging and pause (discharging stop) after the battery 4 is brought into a fully charged state.

In detail, the charging curve CHG can be acquired as follows. First, the battery 4 in the completely discharged state is prepared, and is charged with, for example, an amount of electricity corresponding to an SOC of 5%. After the amount of electricity is charged, charging is stopped, and the battery 4 is left for a time (for example, for 30 minutes) until polarization caused by charging is eliminated. After the leaving time has elapsed, the OCV of the battery 4 is measured. Then, a combination (SOC and OCV) of the SOC (=5%) after charging and the measured OCV is plotted on the drawing.

Subsequently, charging (charging from SOC=5% to 10%) of the battery 4 with an amount of electricity corresponding to an SOC of next 5% starts. In a case where charging is completed, similarly, the OCV of the battery 4 is measured after the leaving time has elapsed. Then, the state (a combination of the SOC and the OCV) of the battery 4 is plotted again from a measurement result of the OCV. Thereafter, the same procedure is repeated until the battery 4 reaches the fully charged state. The charging curve CHO can be acquired by carrying out such a measurement.

Similarly, until the battery 4 reaches the completely discharged state from the fully charged state, the OCV of the battery 4 in the SOC at intervals of 5% is measured while repeating discharging and discharging stop of the battery 4 in turn. The discharging curve DCH can be acquired by carrying out such a measurement. The acquired charging curve CHO and discharging curve DCH are stored in the memory 100B of the ECU 100.

The OCV on the charging curve CHG is referred to as a "charging OCV", and the OCV on the discharging curve DCH is referred to as a "discharging OCV". The charging OCV indicates a highest value of the OCV in each SOC, and the discharging OCV indicates a lowest value of the OCV in each SOC. The state of the battery 4 is plotted on the charging OCV, the discharging OCV, or a region (hereinafter, referred to as an "intermediate region A") surrounded by the charging OCV and the discharging OCV (see FIGS. 10A to 11 described below). Deviation between the charging OCV and the discharging OCV (for example, occurrence of a voltage difference of about 100 mV) represents the presence of a hysteresis in the battery 4.

In a case where the composite material including both of the silicon-based material and graphite is employed as the negative electrode active substance, as shown in FIG. 3, an SOC region where a hysteresis of the battery 4 occurs significantly is limited to a partial SOC region (in FIG. 3, an SOC region less than Sc). A value of Sc can be obtained by performing the above-described measurement in advance.

Surface Stress of Negative Electrode Active Substance

As a factor for which a hysteresis occurs in the battery 4, change in volume of the negative electrode active substance with charging and discharging is considered. The negative electrode active substance expands with insertion of lithium (charge carriers) and contracts with desorption of lithium. Such change in volume of the negative electrode active substance causes stress in the surface of and inside the negative electrode active substance, and even in a state in which the lithium concentration in the negative electrode active substance is relaxed, stress remains in the surface of the negative electrode. Stress remaining in the surface of the negative electrode is considered to be stress in a state in which stress generated inside the negative electrode active substance and various kinds of force including reaction force to be applied from a peripheral member (binder, conductive assistant, or the like) of the negative electrode active substance to the negative electrode active substance with the change in volume of the negative electrode active substance are balanced. Hereinafter, the stress is described as "surface stress $\sigma_{surf}$".

An amount of change in volume of the silicon-based material with insertion or desorption of lithium is greater than an amount of change in volume of graphite. Specifically, in a case where minimum volume in a state in which lithium is not inserted is used as a reference, while the amount of change in volume (expansion rate) of graphite with insertion of lithium is about 1.1 times, the amount of change in volume of the silicon-based material is a maximum of about four times. For this reason, in a case where the negative electrode active substance includes the silicon-based material, the surface stress $\sigma_{surf}$ increases compared to a case where the negative electrode active substance does not include the silicon-based material (in a case where the negative electrode active substance is graphite).

The surface stress $\sigma_{surf}$ can be measured (estimated) through thin film evaluation. An example of a measurement method of the surface stress $\sigma_{surf}$ will be simply described. First, change in curvature κ of the negative electrode as a thin film deformed by the surface stress $\sigma_{surf}$ is measured. For example, the curvature κ can be optically measured using a commercially available curvature radius measurement system. Then, the surface stress $\sigma_{surf}$ can be calculated by substituting the measured curvature κ and a constant (Young's modulus, Poisson's ratio, thickness, or the like) determined according to the material and shape of the negative electrode (the negative electrode active substance and the peripheral member) in a Stoney' formula (in regards to details of stress measurement, for example, see "In Situ Measurements of Stress-Potential. Coupling in Lithiated Silicon", V. A. Sethuraman et al., Journal of The Electrochemical Society, 157(11) A1253-A1261 (2010)).

The negative electrode potential $V_2$ is decided by a surface state of the negative electrode active substance. In more detail, the negative electrode potential $V_2$ is decided by a lithium amount ($\theta_2$ described below) in the surface of the negative electrode active substance and the surface stress $\sigma_{surf}$ (see Expression (20) described below). In a case where a material that may cause large change in volume with charging and discharging, such as the silicon-based material, is employed, as described below, the surface stress $\sigma_{surf}$ changes with an increase or decrease in lithium amount in the negative electrode active substance, whereby the negative electrode open circuit potential $U_2$ may be increased or decreased.

Figure 4:
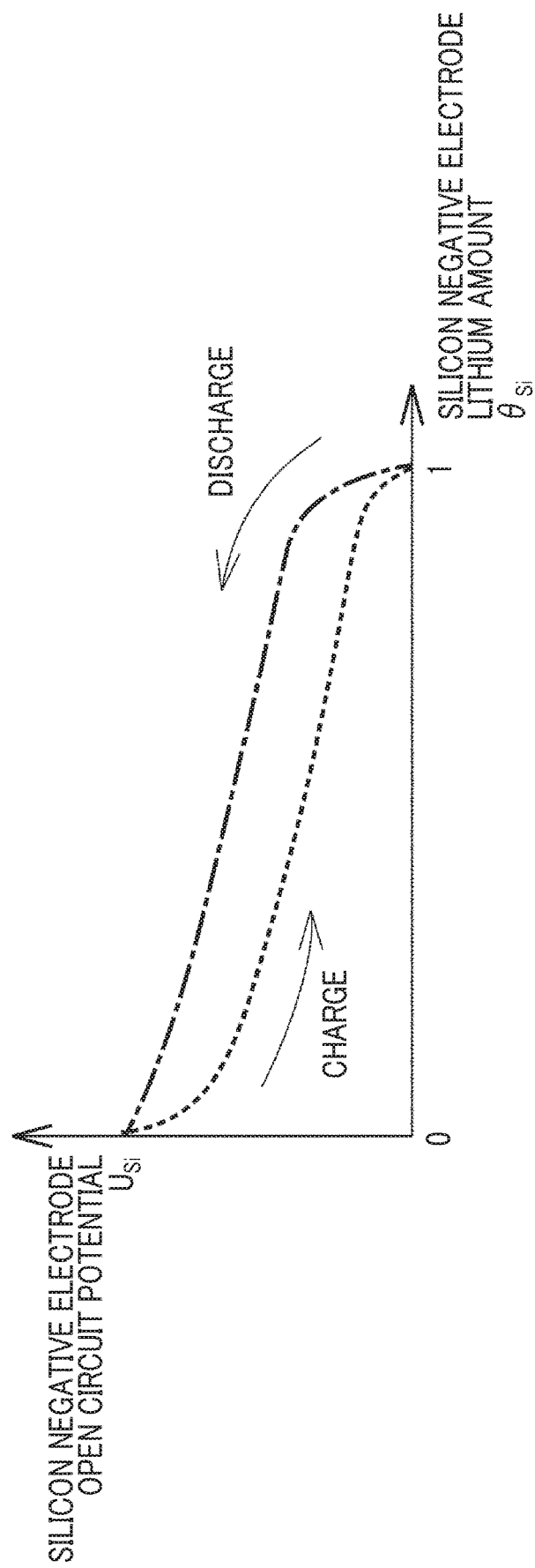
FIG. 4 is a graph schematically showing a change of a negative electrode open circuit potential with charging and discharging in a case where a simple substance of silicon is used as the negative electrode.

FIG. 4 is a graph illustrating a change of a negative electrode open circuit potential with charging and discharging in a case where a simple substance of silicon is used as the negative electrode. In FIG. 4, the horizontal axis represents the lithium amount $\theta_{Si}$ in the surface of the silicon negative electrode active substance, and the vertical axis represents the negative electrode open circuit potential $U_{Si}$. The same applies to FIGS. 10A to 11 described below.

In FIG. 4, an example of change in negative electrode open circuit potential $U_{Si}$ of a simple substance silicon negative electrode in a case where, first, charging and charging stop are repeated for every SOC of several % from a state of a lithium amount $\theta_{Si\_SOC0}$ corresponding to SOC=0% to a state of a lithium amount $\theta_{Si\_SOC100}$ corresponding to SOC=100%, and then, discharging and discharging stop are repeated for every SOC of several % from the state of the lithium amount $\theta_{Si\_SOC100}$ to the state of the lithium amount $\theta_{Si\_SOC0}$ is schematically shown.

A result shown in FIG. 4 can be acquired by evaluation on a cell including a positive electrode and a negative electrode formed of a simple substance of silicon by using a reference electrode provided in the cell. Alternatively, the result shown in FIG. 4 can be acquired by evaluation on a half-cell including a silicon negative electrode and a counter electrode lithium metal.

In a continuous charging condition, mainly a compressive yield stress $\sigma_{com}$ is generated in the surface of the silicon negative electrode active material (the surface stress $\sigma_{surf}$ becomes the compressive yield stress $\sigma_{com}$). In this case, the silicon negative electrode open-circuit potential is reduced as compared with an ideal (virtual) state in which no surface stress $\sigma_{surf}$ is generated. In the following description, an ideal state in which the surface stress $\sigma_{surf}$ is not generated is referred to as an "ideal state". In a continuous discharging condition, mainly a tensile yield stress $\sigma_{ten}$ is generated in the surface of the silicon negative electrode active material (the surface stress $\sigma_{surf}$ becomes the tensile yield stress $\sigma_{ten}$). In this case, the silicon negative electrode open-circuit potential is increased as compared with an ideal state.

In a case where the negative electrode open circuit potential $U_{Si}$ decreases compared to the ideal state, the OCV as the difference ($=U_1-U_{Si}$) between the positive electrode open circuit potential $U_1$ and the negative electrode open circuit potential $U_{Si}$ increases, and in a case where the negative electrode open circuit potential $U_{Si}$ increases, the OCV decreases. In this way, in a case where the negative electrode active substance is the silicon-based material, the charging OCV and the discharging OCV deviate from each other with change in negative electrode open circuit potential $U_{Si}$ due to surface stress $\sigma_{surf}$. For this reason, the negative electrode open circuit potential $U_{Si}$ is calculated taking into consideration the influence of the surface stress $\sigma_{surf}$, whereby it is possible to calculate the OCV with high accuracy, and thus, to improve the estimation accuracy of the SOC for a battery using a silicon-based material as a negative electrode.

Battery Model

Next, a battery model (active substance model) that is used for estimating an internal state of the battery 4 in Embodiment 1 will be described in detail. In Embodiment 1, a three-particle model in which a positive electrode is representatively represented by one active substance (one particle), and a negative electrode is representatively represented by two particles by material of a negative electrode active substance is employed.

Figure 5:
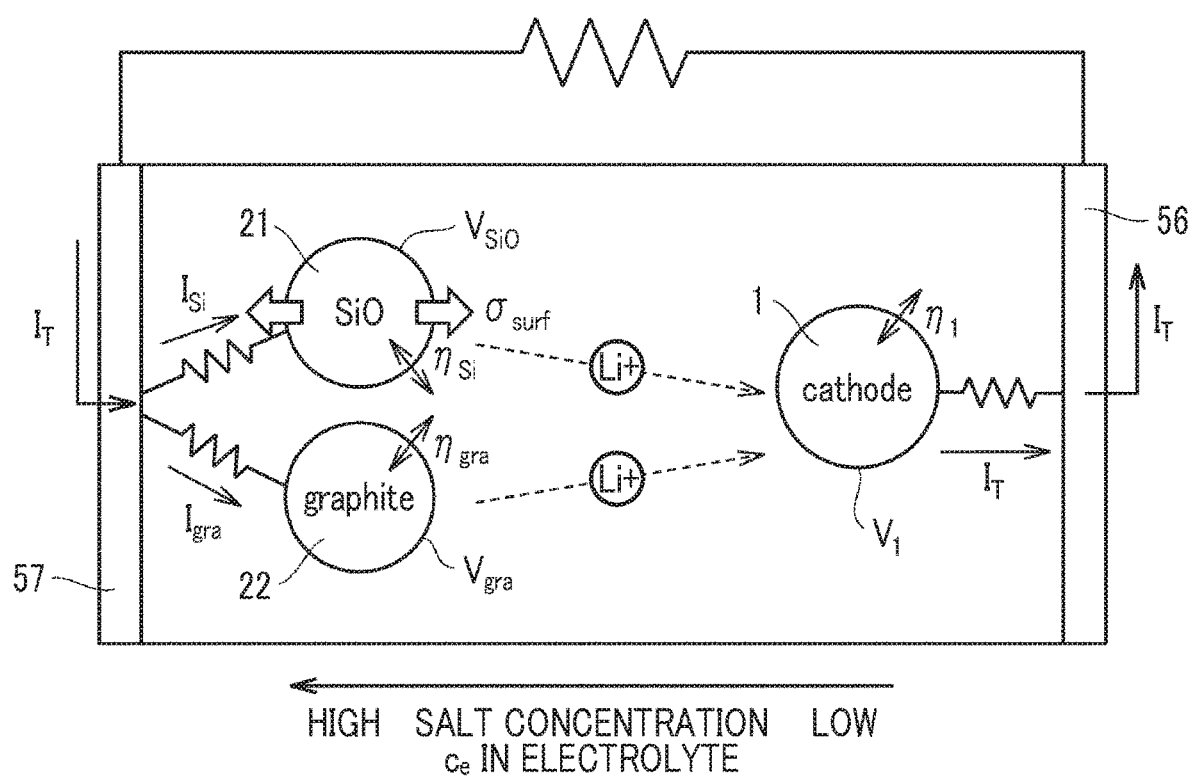
FIG. 5 is a diagram illustrating a three-particle model.

FIG. 5 is a diagram illustrating the three-particle model. Referring to FIG. 5, in the three-particle model of Embodiment 1, the positive electrode of the battery 4 is represented as one particle formed of a positive electrode active substance (for example, a ternary material). The particle is described as a "positive electrode particle 1" for simplification. The negative electrode is represented as two particles. A first particle (first active substance model) is formed of a silicon-based material in the negative electrode active substance, and a second particle (second active substance model) is formed of graphite in the negative electrode active substance. For simplification, the former particle is referred to as a "silicon particle 21", and the latter particle is referred to as a "graphite particle 22". A potential of the silicon particle 21 is described as a "silicon potential $V_{Si}$", and a potential of the graphite particle 22 is described as a "graphite potential $V_{gra}$".

FIG. 5 shows a form at the time of discharging of the battery 4. At the time of discharging of the battery 4, lithium ions (indicated by Li$^{+}$) are emitted in the interface between the silicon particle 21 and the electrolyte and the interface between the graphite particle 22 and the electrolyte. A current flowing-in the silicon particle 21 with the emission of the lithium ions is referred to as a "silicon current $I_{Si}$", and a current flowing in the graphite particle 22 with the emission of the lithium ions is referred to as a "graphite current $I_{gra}$". A total current flowing in the battery 4 is represented by $I_T$. As will be understood from FIG. 5, in the three-particle model of the embodiment, the total current $I_T$ is distributed into the silicon current $I_{Si}$ and the graphite current $I_{gra}$.

At the time of charging of the battery 4, while a direction of a current is reversed to a direction shown in FIG. 5 (not shown), the relationship of the distribution of the total current $I_T$ into the silicon current $I_{Si}$ and the graphite current $I_{gra}$ is the same. In the specification, a current at the time of charging is shown as negative, and a current at the time of discharging is shown as positive.

As described below, in the three-particle model of Embodiment 1, the lithium concentration distribution inside each particle of the positive electrode particle 1, the silicon particle 21, and the graphite particle 22 is calculated.

Figure 6:
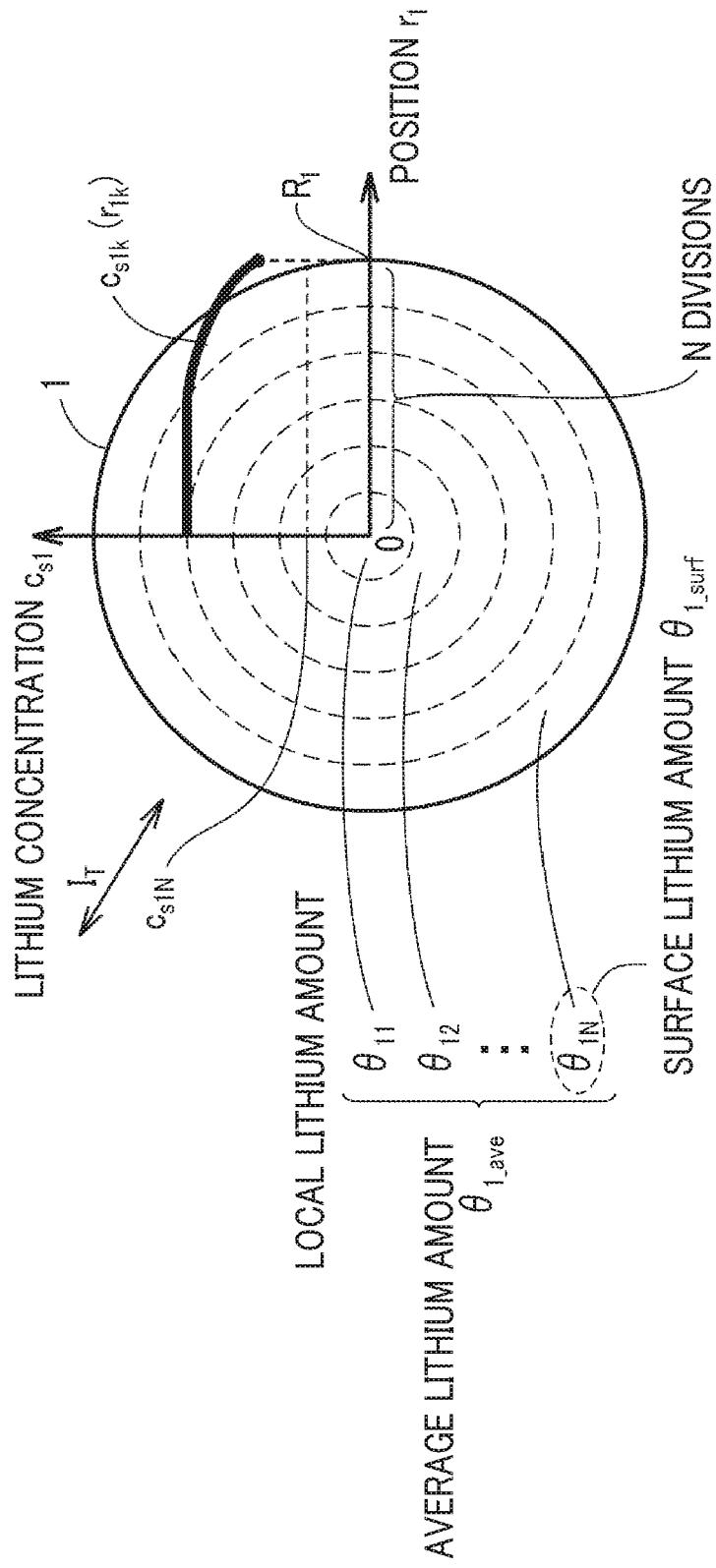
FIG. 6 is a diagram illustrating a calculation method of lithium concentration distributions inside a positive electrode particle, a silicon particle, and a graphite particle.

FIG. 6 is a diagram illustrating a calculation method of the lithium concentration distributions inside the positive electrode particle 1, the silicon particle 21, and the graphite particle 22. Referring to FIG. 6, in the three-particle model, inside the spherical positive electrode particle 1, it is assumed that a lithium concentration distribution in a circumferential direction of polar coordinates is uniform, and solely a lithium concentration distribution in a radial direction of the polar coordinates is taken into consideration. In other words, an internal mode of the positive electrode particle 1 is a one-dimensional model in which a moving direction of lithium is limited to the radial direction.

The positive electrode particle 1 is virtually divided into N (where N: a natural number equal to or greater than 2) regions in the radial direction. The regions are distinguished from one another by an additional character k (where k=1 to N). A lithium concentration $c_{1k}$ in a region k is represented as a function of a position $r_{1k}$ of the region k in the radial direction of the positive electrode particle 1 and time t (see Expression (1) described below).

$$c_{s1k} = c_{s1}(r_{1k}, t) \quad (1)$$

Though a detailed calculation method will be described, in the embodiment, a lithium concentration $c_{s1k}$ of each region k is calculated (that is, the lithium concentration distribution is calculated), and the calculated lithium concentration $c_{1k}$ is normalized. Specifically, as shown in Expression (2), a ratio of a calculated value of the lithium concentration $c_{1k}$ to a maximum value (hereinafter, referred to a "limit lithium concentration") $c_{1,max}$ of the lithium concentration is calculated for each region k. The limit lithium concentration $c_{1,max}$ is a concentration determined according to the type of the positive electrode active substance, and is known through documents.

$$\theta_{1k} = \frac{c_{s1k}}{c_{s1k,max}} \quad (2)$$

Hereinafter, $\theta_{1k}$ as a value after normalization is referred to as a "local lithium amount" of the region k. The local lithium amount $\theta_{1k}$ takes a value within a range of 0 to 1 according to the lithium amount included in the region k of the positive electrode particle 1. A local lithium amount $\theta_{1N}$ in an outermost circumferential region N (that is, the surface of the positive electrode particle 1) where k=N is referred to as a "surface lithium amount $\theta_{1\_surf}$". As shown in Expression (3) described below, a total of products of volume $v_{1k}$ and the local lithium amount $\theta_{1k}$ of the region k (where k=1 to N) is obtained, and a value obtained by dividing the total by the volume of the positive electrode particle 1 (the volume of the positive electrode active substance) is referred to as an "average lithium amount" and is represented by $\theta_{1\_ave}$.

$$\theta_{1\_ave} = \frac{1}{V_{s\_1}} \sum_{k=1}^{N} v_{1k} \theta_{1k} \quad (3)$$

Although the particle (positive electrode particle 1) representing the positive electrode active substance has been described as an example in FIG. 6, a calculation method of the lithium concentration distributions and (the distributions of) the local lithium amounts inside the particles (the silicon particle 21 and the graphite particle 22) representing the negative electrode active substance is the same. Although the number of divided regions between the positive electrode particle 1 and the silicon particle 21 and the number of divided regions between the positive electrode particle 1 and the graphite particle 22 may be different from each other, in the embodiment, both of the numbers of divided regions may be N.

FIGS. 7A and 7B are tables illustrating parameters (variables and constants) to be used in a battery model. FIG. 8 is a table illustrating additional characters (subscripts) to be used in the battery model. As shown in FIGS. 7A to 8, an additional character i is to distinguish among the three particles, and i=1, Si, or gra. A case where i=1 means that the parameters are values in the positive electrode particle 1, a case where i=Si means that the parameters are values in the silicon particle 21, and a case where i=gra means that the parameters are values in the graphite particle 22. Among the parameters to be used in the battery model, the parameters attached with an additional character e mean values in the electrolyte, and the parameters attached with an additional character s mean values in the active substance.

Functional Blocks

Although various potential components that are calculated through the potential calculation processing may be used for various kinds of processing or control, in Embodiment 1, a configuration in which "SOC estimation processing" for estimating the SOC of the battery 4 is executed based on the result of the potential calculation processing. In the embodiment, prior to the estimation of the SOC of the battery 4, a series of processing (computation processing using an iteration method) for deciding how the total current $I_T$ is distributed into the current (silicon current $I_{Si}$) flowing in the silicon particle 21 and the current (graphite current $I_{gra}$) flowing in the graphite particle 22 is repeatedly executed.

Figure 9:
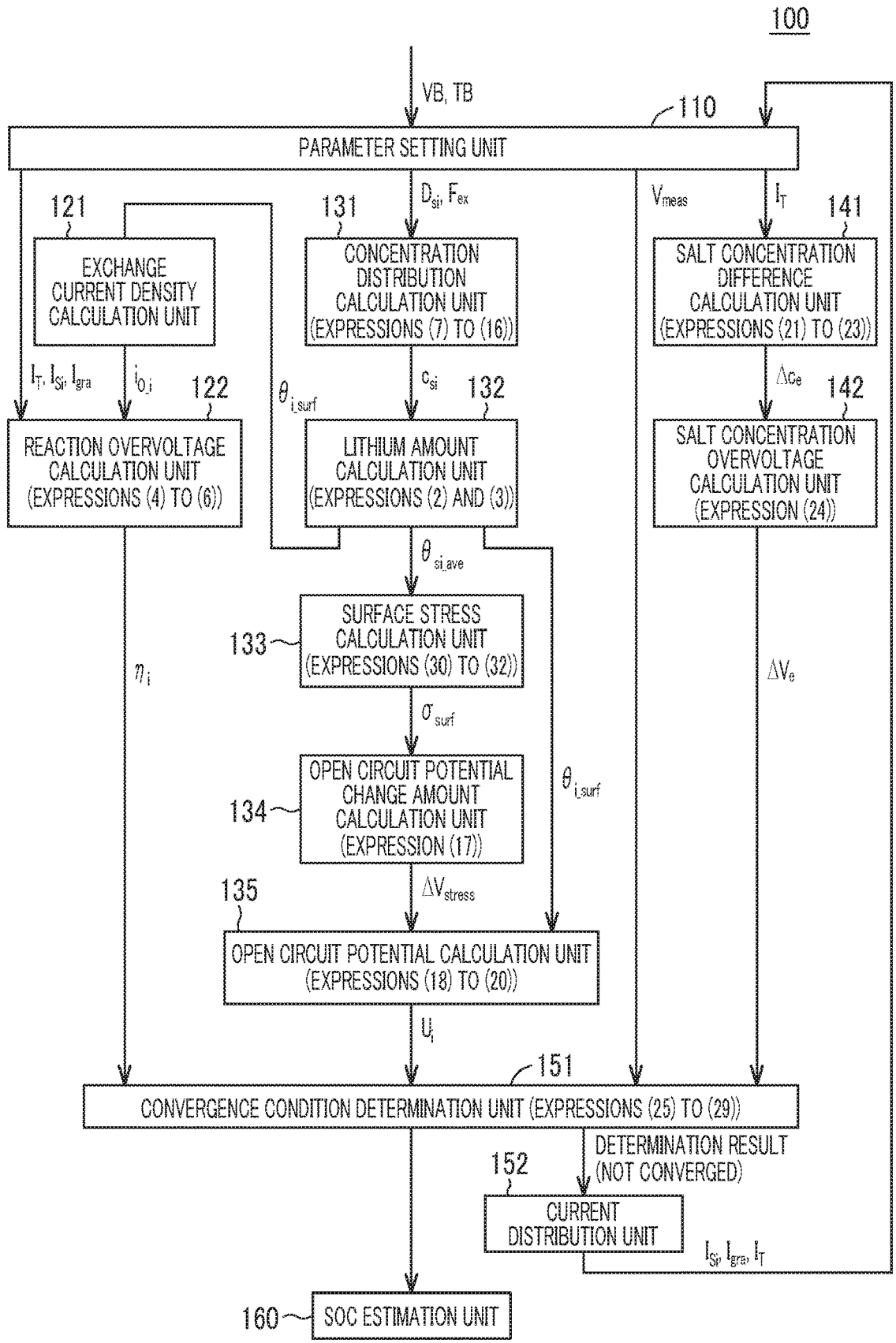
FIG. 9 is a functional block diagram of an ECU relating to potential calculation processing and SOC estimation processing in Embodiment 1.

FIG. 9 is a functional block diagram of the ECU 100 relating to the potential calculation processing and the SOC estimation processing in Embodiment 1. Referring to FIG. 9, the ECU 100 includes a parameter setting unit 110, an exchange current density calculation unit 121, a reaction overvoltage calculation unit 122, a concentration distribution calculation unit 131, a lithium amount calculation unit 132, a surface stress calculation unit 133, an open circuit potential change amount calculation unit 134, an open circuit potential calculation unit 135, a salt concentration difference calculation unit 141, a salt concentration overvoltage calculation unit 142, a convergence condition determination unit 151, a current distribution unit 152, and an SOC estimation unit 160.

The parameter setting unit 110 outputs parameters to be used in computation in other functional blocks. Specifically, the parameter setting unit 110 receives the voltage VB of the battery 4 from the voltage sensor 71, and receives the temperature TB of a battery module (not shown) from the temperature sensor 72. The parameter setting unit 110 sets the voltage VB as a measured voltage $V_{meas}$ of the battery 4, and converts the temperature TB to an absolute temperature T (unit: Kelvin). The measured voltage $V_{meas}$ and the absolute temperature T (or the temperature TB) are output to other functional blocks. Since the absolute temperature T is output from many functional blocks, in order to restrain the drawings from becoming complicated, arrows indicating transmission of the absolute temperature T are omitted.

In addition, the parameter setting unit 110 outputs diffusion coefficients $D_{s1}$, $D_{s\_Si}$, $D_{s\_gra}$ to the concentration distribution calculation unit 131. As the diffusion coefficients $D_{s1}$, $D_{s\_Si}$, $D_{s\_gra}$, it is desirable that different values (these values may be average lithium amounts or surface lithium amounts) may be set according to the local lithium amounts $\theta_1$, $\theta_{Si}$, $\theta_{gra}$, respectively.

Though details will be described below, in the computation processing using the iteration method to be executed by the convergence condition determination unit 151 and the current distribution unit 152, as the parameters set to be variable, the silicon current $I_{Si}$, the graphite current $I_{gra}$, and the total current $I_T$ are used. The parameter setting unit 110 receives the currents ($I_{Si}$, $I_{gra}$, $I_T$) set by the current distribution unit 152 at the time of previous computation, and outputs these currents as parameters to be used in present computation to other functional blocks.

The exchange current density calculation unit 121 receives the absolute temperature T from the parameter setting unit 110, and receives the surface lithium amount $\theta_{1\_surf}$ of the positive electrode particle 1, the surface lithium amount $\theta_{Si\_surf}$ of the silicon particle 21, and the surface lithium amount $\theta_{gra\_surf}$ of the graphite particle 22 from the lithium amount calculation unit 132. The exchange current density calculation unit 121 calculates an exchange current density $i_{0\_1}$ of the positive electrode particle 1, an exchange current density $i_{0\_Si}$ of the silicon particle 21, and an exchange current density $i_{0\_gra}$ of the graphite particle 22 based on the parameters received from other functional blocks.

In more detail, the exchange current density $i_{0\_1}$ is a current density when an anode current density corresponding to oxidation reaction in the positive electrode particle 1 and a cathode current density corresponding to reduction reaction in the positive electrode particle 1 become equal to each other. The exchange current density $i_{0\_1}$ has a characteristic depending on the surface lithium amount $\theta_{1\_surf}$ of the positive electrode particle 1 and the absolute temperature T. Accordingly, a map (not shown) specifying the correspondence relationship of the exchange current density $i_{0\_1}$, the surface lithium amount $\theta_{1\_surf}$, and the absolute temperature T is prepared in advance, whereby the exchange current density $i_{0\_1}$ can be calculated from the surface lithium amount $\theta_{1\_surf}$ (described below) calculated by the lithium amount calculation unit 132 and the absolute temperature T. The same applies to the exchange current density $i_{0\_Si}$ of the silicon particle 21 and the exchange current density $i_{0\_gra}$ of the graphite particle 22, and thus, description will not be repeated.

The reaction overvoltage calculation unit 122 receives the absolute temperature T from the parameter setting unit 110, and receives the silicon current $I_{Si}$, the graphite current $I_{gra}$, and the total current $I_T$ from the parameter setting unit 110. The reaction overvoltage calculation unit 122 also receives the exchange current densities $i_{0\_1}$, $i_{0\_Si}$, $i_{0\_gra}$ from the exchange current density calculation unit 121. Then, the reaction overvoltage calculation unit 122 calculates a reaction overvoltage (positive electrode overvoltage) $\eta_1$ of the positive electrode particle 1, a reaction overvoltage (silicon overvoltage) $\eta_{Si}$ of the silicon particle 21, and a reaction overvoltage (graphite overvoltage) $\eta_{gra}$ of the graphite particle 22 according to Expressions (4) to (6) described below to be derived from a Butler-Volmer's relational expression, respectively. The reaction overvoltage is also referred to as an activation overvoltage, and is an overvoltage related to charge transfer reaction (insertion and desorption reaction of lithium). The calculated reaction overvoltages $\eta_1$, $\eta_{Si}$, $\eta_{gra}$ are output to the current distribution unit 152.

$$\eta_1 = \frac{2RT}{\beta_1 F}\sinh^{-1}\left(\frac{-\beta_1 I_T}{2L_1 a_{s1} i_{0\_1}(\theta_1, T)}\right) \quad (4)$$

$$\eta_{Si} = \frac{2RT}{\beta_{Si} F}\sinh^{-1}\left(\frac{\beta_{Si} I_{Si}}{2L_2 a_{s\_Si} i_{0\_Si}(\theta_{Si}, T)}\right) \quad (5)$$

$$\eta_{gra} = \frac{2RT}{\beta_{gra} F}\sinh^{-1}\left(\frac{\beta_{gra} I_{gra}}{2L_2 a_{s\_gra} i_{0\_gra}(\theta_{gra}, T)}\right) \quad (6)$$

The concentration distribution calculation unit 131 receives the diffusion coefficient $D_{s1}$ of lithium in the positive electrode particle 1 from the parameter setting unit 110. The concentration distribution calculation unit 131 calculates the lithium concentration distribution inside the positive electrode particle 1 by solving Expression (7) described below as a diffusion equation of a polar coordinate system handling the positive electrode active substance (positive electrode particle 1) as a sphere in a time development manner. Since an amount of change in lithium concentration in the surface (position $r_1=R_1$) of the positive electrode particle 1 is proportional to the total current $I_T$, a boundary condition of the diffusion equation (7) is set as Expression (8).

$$\frac{\partial c_{s1}(r_1)}{\partial t} = \frac{1}{r_1^2}\frac{\partial}{\partial r_1}\left(r_1^2 D_{s1}(\theta_1)\frac{\partial c_{s1}(r_1)}{dr_1}\right) \quad (7)$$

$$-D_{s1}\frac{\partial c_{s1}}{dr_1}\bigg|_{r_1=R_1} = \frac{I_T}{L_1 a_{s1} F} \quad (8)$$

In regard to the graphite particle 22, similarly, the concentration distribution calculation unit 131 calculates the lithium concentration distribution inside the graphite particle 22 by solving Expression (9) under a boundary condition shown in Expression (10) described below in a time development manner.

$$\frac{\partial c_{s\_gra}(r_{gra})}{\partial t} = \frac{1}{r_{gra}^2}\frac{\partial}{\partial r_{gra}}\left(r_{gra}^2 D_{s\_gra}(\theta_{gra})\frac{\partial c_{s\_gra}(r_{gra})}{dr_{gra}}\right) \quad (9)$$

$$-D_{s\_gra}\frac{\partial c_{s\_gra}(r_{gra})}{dr_{gra}}\bigg|_{r_{gra}=R_{gra}} = \frac{-I_{gra}}{L_2 a_{s\_gra} F} \quad (10)$$

A diffusion equation of the polar coordinate system regarding the silicon particle 21 is represented as Expression (11). Expression (11) is different from the diffusion equations (Expressions (7) and (9)) regarding the two other particles (the positive electrode particle 1 and the graphite particle 22) in that a diffusion term for taking into consideration diffusion of lithium inside the silicon particle 21 due to the surface stress $\sigma_{sur}$ is included in a second term on the right side.

$$\frac{\partial c_{s\_Si}(r)}{\partial t} = \nabla \cdot D_{s\_Si}\left(\nabla c_{s\_Si}(r) - \frac{\Omega c_{s\_Si}(r)}{RT}\nabla \sigma_h(r)\right) \quad (11)$$

In more detail, the diffusion term resulting from the surface stress $\sigma_{sur}$ is represented as Expression (12) using hydrostatic stress $\sigma_h(r)$ of the silicon particle 21 in the electrolyte. In Expression (12), it is assumed that the negative electrode active substance (in the battery model, the silicon particle 21) is not plastically deformed, a Young's modulus and a Poisson's ratio of the silicon particle 21 within an elastic limit range are represented by E and $\nu$, respectively. Total stress applied to the silicon particle 21 from the peripheral member is represented by $F_{ex}$.

$$\sigma_h(r) = \frac{2\Omega E}{9(1-\nu)}(c_{s\_Si\_ave} - c_{s\_Si}(r)) + F_{ex} \quad (12)$$

In a case where the Expression (12) representing the hydrostatic stress $\sigma_h(r)$ is substituted in Expression (11) as a diffusion equation, Expression (11) is modified as follows (see Expression (13) described below).

$$\frac{\partial c_{s\_Si}(r)}{\partial t} = \nabla \cdot D_{s\_Si}\left[\begin{array}{c}\nabla c_{s\_Si}(r) - \\ \frac{\Omega c_{s\_Si}(r)}{RT}\nabla\left(\frac{2\Omega E}{9(1-\nu)}(c_{s\_Si\_ave} - c_{s\_Si}(r)) + F_{ex}\right)\end{array}\right] \quad (13)$$

$$= \nabla \cdot D_{s\_Si}\left(1 + \frac{2\Omega^2 E c_{s\_Si}(r)}{9RT(1-\nu)}\right)\nabla c_{s\_Si}(r)$$

Expression (13) is deformed as Expression (15) described below using an effective diffusion coefficient $D_{s\_Si}^{eff}$ to be defined by Expression (14). Since the effective diffusion coefficient $D_{s\_Si}^{eff}$ has a positive value, it is understood from Expression (15) that the surface stress $\sigma_{surf}$ is applied in a direction of promoting lithium diffusion in the silicon particle 21. It is also understood that the influence of the surface stress $\sigma_{surf}$ is determined according to the lithium concentration $c_{s\_Si}$ at each point (each lattice point where the diffusion equation is computed) in the silicon particle 21.

$$D_{s\_Si}^{eff} = D_{s\_Si}\left(1 + \frac{2\Omega^2 E c_{s\_Si}(r)}{9RT(1-\nu)}\right) \quad (14)$$

$$\frac{\partial c_{s\_Si}(r)}{\partial t} = \nabla \cdot D_{s\_Si}^{eff} \nabla c_{s\_Si}(r) \quad (15)$$

A boundary condition of the diffusion equation (Expression (14)) is represented to further include a term depending on the hydrostatic stress $\sigma_h(r)$ as Expression (16) described below compared to the boundary conditions (see Expressions (8) and (10)) regarding to the two other particles (the positive electrode particle 1 and the graphite particle 22).

$$-D_{s\_Si}\left(\nabla c_{s\_Si}(r) - \frac{\Omega c_{s\_Si}(r)}{RT}\nabla \sigma_h(r)\right)\bigg|_{r=surf} = \frac{-I_{Si}}{L_2 a_{s\_Si} F} \quad (16)$$

In this way, the concentration distribution calculation unit 131 calculates the lithium concentration distributions inside the three particles (the positive electrode particle 1, the silicon particle 21, and the graphite particle 22). The calculated lithium concentration distributions are output to the lithium amount calculation unit 132.

The lithium amount calculation unit 132 receives the lithium concentration distributions ($c_{s1}$, $c_{s\_Si}$, $c_{s\_gra}$) inside the three particles from the concentration distribution calculation unit 131, calculates various lithium amounts, and outputs the lithium amounts to other functional blocks.

Specifically, the lithium amount calculation unit 132 calculates the surface lithium amount $\theta_{1\_surf}$ of the positive electrode particle 1 based on the lithium concentration distribution $c_{s1}$ of the positive electrode particle 1 (see Expression (2)). Similarly, the lithium amount calculation unit 132 calculates the surface lithium amount $\theta_{Si\_surf}$ of the silicon particle 21 based on the lithium concentration distribution $c_{s\_Si}$ of the silicon particle 21, and calculates the surface lithium amount $\theta_{gra\_surf}$ of the graphite particle 22 based on the lithium concentration distribution $c_{s\_gra}$ of the graphite particle 22. The calculated surface lithium amounts $\theta_{1\_surf}$, $\theta_{Si\_surf}$, $\theta_{gra\_surf}$ are output to the open circuit potential calculation unit 135.

The lithium amount calculation unit 132 calculates the average lithium amount $\theta_{1\_ave}$ based on the lithium concentration distribution $c_{s1}$ of the positive electrode particle 1 according to Expression (3). Similarly, the lithium amount calculation unit 132 calculates the average lithium amount $\theta_{Si\_ave}$ of the silicon particle 21 based on the lithium concentration distribution $c_{s\_Si}$ of the silicon particle 21, and calculates the average lithium amount $\theta_{gra\_ave}$ of the graphite particle 22 based on the lithium concentration distribution $c_{s\_gra}$ of the graphite particle 22. The calculated average lithium amount $\theta_{Si\_ave}$ is output to the surface stress calculation unit 133.

The surface stress calculation unit 133 calculates the surface stress $\sigma_{surf}$ based on the average lithium amount $\theta_{Si\_ave}$ from the lithium amount calculation unit 132. A calculation method of the surface stress $\sigma_{surf}$ will be described below in detail. The calculated surface stress $\sigma_{surf}$ is output to the open circuit potential change amount calculation unit 134. The calculated total stress $F_{ex}$ is output to the concentration distribution calculation unit 131.

The open circuit potential change amount calculation unit 134 calculates an amount of change in open circuit potential $\Delta V_{stress}$ based on the surface stress $\sigma_{surf}$ from the surface stress calculation unit 133. The amount of change in open circuit potential $\Delta V_{stress}$ is an amount of change in open circuit potential of the silicon particle 21 due to the surface stress $\sigma_{surf}$. In a case where a state in which the surface stress $\sigma_{surf}$ is not generated is referred to as an "ideal state", and the open circuit potential of the silicon particle 21 in the ideal state is referred to as an "ideal open circuit potential $U_{Si\_sta}$", the amount of change in open circuit potential $\Delta V_{stress}$ is replaced with an amount of deviation of the open circuit potential of the silicon particle 21 due to the surface stress $\sigma_{surf}$ based on the ideal open circuit potential $U_{Si\_sta}$. The amount of change in open circuit potential $\Delta V_{stress}$ is calculated from the surface stress $\sigma_{surf}$ according to Expression (17) using an amount of change in volume $\Omega$ of a silicon-based compound per mol of lithium and a Faraday constant F. The calculated amount of change in open circuit potential $\Delta V_{stress}$ is output to the open circuit potential calculation unit 135.

$$\Delta V_{stress} = \frac{\sigma_{surf}\Omega}{F} \tag{17}$$

The open circuit potential calculation unit 135 calculates the open circuit potential $U_1$ of the positive electrode particle 1 based on the surface lithium amount $\theta_{1\_surf}$ of the positive electrode particle 1 from the lithium amount calculation unit 132. More specifically, although the positive electrode particle 1 is virtually divided into the N regions in the radial direction, the open circuit potential $U_1$ of the positive electrode particle 1 is determined according to the local lithium amount $\theta_{IN}$ (the surface lithium amount $\theta_{1\_surf}$) in the surface of the positive electrode particle 1 as the outermost circumferential region N (see Expression (18) described below). For this reason, a map (not shown) specifying the correspondence relationship between the open circuit potential $U_1$ and the surface lithium amount $\theta_{1\_surf}$ is created by a pre-experiment, whereby the open circuit potential $U_1$ can be calculated from the surface lithium amount $\theta_{1\_surf}$. In regard to the graphite particle 22, similarly, the open circuit potential calculation unit 135 calculates the open circuit potential $U_{gra}$ from the surface lithium amount $\theta_{gra\_surf}$ of the graphite particle 22 by referring to a predetermined map (not shown) (see Expression (19) described below).

$$U_1 = U_1(\theta_{1\_surf}) \tag{18}$$

$$U_{gra} = U_{gra}(\theta_{gra\_surf}) \tag{19}$$

In calculating the open circuit potential $U_{Si}$ of the silicon particle 21, the influence of the surface stress $\sigma_{surf}$ is taken into consideration. The open circuit potential $U_{Si}$ is calculated by adding the amount of change in open circuit potential $\Delta V_{stress}$ to the open circuit potential $U_{Si\_sta}$ of the silicon particle 21 in a state in which the surface stress $\sigma_{surf}$ is not generated as shown in Expression (20) described below. The open circuit potentials $U_1$, $U_{Si}$, $U_{gra}$ calculated according to Expressions (18) to (20) are output to the current distribution unit 152.

$$U_{Si} = U_{Si\_sta}(\theta_{Si\_surf}) + \Delta V_{stress} \tag{20}$$

A concentration $c_e$ of lithium salt in the electrolyte may change with charging and discharging of the battery 4, and a concentration gradient of lithium salt in the electrolyte may occur. When this happens, a salt concentration overvoltage $\Delta V_e$ is generated between the positive electrode active substance (the positive electrode particle 1) and the negative electrode active substance (the silicon particle 21 and the graphite particle 22) due to the concentration gradient of lithium salt, and is likely to affect the positive electrode potential $V_1$ and the negative electrode potential $V_2$.

The salt concentration difference calculation unit 141 calculates a concentration difference $\Delta c_e$ of lithium salt between the positive electrode active substance and the negative electrode active substance. Since the concentration difference $\Delta c_e$ of lithium salt depends on a diffusion coefficient $D_e$ of the electrolyte, a volume fraction $\varepsilon_e$ of the electrolyte, a transport number $t_+^0$ of lithium ions, and a current (total current $I_T$), for example, the concentration difference $\Delta c_e$ of lithium salt can be calculated according to Expressions (21) to (23) described below. Since Expression (21) as a recurrence equation is repeatedly solved in each predetermined computation cycle, in Expressions (21) to (23), the computation cycle is represented by $\Delta \tau$. A parameter attached with t on the shoulder (upper right side) indicates a parameter at the time of the present computation, and a parameter attached with (t−Δτ) on the shoulder indicates a parameter at the time of the previous computation. The calculated concentration difference $\Delta c_e$ is output to the salt concentration overvoltage calculation unit 142.

$$\Delta c_e^t = (1 - \alpha_e)\Delta c_e^{t-\Delta\tau} + \beta_e I_T \tag{21}$$

$$\alpha_e = \frac{2\varepsilon^{0.5}}{L\Delta x} D_e \Delta \tau \tag{22}$$

$$\beta_e = \frac{1 - t_+^0}{F\varepsilon_e L}\Delta\tau \tag{23}$$

The salt concentration overvoltage calculation unit 142 calculates the salt concentration overvoltage $\Delta V_e$ from the concentration difference $\Delta c_e$ of lithium salt calculated by the salt concentration difference calculation unit 141 according to Expression (24). The calculated salt concentration overvoltage $\Delta V_e$ is output to the current distribution unit 152.

$$\Delta V_e = \frac{4RT(t_+^0 - 1)}{Fc_{e\_ini}}\Delta c_e \tag{24}$$

The convergence condition determination unit 151 and the current distribution unit 152 execute computation processing using an iteration method for calculating various potential components of the battery 4. In the embodiment, a Newton's law as one of representative iteration methods is used. Note that the kind of the iteration method is not limited thereto, a solution of a nonlinear equation, such as a bisection method or a secant method, may be used.

In the computation of the above-described functional blocks, the currents ($I_T$, $I_{Si}$, $I_{gra}$) flowing in the three particles set by the current distribution unit 152 at the time of the previous computation are used. The convergence condition determination unit 151 receives a calculation result based on the currents set at the time of the previous computation from other functional blocks. In more detail, the convergence condition determination unit 151 receives the reaction overvoltages $\eta_1$, $\eta_{Si}$, $\eta_{gra}$ from the reaction overvoltage calculation unit 122 (see Expressions (4) to (6)), receives the open circuit potentials $U_1$, $U_{Si}$, $U_{gra}$ from the open circuit potential calculation unit 135 (see Expressions (18) to (20)), receives the measured voltage $V_{meas}$ (a measured value of the voltage of the battery 4) from the parameter setting unit 110, and receives the salt concentration overvoltage $\Delta V_e$ from the salt concentration overvoltage calculation unit 142 (see Expression (24)). The convergence condition determination unit 151 (not shown) receives a direct-current resistance $R_d$ from the parameter setting unit 110 (details will be described below).

The convergence condition determination unit 151 calculates the voltage of the battery 4 from the positive electrode potential $V_1$, the negative electrode potential $V_2$, an amount of voltage drop ($=I_T R_d$) due to the direct-current resistance $R_d$, and the salt concentration overvoltage $\Delta V_e$ according to a relational expression (25) described above to be established between a voltage and a current. The calculated voltage is described as a "calculated voltage $V_{calc}$" to be distinguished from the measured voltage $V_{meas}$ (a measured value of the voltage sensor 71).

$$V_1 - V_2 - I_T R_d - \Delta V_e = V_{calc} \qquad (25)$$

In Expression (25), the positive electrode potential $V_1$ is calculated by Expression (26). The negative electrode potential $V_2$ is calculated as being equal to the silicon potential $V_{Si}$ shown in Expression (27) and the graphite potential $V_{gra}$ shown in Expression (28) ($V_2 = V_{Si} = V_{gra}$).

$$U_1 + \eta_1 = V_1 \qquad (26)$$

$$U_{Si} + \eta_{Si} = V_{Si} \qquad (27)$$

$$U_{gra} + \eta_{gra} = V_{gra} \qquad (28)$$

Then, the convergence condition determination unit 151 determines whether or not the convergence condition of the iteration method is satisfied by comparing the calculated voltage $V_{calc}$ with the measured voltage $V_{meas}$ and comparing the silicon potential $V_{Si}$ with the graphite potential $V_{gra}$. Specifically, the convergence condition determination unit 151 determines whether or not the calculated voltage $V_{calc}$ and the measured voltage $V_{meas}$ substantially coincide with each other (an error between these voltages is less than a first predetermined value PD1), and the silicon potential $V_{Si}$ and the graphite potential $V_{gra}$ substantially coincide with each other (an error between these voltages is less than a second predetermined value PD2). In a case where the error ($=|V_{calc} - V_{meas}|$) between the calculated voltage $V_{calc}$ and the measured voltage $V_{meas}$ is equal to or greater than the first predetermined value PD1 or in a case where the error ($=|V_{Si} - V_{gra}|$) between the silicon potential $V_{Si}$ and the graphite potential $V_{gra}$ is equal to or greater than the second predetermined value PD2, the convergence condition determination unit 151 outputs, to the current distribution unit 152, a determination result that the convergence condition of the iteration method is not satisfied.

In a case where the determination result to the effect that the convergence condition is not satisfied is received from the convergence condition determination unit 151, the current distribution unit 152 updates the currents ($I_T$, $I_{Si}$, $I_{gra}$) flowing in the three particles to values for using at the time of next computation. In more detail, the current distribution unit 152 sets the silicon current $I_{Si}$ and the total current $I_T$ to be used at the time of next computation from the silicon currents $I_{Si}$ and the total currents $I_T$ used at the time of the previous computation and at the time of the present computation using an algorithm of the Newton's law (or a bisection method, a secant method, or the like). The remaining graphite current $I_{gra}$ is calculated from the silicon current $I_{Si}$ and the total current $I_T$ according to the relationship among the currents shown in Expression (29). The calculated currents are output to the parameter setting unit 110. Then, the current values after update are used at the time of next computation.

$$I_{Si} + I_{gra} = I_T \qquad (29)$$

In this way, the convergence condition determination unit 151 and the current distribution unit 152 execute the computation processing iteratively until the error between the calculated voltage $V_{calc}$ and the measured voltage $V_{meas}$ becomes less than the first predetermined value PD1, and the error between the silicon potential $V_{Si}$ and the graphite potential $V_{gra}$ becomes less than the second predetermined value PD2. In a case where both of the two errors become less than the corresponding predetermined values (PD1, PD2), determination is made that the iterative computation processing is converged, and the convergence condition determination unit 151 outputs the parameters (the positive electrode open circuit potential $U_1$, the surface lithium amount $\theta_{1\_surf}$, and the amount of change in open circuit potential $\Delta V_{stress}$) needed for SOC estimation to the SOC estimation unit 160.

The SOC estimation unit 160 estimates the SOC of the battery 4 based on various lithium amounts ($\theta_{1\_ave}$, $\theta_{1\_SOC0}$, $\theta_{1\_SOC100}$) of the positive electrode particle 1. An SOC estimation method will be described below.

Calculation of Surface Stress

Subsequently, the calculation method of the surface stress $\sigma_{surf}$ of the silicon active substance will be described in detail. In the following description, a state represented on a lithium amount of a silicon substance-silicon open circuit potential characteristic diagram as the combination ($\theta_{Si}$, $U_{Si}$) of the lithium amount $\theta_{Si}$ (for example, the average lithium amount $\theta_{Si\_ave}$) of the silicon substance and the silicon open circuit potential $U_{Si}$ is described as a "state P". In particular, the state P at the time of m-th (m is a natural number) computation is represented as "P(m)". In the embodiment, the surface stress $\sigma_{surf}$ is calculated focusing on transition of the state P.

Figure 10A:
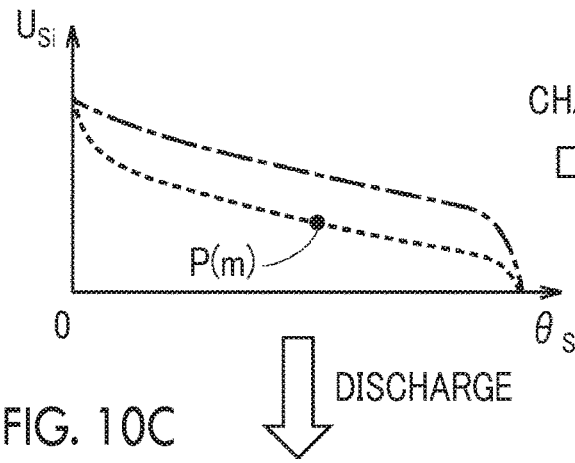
FIG. 10A is a conceptual diagram illustrating transition of a state of the battery on a silicon negative electrode surface lithium amount-silicon negative electrode open circuit potential characteristic diagram.

FIGS. 10A to 10E are conceptual diagrams illustrating transition of a state P of the battery on a silicon negative electrode surface lithium amount-silicon negative electrode open circuit potential characteristic diagram. In FIG. 10A, an example where the state P(m) is plotted on a charging curve (indicated by a broken line) is shown.

Figure 10B:
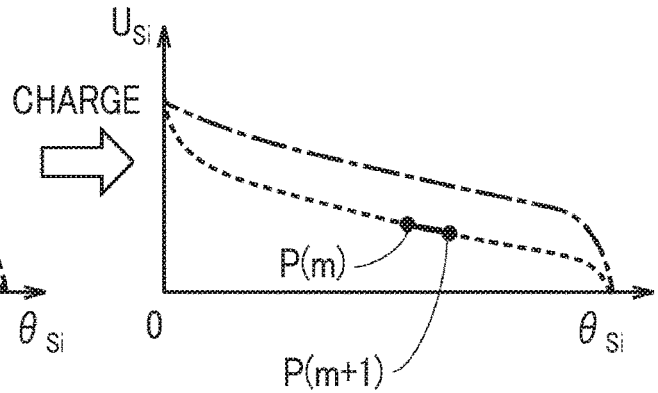
FIG. 10B is a conceptual diagram illustrating transition of a state of the battery on a silicon negative electrode surface lithium amount-silicon negative electrode open circuit potential characteristic diagram.

In a case where charging is continued from the state P(m), a state P(m+1) in an (m+1)th computation cycle is maintained on the charging curve as shown in FIG. 10B.

Figure 10C:
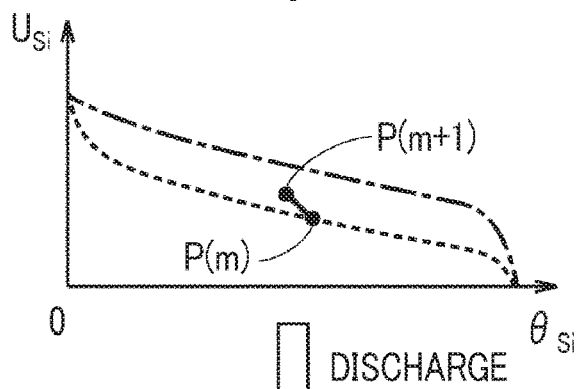
FIG. 10C is a conceptual diagram illustrating transition of a state of the battery on a silicon negative electrode surface lithium amount-silicon negative electrode open circuit potential characteristic diagram.
Figure 10D:
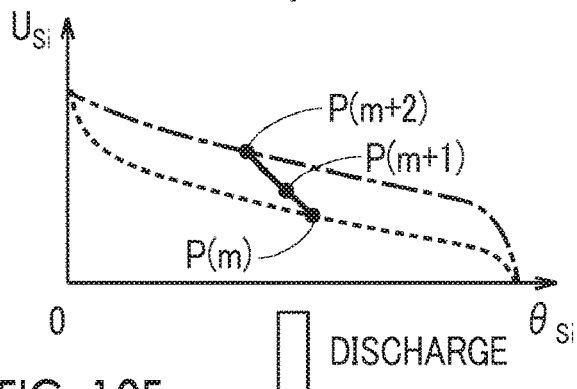
FIG. 10D is a conceptual diagram illustrating transition of a state of the battery on a silicon negative electrode surface lithium amount-silicon negative electrode open circuit potential characteristic diagram.
Figure 10E:
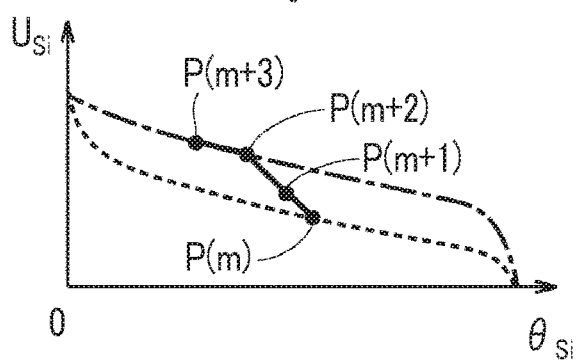
FIG. 10E is a conceptual diagram illustrating transition of a state of the battery on a silicon negative electrode surface lithium amount-silicon negative electrode open circuit potential characteristic diagram.

In case where discharging is performed from the state P(m) shown in FIG. 10A, as shown in FIG. 10C, the state P(m+1) in the (m+1)th computation cycle is deviated from the charging curve, and is plotted in a region between the charging curve and a discharging curve (indicated by a one-dot-chain line). In a case where discharging is continued, for example, in an (m+2)th computation cycle, a state P(m+2) reaches the discharging curve (see FIG. 10D). In a case where discharging is continued thereafter, a state P(m+ 3) is maintained on the discharging curve (see FIG. 10E).

Figure 11:
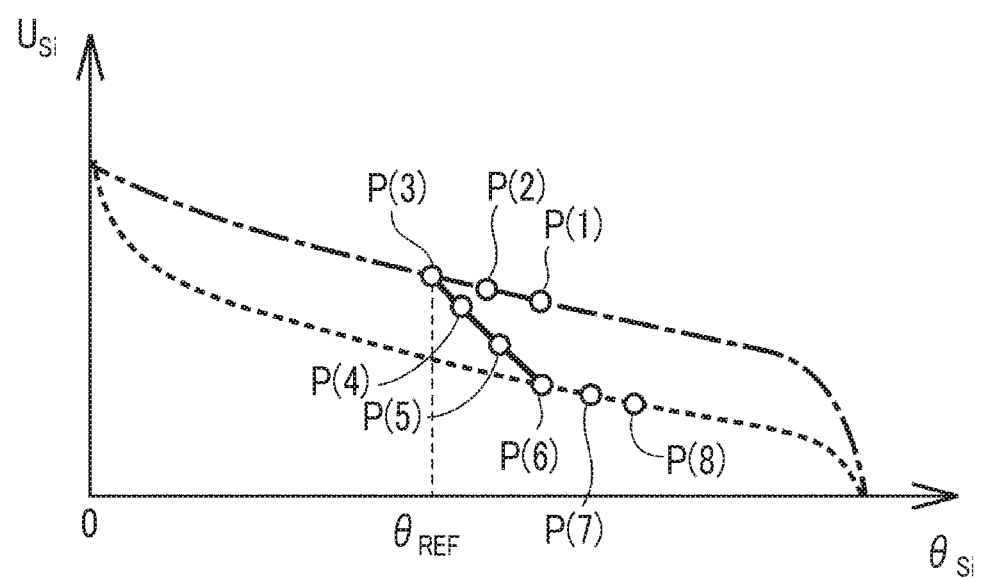
FIG. 11 is a graph illustrating a calculation method of surface stress.

FIG. 11 is a graph illustrating the calculation method of the surface stress $\sigma_{surf}$ of the silicon active substance. In FIG. 11, an example where charging and discharging are performed in an order of states P(1) to P(8).

In more detail, first, discharging is started from the state P(1) on the discharging curve, and discharging is continued until the state P(3). The states P(2), P(3) are maintained on the discharging curve. Then, in the state P(3), switching from discharging to charging is performed. The states P(4), P(5) after charging is started transit in a region between the charging curve and the discharging curve. Thereafter, the state P(6) is plotted on the charging curve. While charging is further continued, the state P is maintained on the charging curve (see the states P(7), P(8)).

In the states P(1) to P(3) that are plotted on the discharging curve, the surface stress $\sigma_{surf}$ is yielded and is equal to the tensile yield stress $\sigma_{ten}$ as shown in Expression (30) described below.

$$\sigma_{surf} = \sigma_{ten} \quad (30)$$

In the states P(6) to P(8) on the charging curve, the surface stress $\sigma_{surf}$ is yielded at the compressive yield stress $\sigma_{com}$ (see Expression (31) described below).

$$\sigma_{surf} = \sigma_{com} \quad (31)$$

In contrast, in a case where the state P is not plotted on the charging curve and the discharging curve, that is, in a case where the state P is plotted in the region between the charging curve and the discharging curve (see the states P(4), P(5)), how to calculate the surface stress $\sigma_{surf}$ becomes a problem. In the embodiment, an average lithium concentration $c_{Si\_ave}$ in the silicon particle 21 when a charging or discharging direction is switched and the surface stress $\sigma_{surf}$ at this time are used in calculating the surface stress $\sigma_{surf}$ in the region. In the following description, the average lithium concentration $c_{Si\_ave}$ in the state P when the charging or discharging direction is switched is described as a "reference lithium concentration $c_{REF}$", and the surface stress $\sigma_{surf}$ in the state P is described as "reference surface stress $\sigma_{REF}$".

In the example shown in FIG. 11, the state P when the charging or discharging is switched is the state P(3) at the time of switching from discharging to charging. In calculating the states P(4), P(5), the average lithium concentration $c_{Si\_ave}$ at the time of the state P(3) is already calculated by Expressions (8) to (10) described above. Accordingly, the average lithium concentration $c_{Si\_ave}$ calculated in the state P(3) becomes the reference lithium concentration $c_{REF}$. The reference surface stress $\sigma_{REF}$ in the state P(3) is the tensile yield stress $\sigma_{ten}$ (see Expression (30) described above).

In the state P in the region between the charging curve and the discharging curve, there is a linear relationship represented as Expression (32) described below between a lithium concentration difference ($c_{Si\_ave} - c_{REF}$) obtained by subtracting the reference lithium concentration $c_{REF}$ from the average lithium concentration $c_{Si\_ave}$ and the surface stress $\sigma_{surf}$.

$$\sigma_{surf} = -\alpha_c(c_{Si\_ave} - c_{REF}) + \sigma_{REF} \quad (32)$$

It is understood that the linear relationship represents that the amount of change in surface stress $\sigma_{surf}$ is proportional to an amount of change in lithium content in the silicon particle 21 (an amount of lithium inserted into the silicon particle 21 or an amount of lithium desorbed from the silicon particle 21) in a case where the state P when the charging or discharging direction is switched is used as a reference.

A proportional constant $\alpha_c$ is a parameter that is determined according to mechanical characteristics of the silicon-based compound as one of the negative electrode active substance and the peripheral member, and can be obtained by an experiment. In more detail, the proportional constant $\alpha_c$ may change according to the temperature ($\cong$ the temperature TB of the battery 4) of the silicon active substance and the lithium content (average lithium concentration $c_{Si\_ave}$) in the negative electrode active substance. For this reason, the proportional constant $\alpha_c$ is obtained for various combinations of the temperature TB and the average lithium concentration $c_{Si\_ave}$, and a map (or a relational expression) indicating the correlation relationship of the temperature TB, the average lithium concentration $c_{Si\_ave}$, and the proportional constant $\alpha_c$ is prepared. A map indicating the correlation relationship between one of the temperature TB and the average lithium concentration $c_{Si\_ave}$ and the proportional constant $\alpha_c$ may be prepared.

Since the lithium concentration and the lithium amount can be replaced as Expression (2) described above, Expression (32) described above may be modified as Expression (33) described below using the average lithium amount $\theta_{Si\_ave}$ of the silicon particle 21.

$$\sigma_{surf} = -\alpha_\theta(\theta_{Si\_ave} - \theta_{REF}) + \sigma_{REF} \quad (33)$$

A map indicating the correlation relationship of the temperature TB, and the average lithium amount $\theta_{Si\_ave}$ and the proportional constant $\alpha_c$ (or a proportional constant $\alpha_\theta$) is prepared and is stored in advance in the memory 100B of the ECU 100. For this reason, the proportional constant $\alpha_c$ can be calculated from the temperature TB (the measured value of the temperature sensor 72) and the average lithium amount $\theta_{Si\_ave}$ (an estimated value at the time of the previous computation) by referring to the map. Then, the surface stress $\sigma_{surf}$ in the above-described region can be calculated by substituting the proportional constant $\alpha_c$, the average lithium amount $\theta_{Si\_ave}$, the reference lithium amount $\theta_{REF}$, and the reference surface stress $\sigma_{REF}$ in Expression (33) described above. A calculation flow of the surface stress $\sigma_{surf}$ will be described in detail referring to FIG. 14.

SOC Estimation Flow

Figure 12:
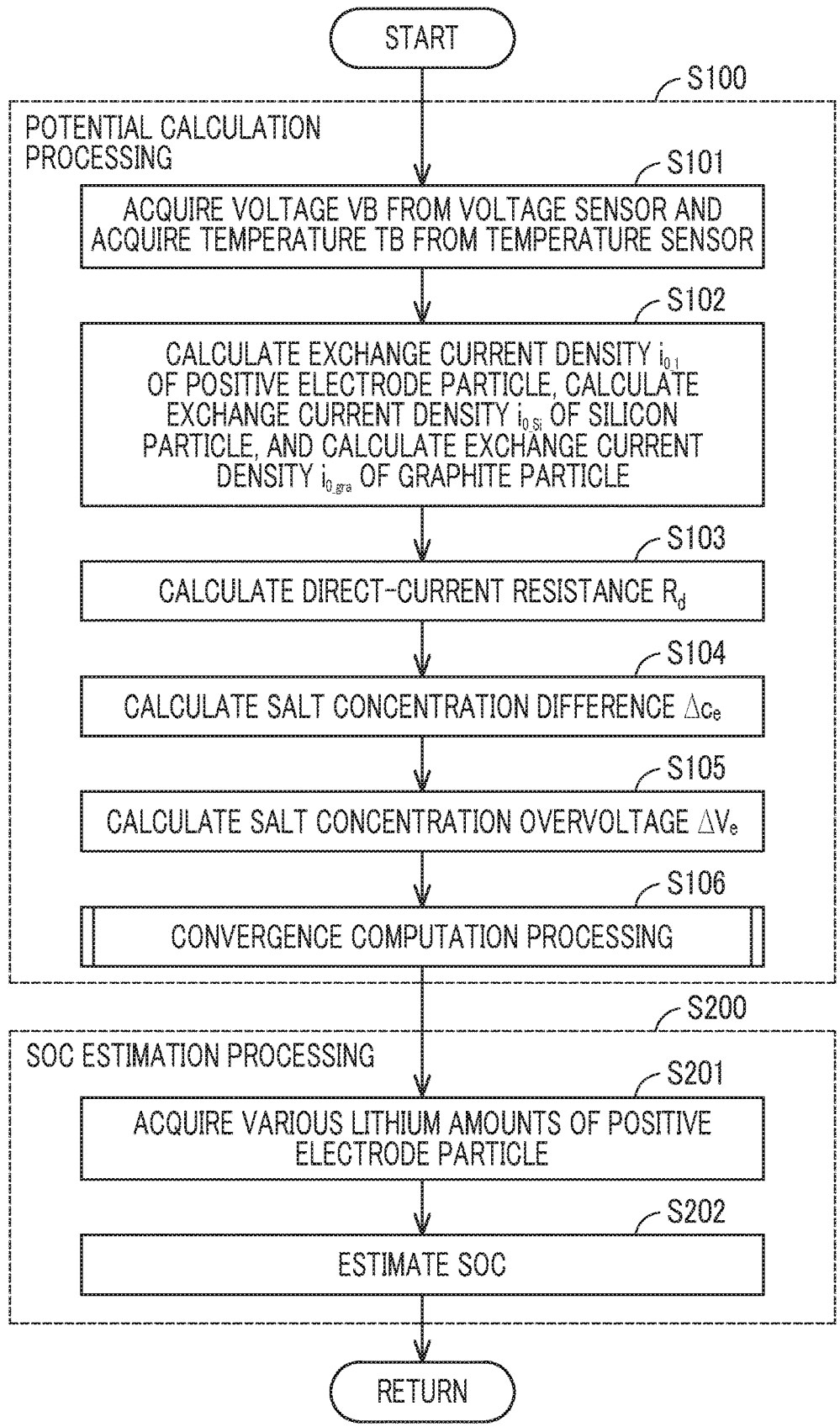
FIG. 12 is a flowchart showing a series of processing for estimating an SOC of the battery in Embodiment 1.

FIG. 12 is a flowchart showing a series of processing for estimating the SOC of the battery 4 in Embodiment 1. Flowcharts shown in FIG. 12 and FIGS. 17 and 16 described below are called from a main routine (not shown), for example, each time a predetermined cycle has elapsed and are repeatedly executed by the ECU 100. Although steps (hereinafter, abbreviated as "S") included in the flowcharts are basically implemented through software processing in the ECU 100, the steps may be implemented by dedicated hardware (electric circuit) manufactured in the ECU 100.

Referring to FIG. 12, processing of S101 to S106 described below corresponds to single electrode potential calculation processing according to Embodiment 1. First, in S101, the ECU 100 acquires the voltage VB of the battery 4 from the voltage sensor 71, and acquires the temperature TB of the battery 4 from the temperature sensor 72. The voltage VB is used as the measured voltage $V_{meas}$, and the temperature TB is converted to the absolute temperature T. The absolute temperature T may be calculated from the temperature TB at the current time (at the time of the present computation) or may be calculated from a weighted average of the temperature TB in a last predetermined period (for example, for 30 minutes) determined in advance.

In S102, the ECU 100 calculates the exchange current density $i_{0\_1}$ of the positive electrode particle 1. As described referring to FIG. 9, the exchange current density $i_{0\_1}$ depends on the surface lithium amount $\theta_{1\_surf}$ of the positive electrode particle 1 and the absolute temperature T. Accordingly, the ECU 100 calculates the exchange current density $i_{0\_1}$ from the surface lithium amount $\theta_{1\_surf}$ (see S303 of FIG. 13) calculated at the time of the previous computation and the absolute temperature T by referring to the map (not shown) specifying the correspondence relationship of the exchange current density $i_{0\_1}$, the surface lithium amount $\theta_{1\_surf}$, and the absolute temperature T. Similarly, the ECU 100 calculates the exchange current density $i_{0\_Si}$ of the silicon particle 21 and the exchange current density $i_{0\_gra}$ of the graphite particle 22 by referring to the corresponding maps (not shown).

In S103, the ECU 100 calculates the direct-current resistance $R_d$ of the battery 4. The direct-current resistance $R_d$ is a resistive component when lithium ions and electrons move between the positive electrode active substance and the negative electrode active substance or a resistive component of a metal portion. The direct-current resistance $R_d$ has a characteristic that changes depending on the absolute temperature T and lithium amount $\theta_1$. Accordingly, the direct-current resistance $R_d$ can be calculated from the absolute temperature T by preparing a map (not shown) specifying the correspondence relationship between the direct-current resistance $R_d$ and the absolute temperature T in advance based on a measurement result of the direct-current resistance $R_d$ at each temperature.

In S104, the ECU 100 calculates the concentration difference $\Delta c_e$ of lithium salt between the positive electrode active substance and the negative electrode active substance in the electrolyte (see Expressions (21) to (23) described above). In addition, the ECU 100 calculates the salt concentration overvoltage $\Delta V_e$ from the concentration difference $\Delta c_e$ of lithium salt according to Expression (24) described above (S105). These kinds of processing have been described in detail referring to FIG. 9, and thus, description will not be repeated.

In S106, the ECU 100 executes convergence computation processing for distributing the current (total current $I_T$) flowing in the negative electrode active substance in the three-particle model into the current (silicon current $I_{Si}$) flowing in the silicon particle 21 and the current (graphite current $I_{gra}$) flowing in the graphite particle 22.

In S200, the ECU 100 estimates the SOC of the battery 4 based on a result of the potential calculation processing (SOC estimation processing). The SOC estimation processing will be described below.

Figure 13:
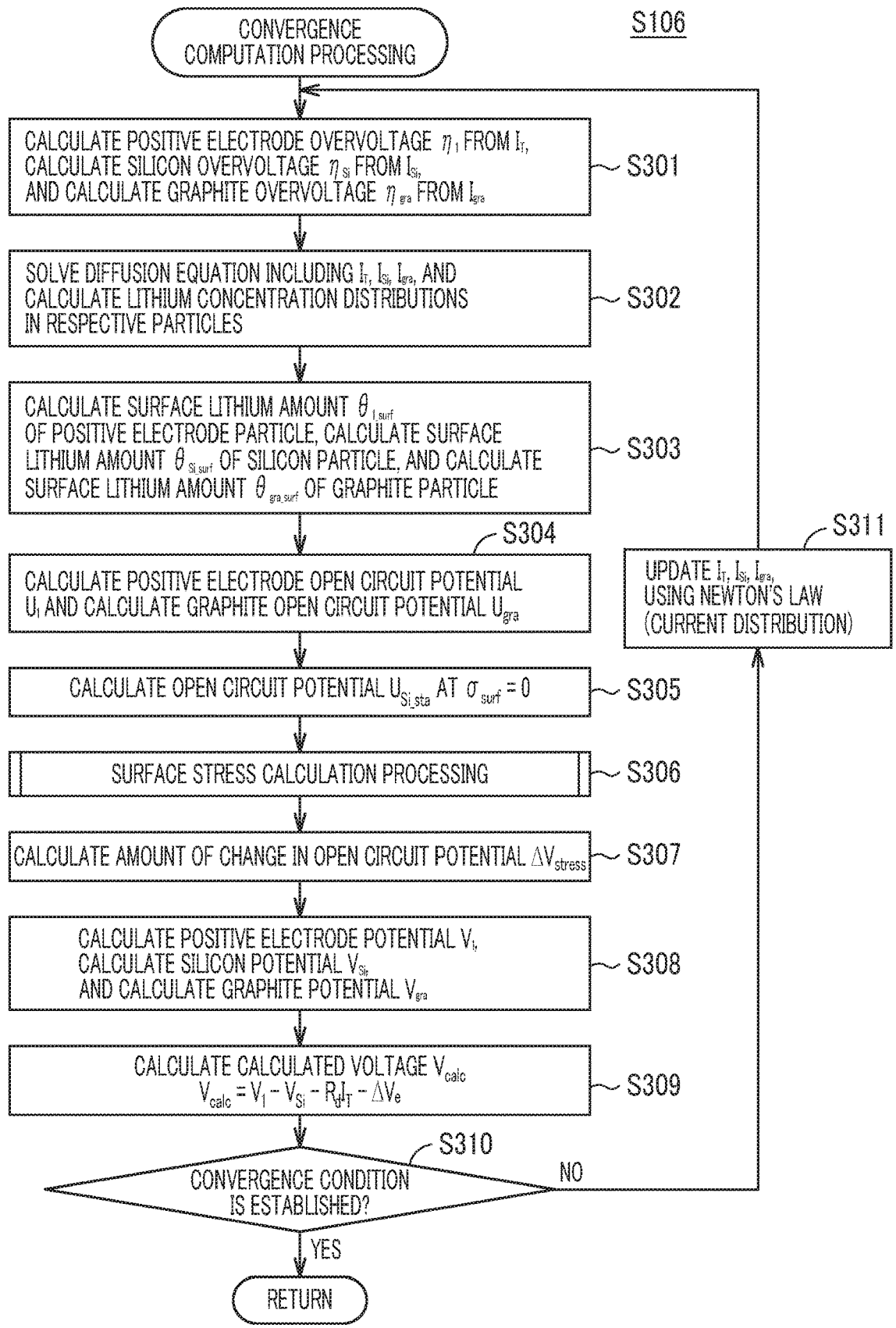
FIG. 13 is a flowchart showing convergence computation processing in Embodiment 1.

FIG. 13 is a flowchart showing the convergence computation processing (the processing of S106 of FIG. 12) in Embodiment 1. Referring to FIG. 13, in S301, the ECU 100 calculates the reaction overvoltage $\eta_1$ of the positive electrode particle 1 from the exchange current density $i_{0\_1}$ of the positive electrode particle 1 and the absolute temperature T according to Expression (4) described above. Furthermore, the ECU 100 calculates the reaction overvoltage $\eta_{Si}$ of the silicon particle 21 from the exchange current density $i_{0\_Si}$ of the silicon particle 21 and the absolute temperature T according to Expression (5) described above, and calculates the reaction overvoltage $\eta_{gra}$ of the graphite particle 22 from the exchange current density $i_{0\_gra}$ of the graphite particle 22 and the absolute temperature T according to Expression (6) described above.

In S302, in regard to the positive electrode particle 1, the ECU 100 calculates the lithium concentration distribution inside the positive electrode particle 1 by substituting the diffusion coefficient $D_{s1}$ of lithium in the positive electrode particle 1 in Expression (7) described above as a diffusion equation and solving Expression (7) under the boundary condition (see Expression (8) described above) determined according to the total current $I_T$. The diffusion coefficient $D_{s1}$ depends on the lithium amount $\theta_1$ of the positive electrode particle 1 and the absolute temperature T. Thus, the diffusion coefficient $D_{s1}$ can be calculated from the lithium amount $\theta_1$ at the time of the previous computation and the absolute temperature T using the map (not shown) prepared in advance.

In regard to the graphite particle 22, similarly, the ECU 100 calculates the lithium concentration distribution inside the graphite particle 22 by solving the diffusion equation (9) under the boundary condition (see Expression (10) described above). In addition, the ECU 100 calculates the lithium concentration distribution inside the silicon particle 21 by solving the diffusion equation (15), in which the effective diffusion coefficient $D_{s\_Si}^{eff}$ (see Expression (14)) is substituted, under the boundary condition (see Expression (16)).

In S303, the ECU 100 calculates the surface lithium amount $\theta_{1\_surf}$ of the positive electrode particle 1 based on the lithium concentration distribution inside the positive electrode particle 1 calculated in S302 (see Expression (2) described above). Similarly, the ECU 100 calculates the surface lithium amount $\theta_{Si\_surf}$ of the silicon particle 21, and calculates the surface lithium amount $\theta_{gra\_surf}$ of the graphite particle 22.

In S304, the ECU 100 calculates the open circuit potential $U_1$ from the surface lithium amount $\theta_{1\_surf}$ calculated in S303 by referring to the map (not shown) specifying the correspondence relationship between the open circuit potential $U_1$ and the lithium amount $\theta_1$ of the positive electrode particle 1 (see Expression (18)). Similarly, the ECU 100 calculates the open circuit potential $U_{gra}$ from the surface lithium amount $\theta_{gra\_surf}$ by referring to the map (not shown) specifying the correspondence relationship between the open circuit potential $U_{gra}$ and the lithium amount $\theta_{gra}$ of the graphite particle 22 (see Expression (19)).

In S305, the ECU 100 calculates the open circuit potential $U_{Si\_sta}$ from the surface lithium amount $\theta_{Si\_surf}$ by referring to the map (not shown) specifying the correspondence relationship between the open circuit potential $U_{Si}$ and the lithium amount $\theta_{Si}$ of the silicon particle 21 in the ideal state, in which the surface stress $\sigma_{surf}=0$.

In S306, the ECU 100 executes surface stress calculation processing of the silicon particle 21 for calculating the surface stress $\sigma_{surf}$.

Figure 14:
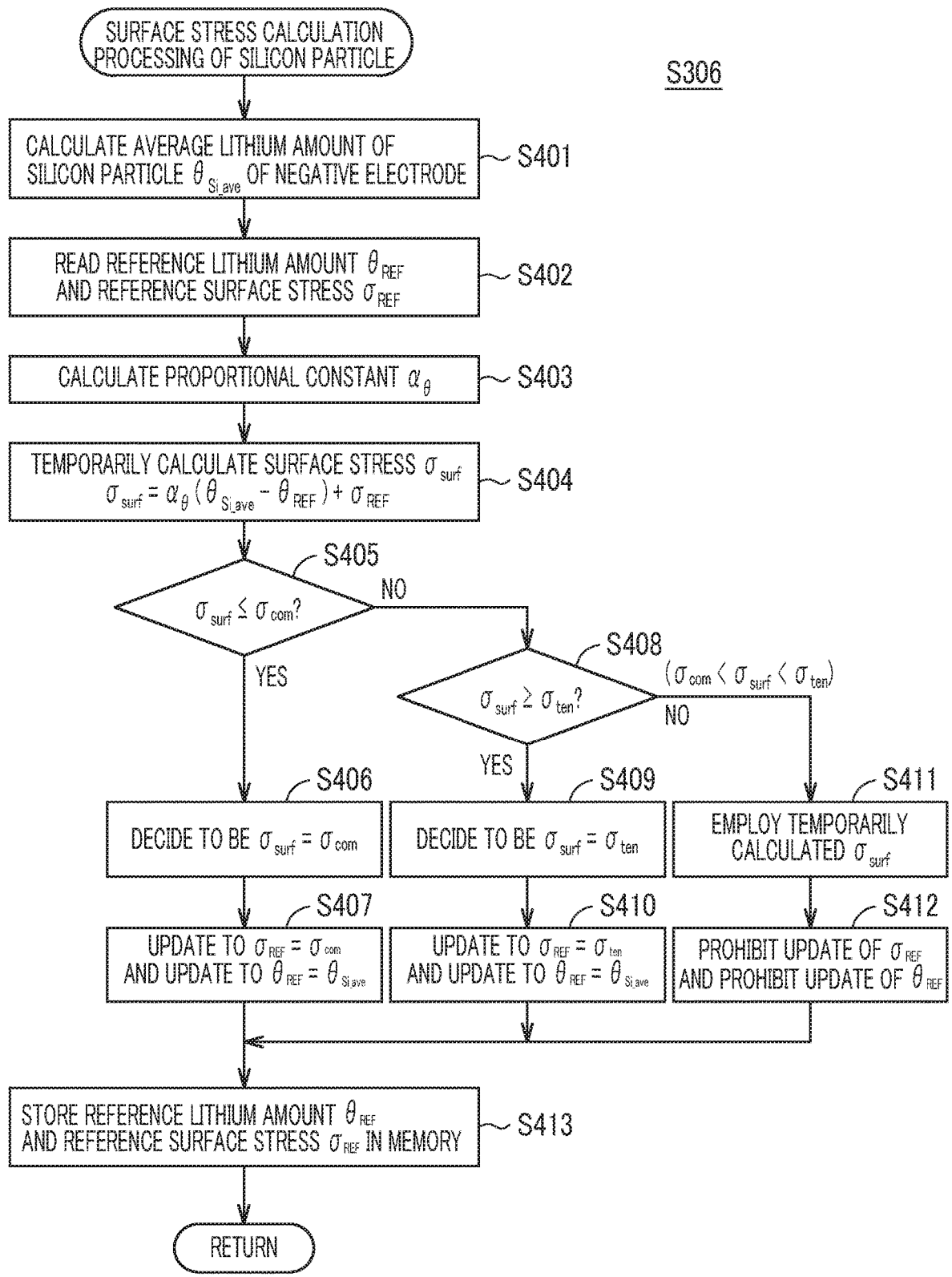
FIG. 14 is a flowchart showing surface stress calculation processing.

FIG. 14 is a flowchart showing the surface stress calculation processing of the silicon particle 21 (the processing of S306 of FIG. 13). Referring to FIG. 14, in S401, the ECU 100 calculates the average lithium amount $\theta_{Si\_ave}$ in the silicon particle 21. The average lithium amount $\theta_{Si\_ave}$ can be calculated in the same manner as Expression (3) described above relating to the positive electrode particle 1.

In S402, the ECU 100 reads the reference lithium amount $\theta_{REF}$ and the reference surface stress $\sigma_{REF}$ stored in the memory 100B until the previous computation (see processing of S413 described below).

In S403, the ECU 100 calculates the proportional constant $\alpha_\theta$ from the temperature TB of the battery 4 and the average lithium concentration $c_{Si\_ave}$ ($c_{Si\_ave}$ at the time of the previous computation) by referring to the map (not shown). The proportional constant $\alpha_\theta$ may be calculated (simulatively predicted) from physical properties (Young's modulus or the like) of the negative electrode active substance and the peripheral member. Note that the proportional constant $\alpha_\theta$ does not need to be variable, and a fixed value determined in advance may be used as the proportional constant $\alpha_\theta$.

In S404, the ECU 100 calculates the surface stress $\sigma_{surf}$ from the proportional constant $\alpha_\theta$ and the average lithium amount $\theta_{Si\_ave}$ according to Expression (33) described above. The surface stress $\sigma_{surf}$ is tentatively calculated without taking into consideration the yield of the silicon active substance, and the surface stress $\sigma_{surf}$ taking into consideration the yield of the silicon active substance is decided (mainly calculated).

In S405, the ECU 100 compares the surface stress $\sigma_{surf}$ tentatively calculated in S404 with the compressive yield stress $\sigma_{com}$. In a case where the surface stress $\sigma_{surf}$ taking into consideration the sign of the surface stress $\sigma_{surf}$ shown in FIG. 4 is equal to or less than the compressive yield stress $\sigma_{com}$, that is, in a case where the magnitude of the surface stress $\sigma_{surf}$ is equal to or greater than the magnitude of the compressive yield stress $\sigma_{com}$ (in S405, YES), the ECU 100 determines that the negative electrode active substance is yielded, and that the surface stress $\sigma_{surf}$ is equal to the compressive yield stress $\sigma_{com}$ ($\sigma_{surf}=\sigma_{com}$) (S406). That is, the surface stress $\sigma_{surf}$ tentatively calculated in S404 is not employed, and the compressive yield stress $\sigma_{com}$ is employed instead thereof. Then, the ECU 100 updates the reference surface stress $\sigma_{REF}$ by setting the compressive yield stress $\sigma_{com}$ as a new reference surface stress $\sigma_{REF}$. In addition, the ECU 100 updates the reference lithium amount $\theta_{REF}$ by setting the average lithium amount $\theta_{Si\_ave}$ calculated in S401 as the reference lithium amount $\theta_{REF}$ (S407).

In a case where the surface stress $\sigma_{surf}$ taking the sign into consideration is greater than the sign compressive yield stress $\sigma_{com}$ (in a case where the magnitude of the surface stress $\sigma_{surf}$ is less than the magnitude of the compressive yield stress $\sigma_{com}$) (in S405, NO), the ECU 100 progresses the process to S408, and compares the surface stress $\sigma_{surf}$ with the tensile yield stress $\sigma_{ten}$.

In a case where the surface stress $\sigma_{surf}$ is equal to or greater than the tensile yield stress $\sigma_{ten}$ (in S408, YES), the ECU 100 determines that the negative electrode active substance is yielded, and that the surface stress $\sigma_{surf}$ is equal to the tensile yield stress $\sigma_{ten}$ (S409). Then, the ECU 100 updates the reference surface stress $\sigma_{REF}$ with the tensile yield stress $\sigma_{ten}$, and updates the reference lithium amount $\theta_{REF}$ with the average lithium amount $\theta_{Si\_ave}$ calculated in S401 (S410).

In S408, in a case where the surface stress $\sigma_{surf}$ is less than the tensile yield stress $\sigma_{ten}$ (in S408, NO), the surface stress $\sigma_{surf}$ is in the intermediate region A between the compressive yield stress $\sigma_{com}$ and the tensile yield stress $\sigma_{ten}$ ($\sigma_{com}<\sigma_{surf}<\sigma_{ten}$), and the negative electrode active substance is not yielded. Thus, the surface stress $\sigma_{surf}$ tentatively calculated in S404 is employed (S411). In this case, the reference surface stress $\sigma_{REF}$ is not updated, and the reference surface stress $\sigma_{REF}$ set at the time of the previous computation (or at the time of computation before the previous computation) is maintained. The update of the reference lithium amount $\theta_{REF}$ is not also performed (S412).

In a case where one of the processing of S407, S410, and S412 is executed, the reference lithium amount $\theta_{REF}$ and the reference surface stress $\sigma_{REF}$ are stored in the memory 100B (S413). Thereafter, the process is returned to S307 (see FIG. 13) of the convergence computation processing.

Referring to FIG. 13 again, in S307, the ECU 100 calculates the amount of change in open circuit potential $\Delta V_{stress}$ from the surface stress $\sigma_{surf}$ according to Expression (17) in order to take into consideration the influence of the surface stress $\sigma_{surf}$ at the open circuit potential $U_{Si}$ of the silicon particle 21.

In S308, the ECU 100 calculates the sum of the reaction overvoltage $\eta_1$ of the positive electrode particle 1 and the positive electrode open circuit potential $U_1$ as the positive electrode potential $V_1$ according to Expression (26) described above. Furthermore, the ECU 100 calculates the silicon open circuit potential $U_{Si}$ by adding the amount of change in open circuit potential $\Delta V_{stress}$ to the ideal open circuit potential $U_{Si\_sta}$ of the silicon particle 21 (see Expression (20) described above), and further calculates the sum of the reaction overvoltage $\eta_{Si}$ of the silicon particle 21 and the silicon open circuit potential $U_{Si}$ as the silicon potential $V_{Si}$ (see Expression (27) described above). In addition, the ECU 100 calculates the sum of the reaction overvoltage $\eta_{gra}$ of the graphite particle 22 and the graphite open circuit potential $U_{gra}$ as the graphite potential $V_{gra}$ (see Expression (28) described above).

In S309, the ECU 100 calculates the calculated voltage $V_{calc}$ from the positive electrode potential $V_1$, the negative electrode potential $V_2$ (the silicon potential $V_{Si}$ or the graphite potential $V_{gra}$), the amount of voltage drop ($=I_T R_d$) due to the direct-current resistance $R_d$, and the salt concentration overvoltage $\Delta V_c$ according to Expression (25) described above.

In S310, the ECU 100 determines whether or not a condition (convergence condition) under which the iterative computation is converged in the convergence computation processing is established. Specifically, the convergence condition includes first and second conditions. The first condition is a condition about whether or not an absolute value ($=|V_{calc}-V_{meas}|$) of the difference between the calculated voltage $V_{calc}$ calculated in S309 and the measured voltage $V_{meas}$ acquired from the voltage sensor 71 in S101 is less than the first predetermined value PD1 ($|V_{calc}-V_{meas}|<PD1$). The second condition is a condition about whether or not an absolute value ($=|V_{Si}-V_{gra}|$) of the difference between the silicon potential $V_{Si}$ and the graphite potential $V_{gra}$ calculated in S308 is less than the second predetermined value PD2 ($|V_{Si}-V_{gra}|<PD2$).

The ECU 100 determines that the convergence condition is established in a case where both of the first and second conditions are established, and determines that the convergence condition is not established in a case where either of the first and second conditions is not established. In a case where the convergence condition is not established (in S310, NO), the ECU 100 updates the currents $I_T$, $I_{Si}$, $I_{gra}$ according to the algorithm of the Newton's law (S311), and returns the process to S301. In a case where the convergence condition is established (in S310, YES), the ECU 100 returns the process to S200 of FIG. 12.

Referring to FIG. 12 again, in S200, the ECU 100 executes the SOC estimation processing for estimating the SOC of the battery 4 based on a result of potential component calculation processing. The SOC estimation processing includes, for example, processing of S201 and S202.

In S201, the ECU 100 acquires the average lithium amount $\theta_{1\_ave}$ (the value calculated in the processing of S302 in which the convergence condition is established) of the positive electrode particle 1, and reads the known lithium amounts $\theta_{1\_SOC0}$, $\theta_{1\_SOC100}$ stored in the memory 100B. The lithium amount $\theta_{1\_SOC0}$ is the lithium amount of the positive electrode particle 1 corresponding to SOC=0%, and the lithium amount $\theta_{1\_SOC100}$ is the lithium amount of the positive electrode particle 1 corresponding to SOC=100%.

Then, in S202, the ECU 100 estimates the SOC of the battery 4 based on the above-described three lithium amounts. Specifically, the SOC of the battery 4 can be calculated using Expression (34) described below.

$$SOC[\%] = \frac{\theta_{1\_SOC0} - \theta_{1\_ave}}{\theta_{1\_SOC0} - \theta_{1\_SOC100}} \times 100 \qquad (34)$$

As described above, in Embodiment 1, the "three-particle model" is employed. In the three-particle model, the positive electrode is representatively represented by the positive electrode particle 1, and the negative electrode is representatively represented by the two particles of the silicon particle 21 and the graphite particle 22. Then, the current (silicon current $I_{Si}$) flowing in the silicon particle 21 and the current (graphite current $I_{gra}$) flowing in the graphite particle 22 are distinguished from each other, and the total current $I_T$ flowing in the negative electrode active substance is distributed into the silicon current $I_{Si}$ and the graphite current $I_{gra}$.

In this way, in Embodiment 1, the current distribution between the silicon particle 21 and the graphite, particle 22 is taken into consideration, whereby the calculation accuracy of the parameters depending on the current is improved compared to a case where the current distribution is not taken into consideration. Specifically, in the embodiment, the silicon overvoltage $\eta_{Si}$ (see Expression (5)) to be determined according to the silicon current $I_{Si}$ and the graphite overvoltage $\eta_{gra}$ (see Expression (6)) to be determined according to the graphite current $I_{gra}$ are separately calculated. With this, it is possible to accurately calculate overvoltages that are generated according to charge transfer reaction (insertion and desorption reaction of lithium) compared to a case where the currents are not distinguished from each other.

Furthermore, the calculation accuracy of the lithium concentration distributions in the particles that are calculated by solving the diffusion equations shown in Expressions (7) to Expression (16) is improved. For this reason, the calculation accuracy of the average lithium concentration $c_{s\_Si\_ave}$ (or the average lithium amount $\theta_{Si\_ave}$) in the silicon particle 21 is improved. Accordingly, the calculation accuracy of the surface stress $\sigma_{surf}$ depending on the average lithium concentration $c_{s\_Si\_ave}$ (or the average lithium amount $\theta_{Si\_ave}$) is also improved (see Expression (32) or (33) described above). With this, it is possible to calculate the amount of change in open circuit potential $\Delta V_{stress}$ indicating the amount of deviation of the open circuit potential (silicon open circuit potential $U_{Si}$) of the silicon particle 21 due to the surface stress $\sigma_{surf}$ with high accuracy (see Expression (17)). As a result, since it is possible to accurately reflect the influence of the surface stress $\sigma_{surf}$ in the negative electrode open circuit potential $U_2$ (see Expression (20) described above), it is also possible to calculate the negative electrode potential $V_2$ with high accuracy. In addition, it is also possible to estimate the SOC of the battery 4 with high accuracy (SOC estimation processing). As described above, according to Embodiment 1, it is possible to estimate the internal state of the battery 4 with high accuracy.

Modification Example 1 of Embodiment 1

In Modification Example 1 of Embodiment 1, a configuration in which the convergence computation processing is executed taking into consideration the influence of the electric double layer to be formed on the active substance surface will be described. In the modification example, the total current $I_T$ is further distributed into a current component involved in lithium production (insertion and desorption of lithium ions) and a current component uninvolved in lithium production. Specifically, in regard to the positive electrode particle 1, in a case where the current involved in lithium production in the total current $I_T$ is described as a "reaction current $I_1^{EC}$", and the current uninvolved in lithium production is described as a "capacitor current $I_1^C$", Expression (35) described below is established.

$$I_T = I_1^{ED} + I_1^C \qquad (35)$$

Electrostatic capacitance of the electric double layer to be formed in the positive electrode particle 1 is described as $C_1$. The electrostatic capacitance $C_1$ is known by pre-evaluation. The capacitor current $I_1^C$ is represented as Expression (36) described below.

$$I_1^C = -C_1 \frac{dV_1}{dt} \qquad (36)$$

The same relationship as Expression (26) described above is established among the positive electrode potential $V_1$, the positive electrode open circuit potential $U_1$, and the reaction overvoltage $\eta_1$ (see Expression (37) described above). Note that, in the positive electrode overvoltage $\eta_1$, as shown in Expression (38) described below, the reaction current $I_1^{EC}$ is used instead of the total current $I_T$.

$$V_1 = U_1 + \eta_1 \qquad (37)$$

$$\eta_1 = \frac{2RT}{\beta_1 F} \sinh^{-1}\left(\frac{-\beta_1 I_1^{EC}}{2L_1 a_{s\_1} i_{0\_1}(\theta_1, T)}\right) \qquad (38)$$

In regard to the negative electrode side, the current (the silicon current $I_{Si}$) flowing in the silicon particle 21 is distinguished into a reaction current $I_{Si}^{EC}$ and a capacitor current $I_{Si}^C$. Furthermore, the current (graphite current $I_{gra}$) flowing in the graphite particle 22 is distinguished into a reaction current $I_{gra}^{EC}$ and a capacitor current $I_{gra}^C$. Then, Expression (39) described below is established among these currents.

$$I_T = I_{Si}^{EC} + I_{Si}^C + I_{gra}^{EC} + I_{gra}^C \qquad (39)$$

The capacitor current $I_{Si}^C$ is represented as Expression (40) described below with electrostatic capacitance $C_{Si}$ to be formed in the silicon particle 21 and the negative electrode potential $V_2$. The capacitor current $I_{gra}^C$ is represented as Expression (41) described below with electrostatic capacitance $C_{gra}$ to be formed in the graphite particle 22 and the negative electrode potential $V_2$.

$$I_{Si}^C = C_{Si} \frac{dV_2}{dt} \qquad (40)$$

$$I_{gra}^C = C_{gra} \frac{dV_2}{dt} \qquad (41)$$

Furthermore, Expression (42) that is the same as Expressions (27) and (28) described above is established. Here, the silicon current $I_{Si}$ in the silicon overvoltage $\eta_{Si}$ is replaced with the capacitor current $I_{Si}^{EC}$, and the graphite current $I_{gra}$ in the graphite overvoltage $\eta_{gra}$ is replaced with the capacitor current $I_{gra}^{EC}$ (see Expressions (43) and (44) described below).

$$V_2 = U_{Si} + \eta_{Si} = U_{gra} + \eta_{gra} \qquad (42)$$

$$\eta_{Si} = \frac{2RT}{\beta_{Si} F} \sinh^{-1}\left(\frac{\beta_{Si} I_{Si}^{EC}}{2L_2 a_{s\_Si} i_{0\_Si}(\theta_{Si}, T)}\right) \qquad (43)$$

$$\eta_{gra} = \frac{2RT}{\beta_{Si} F} \sinh^{-1}\left(\frac{\beta_{gra} I_{gra}^{EC}}{2L_2 a_{s\_gra} i_{0\_gra}(\theta_{gra}, T)}\right) \qquad (44)$$

As described above, in Modification Example 1 of Embodiment 1, the current (total current $I_T$) flowing in the positive electrode particle 1 is distinguished into the capacitor current $I_1^C$ and the reaction current $I_1^{EC}$ taking into consideration the influence of the electric double layer to be formed on the surface of the positive electrode active substance. In regard to the negative electrode side, similarly, taking into consideration the influence of an electric double layer to be formed on the surface of the negative electrode active substance, the silicon current $I_{Si}$ is distinguished into the capacitor current $I_{Si}^C$ and the reaction current $I_{Si}^{EC}$, and the graphite current $I_{gra}$ is distinguished into the capacitor current $I_{gra}^C$ and the reaction current $I_{gra}^{EC}$. Then, in calculating the reaction overvoltages ($\eta_1, \eta_{Si}, \eta_{gra}$), the corresponding reaction currents ($I_T^{EC}, I_{Si}^{EC}, I_{gra}^{EC}$) are used. That is, in calculating the reaction overvoltage as a voltage to be generated according to insertion and desorption reaction of lithium, the influence of a current component (capacitor current) uninvolved in insertion and desorption of lithium is excluded solely by charging and discharging the electric double layer. With this, while the computation load of the ECU 100 may increase, it is possible to further improve the calculation accuracy of the reaction overvoltages, compared to Embodiment 1.

Modification Example 2 of Embodiment 1

Change in Negative Electrode Potential

In general, in the lithium-ion secondary battery, it is known that the charging and discharging performance or thermal resistance of the secondary battery is likely to be degraded due to "lithium precipitation" in which metallic lithium is precipitated on the negative electrode. In Modification Example 2 of Embodiment 1, a given restriction is applied to a battery input (charging electric power to the battery 4), whereby "lithium precipitation suppression control" for protecting the battery 4 from lithium precipitation is executed.

Figure 15:
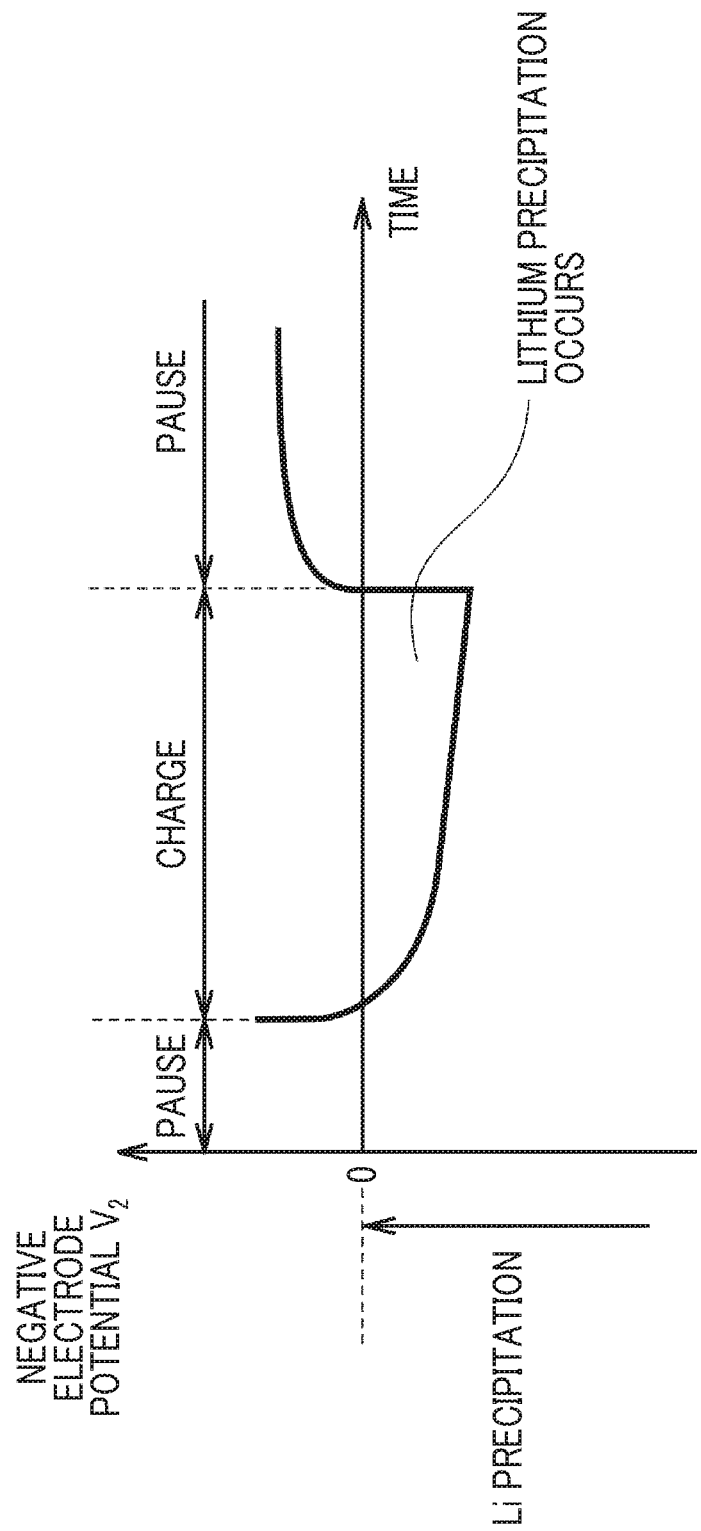
FIG. 15 is a conceptual diagram illustrating change in negative electrode potential when lithium precipitation occurs.

FIG. 15 is a conceptual diagram illustrating change in negative electrode potential $V_2$ when lithium precipitation occurs. In FIG. 15, the horizontal axis represents an elapsed time, and the vertical axis represents the negative electrode potential $V_2$ based on metallic lithium.

As shown in FIG. 15, the negative electrode potential $V_2$ decreases at the time of charging of the battery 4. The greater the charging electric power to the battery 4, the greater the amount of decrease of the negative electrode potential $V_2$. In a case where the negative electrode potential $V_2$ falls below a lithium precipitation potential (0 V based on metallic lithium), lithium precipitation may occur. Accordingly, in Modification Example 2 of Embodiment 1, the charging electric power to the battery 4 is suppressed from when the negative electrode potential $V_2$ reaches a predetermined potential higher than the lithium precipitation potential such that the negative electrode potential $V_2$ is restrained from being equal to or lower than 0 V.

As described above, in Modification Example 2 of Embodiment 1, since it is possible to calculate the negative electrode potential $V_2$ with high accuracy, it is possible to reliably suppress precipitation of metallic lithium on the negative electrode surface and to appropriately protect the battery 4 even in a battery system in which there is the influence of a hysteresis.

Embodiment 2

In Embodiment 1, the three-particle model for calculating various potential components of the battery 4 with high accuracy has been described (see FIGS. 5 and 6). In Embodiment 2, in order to reduce the computation load and the amount of memory of the ECU 100, a configuration in which a battery model more simplified than the three-particle model is used will be described. In the battery model, as described below, the calculation expressions of the reaction overvoltages ($\eta_1, \eta_{Si}, \eta_{gra}$) are simplified, and the diffusion equations are simplified. The overall configuration of a secondary battery system according to Embodiment 2 is the same as the overall configuration (see FIG. 1) of the secondary battery system 10 according to Embodiment 1.

Simplification of Three-Particle Model

In regard to the positive electrode particle 1, a diffusion equation (the same expression as Expression (7) described above) shown in Expression (45) described below is solved under the boundary condition (see Expression (8)), whereby the lithium concentration distribution in the positive electrode particle 1 is calculated. Then, the surface lithium amount $\theta_{1\_surf}$ the positive electrode particle 1 is calculated from the lithium concentration distribution inside the positive electrode particle 1 (see Expression (2) described above).

$$\frac{\partial c_{s\_1}(r_1)}{\partial t} = \frac{1}{r_1^2}\frac{\partial}{\partial r_1}\left(r_1^2 D_{s\_1}(\theta_1)\frac{\partial c_{s\_1}(r_1)}{dr_1}\right) \quad (45)$$

On the other hand, in Embodiment 2, diffusion of lithium inside the silicon particle 21 is simplified. The same applied to the graphite particle 22 (the diffusion equation regarding the silicon particle 21 and the diffusion equations (see Expressions (9) to (16) described above) of the graphite particle 22 are omitted). In other words, it is assumed that the lithium concentration distribution of the silicon particle 21 is uniform, and it is assumed that the lithium concentration distribution of the graphite particle 22 is also uniform.

As described above, the open circuit potential (silicon open circuit potential $U_{Si}$) of the silicon particle 21 is determined according to the surface lithium amount $\theta_{Si\_surf}$ of the silicon particle 21 (see Expression (18) described above). In a case where formulation of the diffusion equation is omitted assuming that the lithium concentration distribution of the silicon particle 21 is uniform, how to calculate the silicon open circuit potential $U_{Si}$ becomes a problem.

In general, the lithium concentration in the positive electrode active substance and the lithium concentration in the negative electrode active substance have a relationship that, in a case where one of the lithium concentrations increases, the other lithium concentration decreases. In the battery model of Embodiment 2, the lithium concentration in the negative electrode active substance is calculated from the lithium concentration in the positive electrode active substance (the lithium amount $\theta_1$ of the positive electrode particle 1) using the relationship.

In detail, in the battery model of Embodiment 2, the silicon particle 21 and the graphite particle 22 are regarded as one mixed negative electrode particle 2. The mixed negative electrode particle 2 is not virtually divided into a plurality of regions unlike the positive electrode particle 1, and the lithium concentration distribution inside the mixed negative electrode particle 2 is not taken into consideration. For this reason, the surface of the mixed negative electrode particle 2 and other portions (the inside of the mixed negative electrode particle 2) are not distinguished from each other, and a value obtained by normalizing the lithium concentration in the mixed negative electrode particle 2 is described as the lithium amount $\theta_2$.

In a case where the ratio (capacity ratio) of the capacity of the positive electrode particle 1 to the capacity of the mixed negative electrode particle 2 is described as $\theta_{rate}$, the capacity ratio $\theta_{rate}$ is a fixed value, and may be represented as Expression (46) described below using the lithium amount $\theta_1$ of the positive electrode particle 1 and the lithium amount $\theta_2$ of the mixed negative electrode particle 2. The values at the time of the present computation are attached with t on the upper right side (right shoulder), and the values at the time of the previous computation are attached with (t−Δt) on the upper right side, thereby distinguishing between the values at the time of the present computation and values at the time of the previous computation.

$$\theta_{rate} = -\frac{\theta_2^t - \theta_2^{t-\Delta t}}{\theta_1^t - \theta_1^{t-\Delta t}} \tag{46}$$

Next, a lithium amount $\theta_2^t$ of the mixed negative electrode particle 2 is calculated. The lithium amount $\theta_2^t$ of the mixed negative electrode particle 2 can be calculated using a lithium amount $\theta_1^t$ of the positive electrode particle 1 and the capacity ratio $\theta_{rate}$ according to Expression (47) described below. In Expression (45), $\theta_{1\_fix}$ is a reference value of the lithium amount $\theta_1$, and $\theta_{2\_fix}$ is a value of the lithium amount $\theta_2$ corresponding to the reference value ($\theta_{1\_fix}$) of $\theta_1$. Both of these values are obtained by an experiment.

$$\theta_2^t = \theta_{rate} \times (\theta_1^t - \theta_{1\_fix}) + \theta_{2\_fix} \tag{47}$$

In this way, while the lithium amount $\theta_2$ of the mixed negative electrode particle 2 is calculated from the lithium amount $\theta_1$ of the positive electrode particle 1, the lithium amount $\theta_2$ is also calculated using another method described below. Then, in a case where calculation results of the lithium amount $\theta_2$ of the two calculation methods coincide with each other, it is assumed that the computation results of the parameters are determined to be valid. Hereinafter, another calculation method of the lithium amount $\theta_2$ will be described.

Since the silicon particle 21 and the graphite particle 22 are at the same potential ($V_{Si} = V_{gra}$), Expression (48) described below is established (see Expressions (27) and Expression (28)).

$$U_{Si}(\theta_{Si}^t) + \eta_{Si} = U_{gra}(\theta_{gra}^t) + \eta_{gra} \tag{48}$$

In Embodiment 2, for simplification, it is assumed that the silicon overvoltage $\eta_{Si}$ and the graphite overvoltage $\eta_{gra}$ are equal to each other (see Expression (49) described below).

$$\eta_{Si} = \eta_{gra} \tag{49}$$

Then, Expression (48) described above is simplified as Expression (50) described below.

$$U_{Si}(\theta_{Si}^t) = U_{gra}(\theta_{gra}^t) \tag{50}$$

The silicon open circuit potential $U_{Si}$ on the left side of Expression (50) is represented by the sum of $U_{Si\_sta}$ as the open circuit potential in a case where the surface stress $\sigma_{surf}=0$ and the amount of change in open circuit potential $\Delta V_{stress}$ due to the surface stress $\sigma_{surf}$ (see Expressions (17) and (20)). That is, Expression (50) is further modified as Expression (51) described below.

$$U_{Si\_sta} + \frac{\sigma_{surf}^t \Omega}{F} = U_{gra}(\theta_{gra}^t) \tag{51}$$

While a second item on the left side of Expression (51) includes the surface stress $\sigma_{surf}$, the surface stress $\sigma_{surf}$ is calculated according to Expression (52) described below similarly to Embodiment 1.

$$\sigma_{surf} = -\alpha_\theta(\theta_{Si\_ave} - \theta_{REF}) + \sigma_{REF} \tag{52}$$

Description has been provided in Expressions (30) and (31), and thus, detailed description will not be repeated. On the other hand, in a case where the surface stress $\sigma_{surf}$ is yielded, the surface stress $\sigma_{surf}$ is calculated by $\sigma_{surf} = \sigma_{com}$ or $\sigma_{surf} = \sigma_{ten}$ instead of Expression (52).

The lithium amount $\theta_2^t$ of the mixed negative electrode particle 2 may be calculated by the following method without using the capacity ratio $\theta_{rate}$. The total current $I_T$ is input to and output from the mixed negative electrode particle 2 between the previous computation and the present computation (while Δt elapses), whereby the amount of electricity of the mixed negative electrode particle 2 changes by $I_T \times \Delta t$, and the lithium amount of the mixed negative electrode particle 2 changes from $\theta_2^{t-\Delta t}$ to $\theta_2^t$. In regards to an amount of change ($I_T \times \Delta t$) in amount of electricity of the mixed negative electrode particle 2 and an amount of change ($\theta_2^t - \theta_2^{t-\Delta t}$) in lithium amount, as shown in Expression (53) described below, there is a condition (convergence condition) that the amount of change ($I_T \times \Delta t$) and the amount of change ($\theta_2^t - \theta_2^{t-\Delta t}$) match each other. On the left side of Expression (53), volume $Vol_2$ of the mixed negative electrode particle 2, a limit lithium concentration $c_{Si,max}$ of the silicon particle 21, and a limit lithium concentration $c_{gra,max}$ of the graphite particle 22 are used.

$$\frac{I_T \Delta t}{Vol_2 F(c_{Si,max} + c_{gra,max})} = \theta_2^t - \theta_2^{t-\Delta t} \tag{53}$$

Here, the lithium amount θ2 of the mixed negative electrode particle 2 is represented as Expression (54) described below using the lithium amount $\theta_{Si}$ and the limit lithium concentration $c_{Si,max}$ of the silicon particle 21, and the lithium amount $\theta_{gra}$ and the limit lithium concentration $c_{gra,max}$ of the graphite particle 22. Expression (55) is derived by substituting Expression (54) in Expression (52).

$$\theta_2^t = \frac{\theta_{Si}^t c_{Si,max} + \theta_{gra}^t c_{gra,max}}{c_{Si,max} + c_{gra,max}} \tag{54}$$

$$\frac{I_T \Delta t}{Vol_2 F(c_{Si,max} + c_{gra,max})} = \frac{(\theta_{Si}^t - \theta_{Si}^{t-\Delta t})c_{Si,max} + (\theta_{gra}^t - \theta_{gra}^{t-\Delta t})c_{gra,max}}{c_{Si,max} + c_{gra,max}} \tag{55}$$

The three parameters of the lithium amounts $\theta_{Si}$, $\theta_{gra}$ and the surface stress $\sigma_{surf}$ can be calculated by simultaneously formulating the above-described expressions. Then, the lithium amount $\theta_2$ of the mixed negative electrode particle 2 calculated from the lithium amount $\theta_{Si}$ of the silicon particle 21 and the lithium amount $\theta_{gra}$ of the graphite particle 22 according to Expression (54) is compared with the lithium amount $\theta_2$ of the mixed negative electrode particle 2 calculated from the lithium amount $\theta_1$ according to Expression (47). In a case where the lithium amounts $\theta_2$ calculated using the two methods coincide with each other well (in a case where the difference is less than a predetermined value), it is assumed that the calculation results of the lithium amounts $\theta_{Si}$, $\theta_{gra}$ and the surface stress $\sigma_{surf}$ are employed (in regards to details, see a flowchart described below).

SOC Estimation Flow

Figure 16:
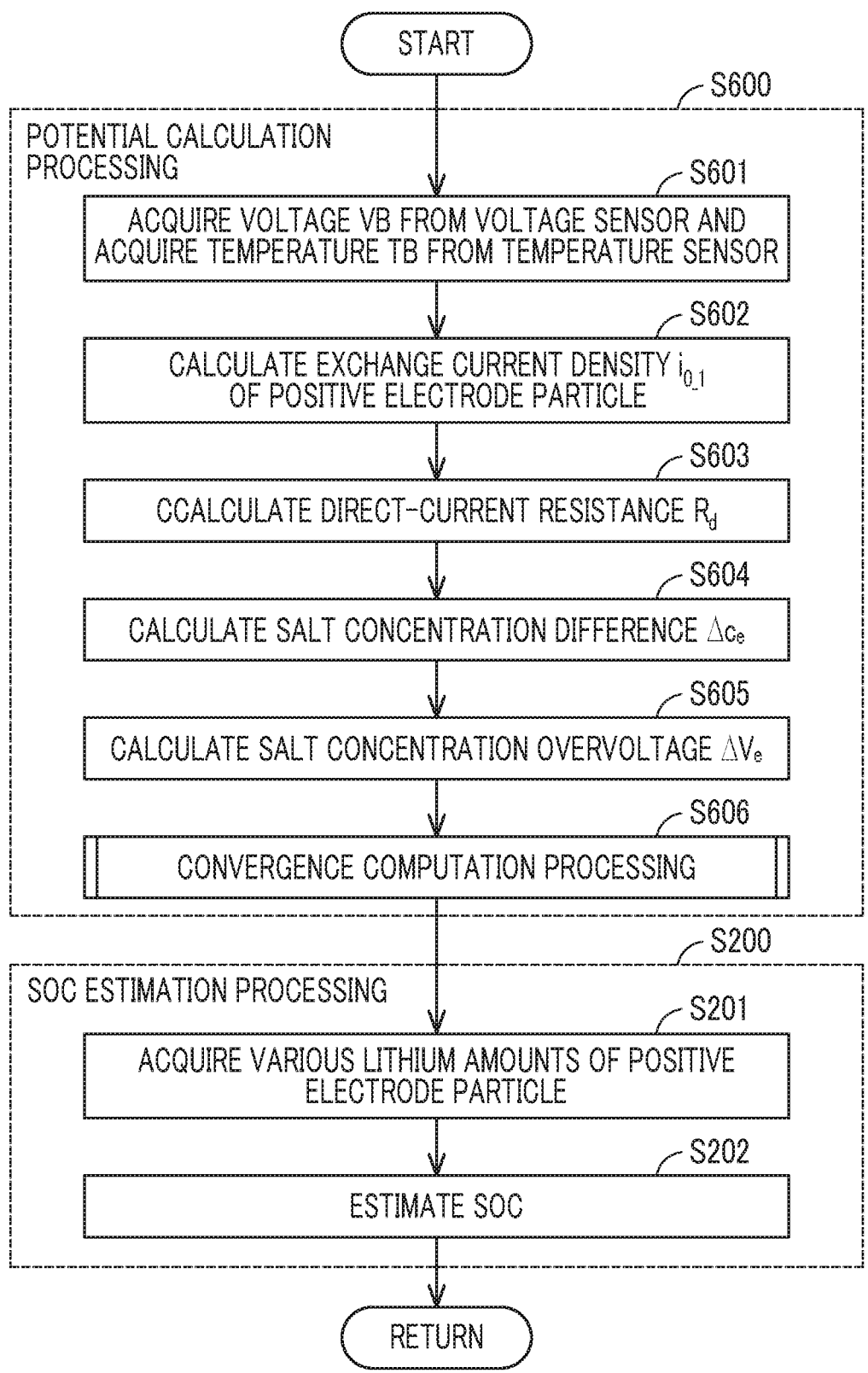
FIG. 16 is a flowchart showing a series of processing for estimating an SOC of a battery in Embodiment 2.

FIG. 16 is a flowchart showing a series of processing for estimating the SOC of the battery 4 in Embodiment 2. Referring to FIG. 16, in S601, the ECU 100 acquires the voltage VB of the battery 4 from the voltage sensor 71. The ECU 100 acquires the temperature TB of the battery 4 from the temperature sensor 72 and calculates the absolute temperature T from the temperature TB.

In S602, the ECU 100 calculates the exchange current density $i_{0\_1}$ of the positive electrode particle 1. A calculation method of the exchange current density $i_{0\_1}$ is the same as the method described in Embodiment 1. That is, the ECU 100 calculates the exchange current density $i_{0\_1}$ from the surface lithium amount $\theta_{1\_surf}$ (see S703 of FIG. 17) calculated at the time of the previous computation and the absolute temperature T calculated in S601 by referring to the map (not shown) specifying the correspondence relationship of the exchange current density $i_{0\_1}$ of the positive electrode particle 1, the surface lithium amount $\theta_{1\_surf}$, and the absolute temperature T.

In Embodiment 2, since the reaction overvoltages $\eta_{Si}$, $\eta_{gra}$ are not calculated, the calculation of the exchange current density $i_{0\_Si}$ of the silicon particle 21 and the exchange current density $i_{0\_gra}$ of the graphite particle 22 is also omitted.

Processing of S603 to S605 is the same as the processing (see FIG. 12) of S103 to S105 in Embodiment 1. On the other hand, convergence computation processing in S606 is different from the convergence computation processing S106 (see FIGS. 12 and 13) in Embodiment 1.

Figure 17:
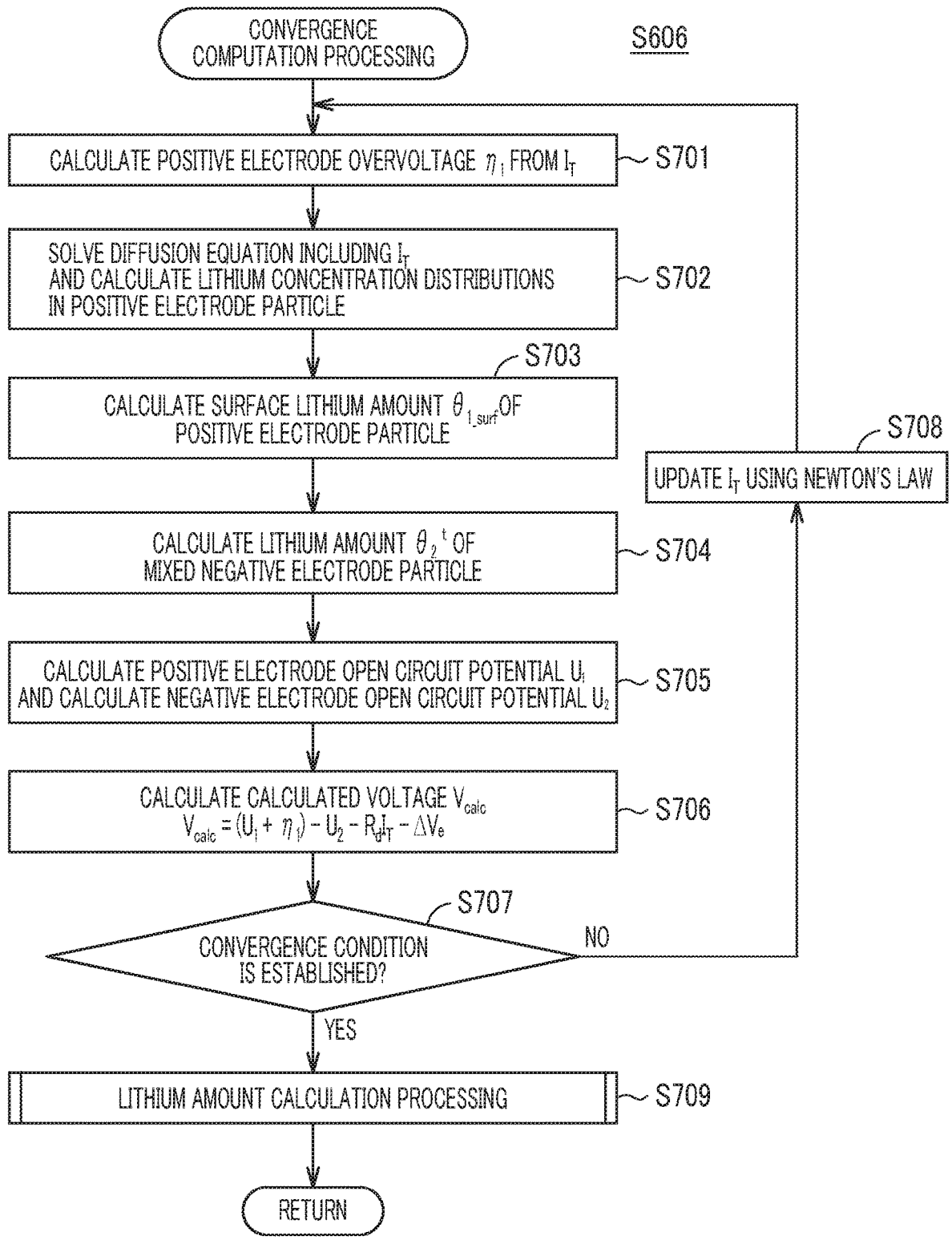
FIG. 17 is a flowchart showing convergence computation processing in Embodiment 2.

FIG. 17 is a flowchart showing the convergence computation processing (processing of S606 of FIG. 16) in Embodiment 2. Referring to FIG. 17, in Embodiment 2, the convergence computation processing is different from the convergence computation processing (see the processing of S301 to S303 of FIG. 13) in Embodiment 1 in that the following processing of S701 to S703 is executed solely on the positive electrode particle 1, and is not executed on the silicon particle 21 and the graphite particle 22.

In S701, the ECU 100 calculates the reaction overvoltage $\eta_1$ of the positive electrode particle 1 from the exchange current density $i_{0\_1}$ of the positive electrode particle 1 and the absolute temperature T according to Expression (4) described above. In addition, in S702, the ECU 100 calculates the lithium concentration distribution inside the positive electrode particle 1 by solving the diffusion equation (Expression (7) described above) under a predetermined boundary condition (see Expression (8)). Then, the ECU 100 calculates the surface lithium amount $\theta_{1\_surf}$ of the positive electrode particle 1 based on the lithium concentration distribution inside the positive electrode particle 1 (S703, see Expression (2) described above).

In S704, the ECU 100 calculates the lithium amount $\theta_2^t$ of the mixed negative electrode particle 2 in a present computation cycle from the lithium amount $\theta_1^t$ of the positive electrode particle 1 and the capacity ratio $\theta_{rate}$ (known value) according to Expression (47) described above.

In S705, the ECU 100 calculates the positive electrode open circuit potential $U_1$ from the surface lithium amount $\theta_{1\_surf}$ calculated in S703 by referring to the map (not shown) specifying the correspondence relationship between the positive electrode open circuit potential $U_1$ and the surface lithium amount $\theta_{1\_surf}$.

In addition, the ECU 100 calculates the negative electrode open circuit potential $U_2$ from the lithium amount $\theta_2$ calculated in S704 by referring to the map (not shown) specifying the correspondence relationship between the negative electrode open circuit potential $U_2$ and the surface lithium amount $\theta_2$.

In S706, the ECU 100 calculates the calculated voltage $V_{calc}$ from the positive electrode potential $V_1$ (=the positive electrode open circuit potential $U_1$+the positive electrode overvoltage $\eta_1$), the negative electrode open circuit potential $U_2$, the amount of voltage drop (=$I_T R_d$) due to the direct-current resistance $R_d$, and the salt concentration overvoltage $\Delta V_e$ according to Expression (56) described below. In Expression (56), as described above, the silicon overvoltage $\eta_{Si}$ and the graphite overvoltage $\eta_{gra}$ are made to be equal to each other (see Expression (49) described above). This is understood because, while the three reaction overvoltages $\eta_1$, $\eta_{Si}$, $\eta_{gra}$ are separately calculated in Embodiment 1, solely one reaction overvoltage is considered as the battery 4 in Embodiment 2 (in other words, the contribution of the reaction overvoltages $\eta_{Si}$, $\eta_{gra}$ in the negative electrode is included in the reaction overvoltage $\eta_1$ in the positive electrode).

$$(U_1+\eta_1)-U_2-I_T R_d-\Delta V_e=V_{calc} \qquad (56)$$

Expression (56) is the same expression as an expression that is established in a one-particle model in which the positive electrode active substance and the negative electrode active substance are integrated simply. That is, in Embodiment 2, it can be said that a one-particle model is employed, in contrast with the three-particle model in Embodiment 1.

In S707, the ECU 100 determines whether or not the condition (convergence condition) under which the total current $I_T$ is converged is established. Specifically, the ECU 100 determines whether or not the difference (absolute value) between the calculated voltage $V_{calc}$ calculated in S706 and the measured voltage $V_{meas}$ detected by the voltage sensor 71 is less than a predetermined value PD ($|V_{calc}-V_{meas}|<PD$). In a case where the absolute value of the difference between the calculated voltage $V_{calc}$ and the measured voltage $V_{meas}$ is less than the predetermined value PD (in S707, YES), the ECU 100 progresses the process to S709. In a case where the absolute value of the difference is equal to or greater than the predetermined value PD (in S707, NO), the ECU 100 updates the total current $I_T$ according to the Newton's law (S708), and returns the process to S701.

In S709, the ECU 100 executes "lithium amount calculation processing" for calculating the lithium amount $\theta_{Si}$ in the silicon particle 21.

Figure 18:
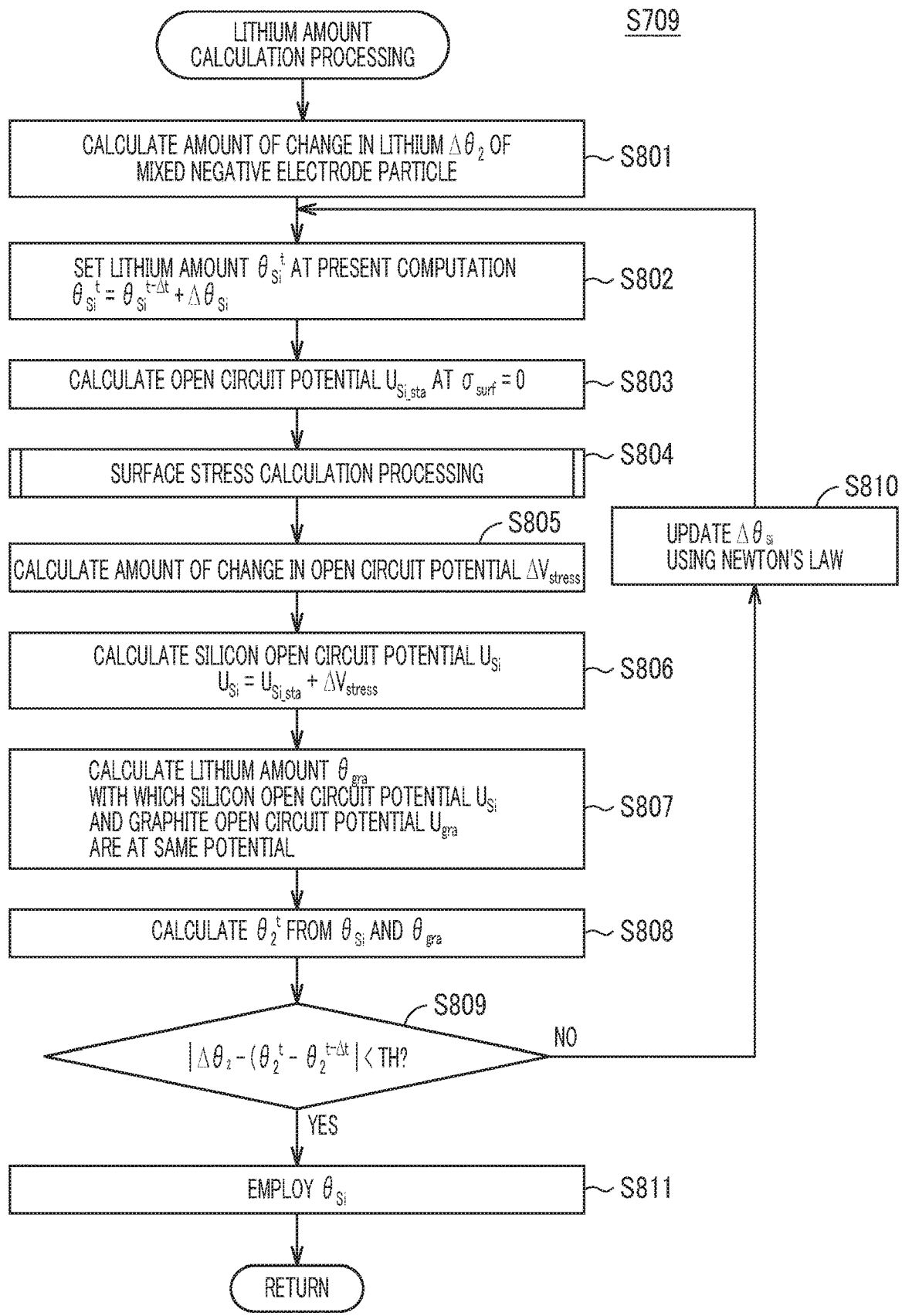
FIG. 18 is a flowchart showing lithium amount calculation processing in Embodiment 2.

FIG. 18 is a flowchart showing the lithium amount calculation processing (the processing of S709 of FIG. 17) in Embodiment 2. Referring to FIG. 18, in S801, the ECU 100 calculates an amount of change in lithium $\Delta\theta_2$ of the mixed negative electrode particle 2. More specifically, the amount of change in lithium $\Delta\theta_2$ can be calculated by calculating the lithium amount $\theta_2$ of the mixed negative electrode particle 2 calculated from the lithium amount $\theta_1$ of the positive electrode particle 1 and the capacity ratio $\theta_{rate}$ according to Expression (47) described above twice at the time of the previous computation and at the time of the present computation and taking the difference between the lithium amounts $\theta_2$.

In S802, the ECU 100 sets a lithium amount $\theta_{Si}^t$ of the silicon particle 21 at the time of the present computation is set by adding the amount of change in lithium $\Delta\theta_{Si}$ (see S810) updated according to the Newton's law to the lithium amount $\theta_{Si}^{t-\Delta t}$ of the silicon particle 21 at the time of the previous computation (see Expression (57) described below).

$$\theta_{Si}^{t}=\theta_{Si}^{t-\Delta t}+\Delta\theta_{Si} \quad (57)$$

In S803, the ECU 100 calculates $U_{Si\_sta}$ as the open circuit potential of the silicon particle 21 in a case of the surface stress $\sigma_{surf}=0$ from the lithium amount $\theta_{Si}^{t}$ by referring to a predetermined map (not shown).

In S804, the ECU 100 calculates the surface stress cur by executing surface stress calculation processing.

Figure 19:
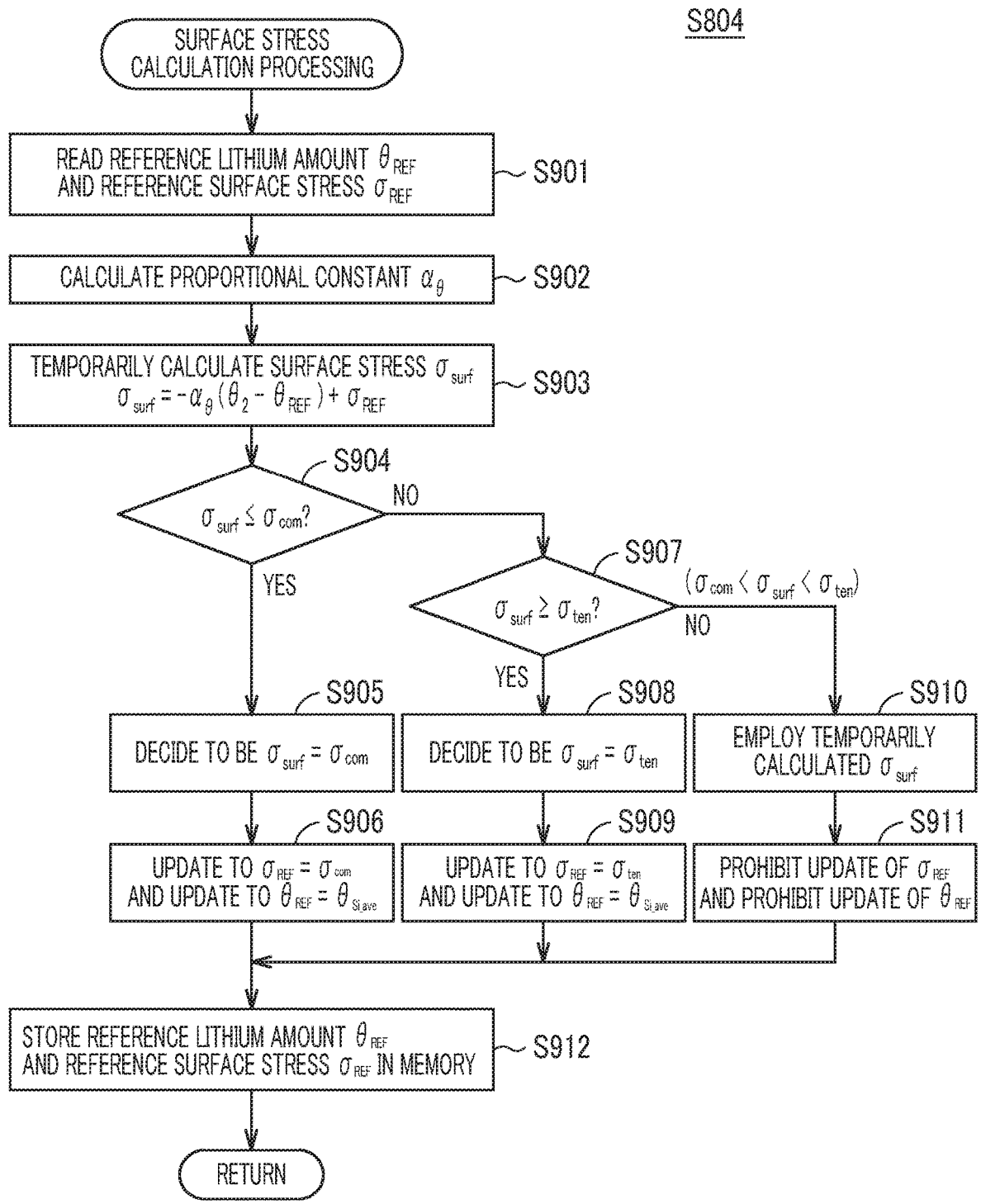
FIG. 19 is a flowchart showing surface stress calculation processing in Embodiment 2.

FIG. 19 is a flowchart showing the surface stress calculation processing in Embodiment 2. Referring to FIG. 19, the flowchart is different from the surface stress calculation processing (see FIG. 14) in Embodiment 1 in that the calculation processing (S401) of the average lithium amount $\theta_{Si\_ave}$ of the silicon particle 21 is not included. Other kinds of processing are the same as the corresponding processing of the surface stress calculation processing in Embodiment 1, and thus, description will not be repeated. After a series of processing ends, the process is returned to the lithium amount calculation processing of FIG. 18.

Referring to FIG. 18 again, in S805, the ECU 100 calculates the amount of change in open circuit potential $\Delta V_{stress}$ from the surface stress $\sigma_{surf}$ according to Expression (58) (the same expression as Expression (17)) described below.

$$\Delta V_{stress} = \frac{\sigma_{surf}\Omega}{F} \quad (58)$$

In S806, the ECU 100 calculates the silicon open circuit potential $U_{Si}$ by adding the amount of change in open circuit potential $\Delta V_{stress}$ due to the surface stress $\sigma_{surf}$ to $U_{Si\_sta}$ as the open circuit potential of the silicon particle 21 when the surface stress $\sigma_{surf}=0$ (see Expression (59) described below).

$$U_{Si}=U_{Si\_sta}(\theta_{Si\_surf})+\Delta V_{stress} \quad (59)$$

In S807, the ECU 100 calculates the lithium amount $\theta_{gra}$ of the graphite particle 22 such that a condition (see Expression (60) described below) that the silicon open circuit potential $U_{Si}$ and the graphite open circuit potential $U_{gra}$ are equal to each other is established. Specifically, since a value of the left side of Expression (60) is known through the processing of S805 and S806, it can be said that a value of the graphite open circuit potential $U_{gra}$ specified on the right side of Expression (60) is calculated. Accordingly, the lithium amount $\theta_{gra}$ can be calculated from the graphite open circuit potential $U_{gra}$ by referring to the map (not shown) specifying the correspondence relationship between the graphite open circuit potential $U_{gra}$ and the lithium amount $\theta_{gra}$.

$$U_{Si\_sta}(\theta_{Si}^{t}) + \frac{\sigma_{surf}^{t}\Omega}{F} = U_{gra}(\theta_{gra}^{t}) \quad (60)$$

In 3808, the ECU 100 calculates the lithium amount $\theta_{2}^{t}$ from the lithium amounts $\theta_{Si}$, $\theta_{gra}$ according to Expression (61) described below that is established among the lithium amount $\theta_{Si}$ of the silicon particle 21, the lithium amount $\theta_{gra}$ of the graphite particle 22, and the lithium amount $\theta_{2}$ of the mixed negative electrode particle 2.

$$\theta_{2}^{t} = \frac{\theta_{Si}^{t}c_{Si,max} + \theta_{gra}^{t}c_{gra,max}}{c_{Si,max} + c_{gra,max}} \quad (61)$$

In S809, the ECU 100 calculates the difference ($\theta_{2}^{t}-\theta_{2}^{t-\Delta t}$) between the lithium amount $\theta_{2}^{t}$ of the mixed negative electrode particle 2 at the time of the present computation and the lithium amount $\theta_{2}^{t-\Delta t}$ of the mixed negative electrode particle 2 at the time of the previous computation. The lithium amount $\theta_{2}^{t-\Delta t}$ at the time of the previous computation is temporarily stored in the memory 100B for use in the present computation. Then, the ECU 100 compares the difference ($\theta_{2}^{t}-\theta_{2}^{t-\Delta t}$) calculated in the above-described manner with the amount of change in lithium $\Delta\theta_{2}$ calculated in S801.

In a case where the error between the difference ($\theta_{2}^{t}-\theta_{2}^{t-\Delta t}$) and the amount of change in lithium $\Delta\theta_{2}$ is equal to or greater than a threshold TH (in S809, NO), the ECU 100 progresses the process to S810, and updates the amount of change in lithium $\Delta\theta_{Si}$ (see S802) for use in calculating the lithium amount $\theta_{Si}$ at the time of next computation according to the Newton's law. In a case where the error between the difference ($\theta_{2}^{t}-\theta_{2}^{t-\Delta t}$) and the amount of change in lithium $\Delta\theta_{2}$ is less than the threshold TH (in S809, YES), the ECU 100 employs the lithium amount $\theta_{Si}$ of the silicon particle 21 calculated through the lithium amount calculation processing as a value usable in post-stage processing (SOC estimation processing) (S811). With this, the lithium amount calculation processing (S709) ends. Then, the convergence computation processing (S606) ends, and the potential calculation processing (S600) also ends.

Returning to FIG. 16, the ECU 100 executes the SOC estimation processing (S200) after the execution of the potential calculation processing (S600) ends. The SOC estimation processing is the same as the SOC estimation processing (see FIG. 12) in Embodiment 1, and thus, detailed description will not be repeated.

As described above, even in Embodiment 2, similarly to Embodiment 1, the surface stress $\sigma_{surf}$ is calculated through the surface stress calculation processing (S804), and the amount of change in open circuit potential $\Delta V_{stress}$ of the silicon particle 21 is calculated based on the surface stress $\sigma_{surf}$ (S805). In this way, the negative electrode open circuit potential $U_{2}$ is calculated taking into consideration the influence of a hysteresis due to the surface stress $\sigma_{surf}$, whereby it is possible to calculate the negative electrode open circuit potential $U_{2}$ with high accuracy. As a result, it is also possible to improve the estimation accuracy of the SOC of the battery 4.

In Embodiment 2, the lithium diffusion inside the silicon particle 21 and the graphite particle 22 is simplified, and for this reason, the diffusion equation regarding the silicon particle 21 and the diffusion equations (see Expressions (9) to (16)) regarding the graphite particle 22 are omitted. The silicon particle 21 and the graphite particle 22 are integrally regarded as the mixed negative electrode particle 2, the surface and the inside of the mixed negative electrode particle 2 are not distinguished from each other, and the lithium amount $\theta_{2}$ as a parameter obtained by normalizing the lithium concentration in the mixed negative electrode particle 2 is used. Then, in Embodiment 2, focusing on that there is the correlation relationship between the lithium concentration in the positive electrode particle 1 and the lithium concentration in the mixed negative electrode particle 2, the lithium amount 62 of the mixed negative electrode particle 2 is calculated from the lithium amount $\theta_{1}$ of the positive electrode particle 1 using the capacity ratio $\theta_{rate}$ of the capacity of the positive electrode particle 1 to the capacity of the mixed negative electrode particle 2 (see Expression (46) described above).

In Embodiment 2, the lithium diffusion inside the silicon particle 21 and the graphite particle 22 is not taken into consideration purposely, whereby it is possible to reduce the amount of computation (the computation load, the amount of memory, and the computation time) of the ECU 100.

Embodiment 3

In the lithium amount calculation processing (see FIG. 18) in Embodiment 2, the effect that computation (convergence computation) for updating $\Delta\theta_{Si}$ is executed until the difference $(\theta_2{'} - \theta_2{'}^{-\Delta t})$ of the lithium amount θ2 between the previous computation and the present computation is converged on the amount of change in lithium $\Delta\theta_2$ calculated by another method has been described (see the processing of S809 and S810). In Embodiment 3, in order to further reduce the amount of computation of the ECU 100, a configuration in which the need for the convergence computation is eliminated by performing linear approximation to calculate the amount of change in lithium $\Delta\theta_{Si}$ of the silicon particle 21 will be described.

Embodiment 3 is different from Embodiment 2 in that another lithium amount calculation processing is executed instead of the lithium amount calculation processing shown in FIG. 18. Other kinds of processing, that is, the potential calculation processing, the SOC estimation processing (see FIG. 16), the convergence computation processing (see FIG. 17), and the surface stress calculation processing (see FIG. 19) are the same as the corresponding processing in Embodiment 2, and thus, description will not be repeated. The overall configuration of the secondary battery system according to Embodiment 3 is the same as the overall configuration (see FIG. 1) of the secondary battery system 10 according to Embodiment 1.

Linear Approximation of Lithium Distribution

An interval from the previous computation to the present computation is an order of tens of milliseconds to hundreds of milliseconds, and is sufficiently short. In other words, the amount of change in lithium $\Delta\theta$ (in more detail, the amount of change in lithium $\Delta\theta_{Si}$ of the silicon particle) from the previous computation to the present computation is considered to be sufficiently small. Accordingly, in a case where Tayler expansion is subjected to the silicon potential $V_{Si}$ around a certain lithium amount $\theta_{Si}{'}$, Expression (62) described below is derived.

$$V_{Si}(\theta_{Si}) = \qquad (62)$$
$$V_{Si}(\theta'_{Si}) + \frac{\partial V_{Si}}{\partial \theta_{Si}}\bigg|_{\theta_{Si}=\theta'_{Si}} (\theta_{Si} - \theta'_{Si}) + \frac{1}{2!}\frac{\partial^2 V_{Si}}{\partial \theta_{Si}^2}\bigg|_{\theta_{Si}=\theta'_{Si}} (\theta_{Si} - \theta'_{Si})^2 + \ldots$$

In Expression (62), in a case where $(\theta_{Si} - \theta_{Si}{'})$ is minute, terms of a second order and higher of $(\theta_{Si} - \theta_{Si}{'})$ are negligible. Accordingly, Expression (62) is modified as Expression (63) described below.

$$V_{Si}(\theta_{Si}) = V_{Si}(\theta'_{Si}) + \frac{\partial V_{Si}}{\partial \theta_{Si}}\bigg|_{\theta_{Si}=\theta'_{Si}} (\theta_{Si} - \theta'_{Si}) \qquad (63)$$

In Expression (63), in a case where $V_{Si}(\theta_{Si}) - V_{Si}(\theta_{Si}{'}) = \Delta V_{Si}$ and $\theta_{Si} - \theta{'} = \Delta\theta_{Si}$, Expression (64) described below is obtained.

$$\Delta V_{Si} = \frac{\partial V_{Si}}{\partial \theta_{Si}}\bigg|_{\theta_{Si}=\theta'_{Si}} \Delta\theta_{Si}. \qquad (64)$$

Since the open circuit potential (silicon open circuit potential) $U_{Si}$ of the silicon particle 21 is given by Expression (65) described below, Expression (64) can be represented as Expression (66) described below.

$$U_{Si} = U_{Si\_sta}(\theta_{Si\_surf}) + \frac{\sigma_{surf}\Omega}{F} \qquad (65)$$

$$\Delta V_{Si} = \frac{\partial(U_{Si\_sta} + \sigma_{surf}\Omega/F)}{\partial\theta_{Si}}\bigg|_{\theta_{Si}=\theta'_{Si}} \Delta\theta_{Si} \qquad (66)$$

In regard to the graphite particle 22, while there is no term including the surface stress $\sigma_{surf}$ (the second term on the right side of Expression (65) described above), an amount of change in potential $\Delta V_{gra}$ of the graphite particle 22 can be represented as Expression (67) described below through the same computation.

$$\Delta V_{gra} = \frac{\partial U_{gra}}{\partial\theta_{gra}}\bigg|_{\theta_{gra}=\theta'_{gra}} \Delta\theta_{gra} \qquad (67)$$

Since the silicon particle 21 and the graphite particle 22 are constantly at the same potential ($V_{Si} = V_{gra}$), in regards to the amount of change $\Delta V_{Si}$ of the silicon potential and the amount of change $\Delta V_{gra}$ of the graphite potential, the relationship that both of the amount of change $\Delta V_{Si}$ and the amount of change $\Delta V_{gra}$ are equal to each other ($\Delta V_{Si} = \Delta V_{gra}$) is established. The relationship is represented as Expression (68) described below using Expressions (66) and (67) described above.

$$\frac{\partial(U_{Si\_sta} + \sigma_{surf}\Omega/F)}{\partial\theta_{Si}}\bigg|_{\theta_{Si}=\theta'_{Si}} \Delta\theta_{Si} = \frac{\partial U_{gra}}{\partial\theta_{gra}}\bigg|_{\theta_{gra}=\theta'_{gra}} \Delta\theta_{gra} \qquad (68)$$

Expression (69) described below can be derived from Expression (68) described above by performing appropriate expression modification.

$$\Delta c_{Si} : \Delta c_{gra} = \frac{\partial U_{gra}}{\partial\theta_{gra}}\bigg|_{\theta_{gra}=\theta'_{gra}} \qquad (69)$$

$$c_{Si,max} : \frac{\partial(U_{Si\_sta} + \sigma_{surf}\Omega/F)}{\partial\theta_{Si}}\bigg|_{\theta_{Si}=\theta'_{Si}} c_{gra,max}$$

In a case where an amount of change in lithium concentration $\Delta c_2$ in the entire mixed negative electrode particle 2 is known, an amount of change in lithium concentration $\Delta c_{Si}$ of the silicon particle 21 and an amount of change in lithium concentration $\Delta c_{gra}$ of the graphite particle 22 can be calculated using Expression (69). The amount of change in lithium concentration $\Delta c_2$ of the mixed negative electrode particle 2 is given by Expression (70) described below.

$$\Delta c_2 = \Delta\theta_2 (c_{Si,max} + c_{gra,max}) \qquad (70)$$

The amount of change in lithium $\Delta\theta_{Si}$ of the silicon particle 21 can be represented as Expression (71) described below from Expressions (69) and Expression (70).

$$\Delta\theta_{Si} = \Delta\theta_2(c_{Si,max} + c_{gra,max}) \frac{\frac{\partial U_{gra}}{\partial \theta_{gra}}\big|_{\theta_{gra}=\theta'_{gra}}}{\frac{\partial U_{gra}}{\partial \theta_{gra}}\big|_{\theta_{gra}=\theta'_{gra}} \times c_{Si,max} + \frac{\partial(U_{Si\_sta} + \sigma_{surf}\Omega/F)}{\partial \theta_{Si}}\big|_{\theta_{Si}=\theta'_{Si}} \times c_{gra,max}} \quad (71)$$

In the lithium amount calculation processing (see FIG. 18) in Embodiment 2, the amount of change in lithium $\Delta\theta_{Si}$ of the silicon particle 21 is repeatedly updated until the difference $(\theta_2{}^r - \theta_2{}^{r-\Delta t})$ between the lithium amounts $\theta_2$ of the mixed negative electrode particle 2 of the two consecutive computations is converged on the amount of change in lithium $\Delta\theta_2$ calculated from the lithium amount $\theta_1$ and the capacity ratio $\theta_{rate}$ of the positive electrode particle 1. For this reason, a large amount of computation is requested for the ECU 100 to make a final decision of the amount of change in lithium $\Delta\theta_{Si}$. In contrast, in Embodiment 3, as will be understood from Expression (71), the amount of change in lithium $\Delta\theta_{Si}$ of the silicon particle 21 is calculated from the amount of change in lithium $\Delta\theta_2$ (the amount of change in lithium $\Delta\theta_2$ calculated from the lithium amount $\theta_1$ and the capacity ratio $\theta_{rate}$ of the positive electrode particle 1) of the mixed negative electrode particle 2 through single computation. Therefore, it is possible to considerably reduce the amount of computation in order to decide the amount of change in lithium $\Delta\theta_{Si}$.

Lithium Amount Calculation Processing Flow

Figure 20:
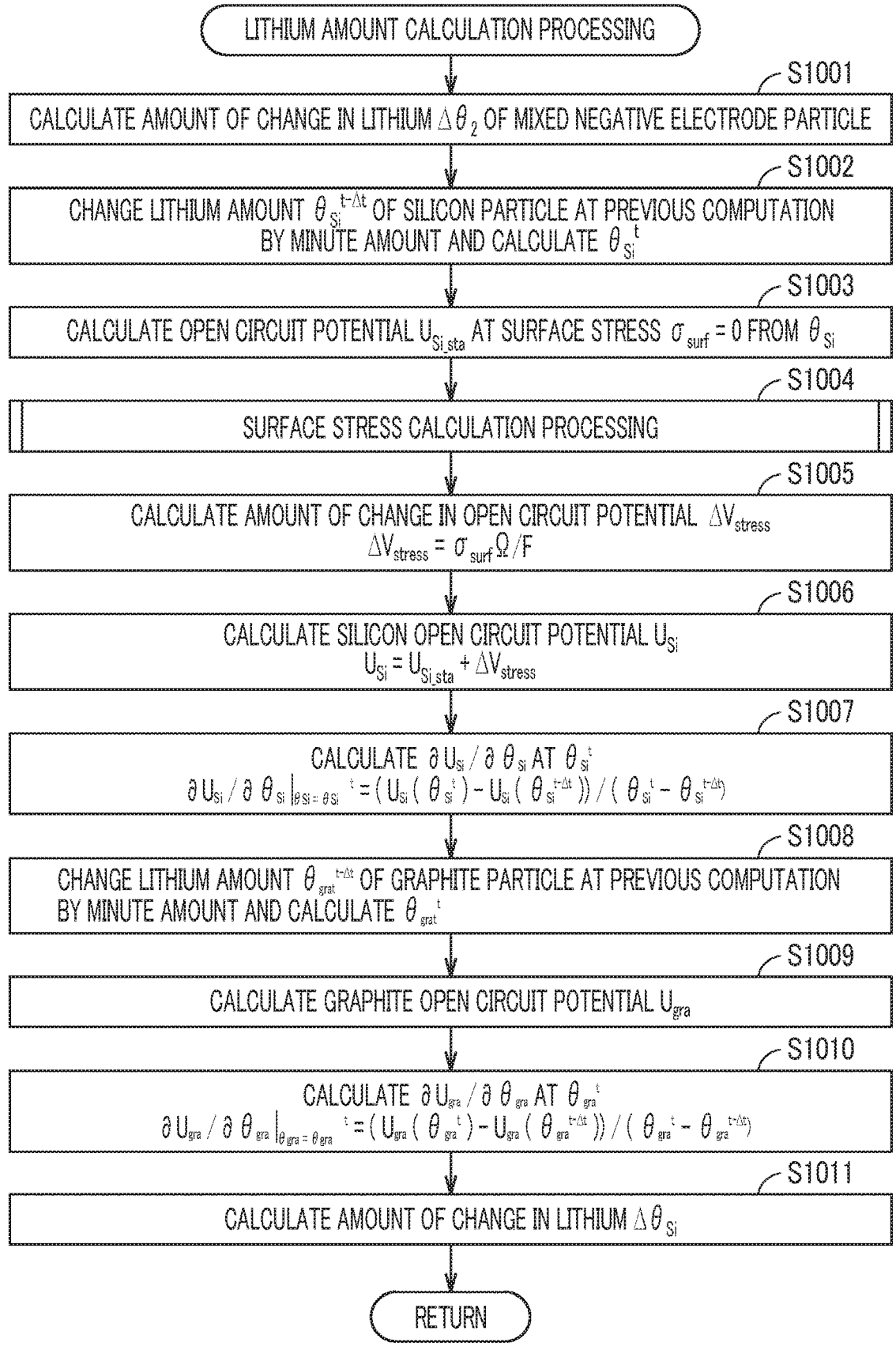
FIG. 20 is a flowchart showing lithium amount calculation processing in Embodiment 3.

FIG. 20 is a flowchart showing the lithium amount calculation processing in Embodiment 3. In the flowchart, an initial value of the lithium amount $\theta_{Si}$ of the silicon particle 21 and an initial value of the lithium amount $\theta_{gra}$ of the graphite particle are given, and the lithium amounts $\theta_{Si}$, $\theta_{gra}$ are updated each time a series of processing is repeatedly executed.

Referring to FIG. 20, processing of S1002 to S1006 is processing that is executed on the silicon particle 21, and processing of S1007 to S1009 is processing that is executed on the graphite particle 22. The ECU 100 may change the sequence of these kinds of processing, may execute the processing of S1007 to S1009 on the graphite particle 22, and then, may execute the processing of S1002 to S1006 on the silicon particle 21.

In S1001, as in S801 (see FIG. 18) of the lithium amount calculation processing in Embodiment 2, the ECU 100 calculates the amount of change in lithium $\Delta\theta_2$ of the mixed negative electrode particle 2. That is, the amount of change in lithium $\Delta\theta_2$ is calculated by calculating the lithium amount $\theta_2$ of the mixed negative electrode particle 2 calculated from the lithium amount $\theta_1$ and the capacity ratio $\theta_{rate}$ of the positive electrode particle 1 according to Expression (47) described above twice at the time of the previous computation and at the time of the present computation and taking the difference between the lithium amounts $\theta_2$.

In S1002, the lithium amount $\theta_{Si}{}'$ $(=\theta_{Si}{}^r)$ that is changed from the lithium amount $\theta_{Si}$ $(=\theta_{Si}{}^{r-\Delta t})$ of the silicon particle 21 at the time of the previous computation by a minute amount is calculated. The minute amount is set to a sufficiently small amount such that the Tayler expansion can be subjected to the silicon potential $V_{Si}$ around the lithium amount $\theta_{Si}{}'$ (see Expression (62) described above).

In S1003, the ECU 100 calculates the silicon open circuit potential $U_{Si\_sta}$ as the open circuit potential of the silicon particle 21 when the surface stress $\sigma_{surf}=0$. In more detail, the ECU 100 calculates the silicon open circuit potential $U_{Si\_sta}$ corresponding to the lithium amount $\theta_{Si}{}'$ calculated in S1001 by referring to a map (not shown) specifying the correspondence relationship between the lithium amount $\theta_{Si}$ of the silicon particle 21 and the silicon open circuit potential $U_{Si\_sta}$.

In S1004, the ECU 100 executes the surface stress calculation processing to calculate the surface stress $\sigma_{surf}$ of the silicon particle 21. As described above, the surface stress calculation processing is in common with the surface stress calculation processing (see FIG. 19) in Embodiment 2.

In S1005, the ECU 100 calculates the amount of change in open circuit potential $\Delta V_{stress}$ $(=\sigma_{surf}\Omega/F)$ based on a calculation result (the surface stress $\sigma_{surf}$ of the silicon particle 21) of the surface stress calculation processing (see Expression (58) described above).

In S1006, the ECU 100 calculates the silicon open circuit potential $U_{Si}$ by adding the amount of change in open circuit potential $\Delta V_{stress}$ to the silicon open circuit potential $U_{Si\_sta}$ (a calculation result in the processing of S1003) (see Expression (59) described above).

In S1007, the ECU 100 calculates a partial differential $\partial U_{Si}/\partial \theta_{Si}$ of the silicon open circuit potential $U_{Si}$ with the silicon amount $\theta_{Si}=\theta_{Si}{}'$. A value of the calculated partial differential is used in a second term of a denominator of Expression (75).

In S1008, similarly to the processing of S1001, the ECU 100 calculates a silicon amount $\theta_{gra}{}'$ that is changed from the lithium amount $\theta_{gra}$ of the graphite particle 22 at the time of the previous computation by a minute amount.

In S1009, the ECU 100 calculates the graphite open circuit potential $U_{gra}$ based on the lithium amount $\theta_{gra}$ of the graphite particle 22 calculated in S1007. A map (not shown) prepared in advance is used in the calculation.

In S1010, similarly to the processing of S1006, the ECU 100 calculates a partial differential $\partial U_{gra}/\partial \theta_{gra}$ of the graphite open circuit potential $U_{gra}$ with the silicon amount $\theta_{gra}=\theta_{gra}{}'$. A value of the calculated partial differential is used in first terms of a numerator and the denominator of Expression (75).

In S1011, the ECU 100 calculates the amount of change in lithium $\Delta\theta_{Si}$ based on Expression (75) described above. Specifically, the amount of change in lithium $\Delta\theta_2$ of the mixed negative electrode particle calculated in S1001, the partial differential $\partial U_{Si}/\partial \theta_{Si}$ of the silicon open circuit potential $U_{Si}$ calculated in S1007, and the partial differential $\partial U_{gra}/\partial \theta_{gra}$ of the graphite open circuit potential $U_{gra}$ calculated in S1010 are substituted in Expression (75), whereby the amount of change in lithium $\Delta\theta_{Si}$ is calculated.

As described above, according to Embodiment 3, as in Embodiments 1 and 2, the surface stress $\sigma_{surf}$ is calculated through the surface stress calculation processing (S1004), and the amount of change in open circuit potential $\Delta V_{stress}$ of the silicon particle 21 is calculated based on the surface stress $\sigma_{surf}$ (S1005). In this way, the silicon open circuit potential $U_{Si}$ is calculated taking into consideration the influence of the hysteresis due to the surface stress $\sigma_{surf}$, whereby it is possible to improve the calculation accuracy of the silicon open circuit potential $U_{Si}$, and as a result, to improve the estimation accuracy of the SOC of the battery 4.

In Embodiment 3, Expression (75) is derived by expression modification using the product $(c_{Si,max} \times c_{gra,max})$ of the limit lithium concentrations under a condition that the silicon potential $V_{Si}$ (see Expression (63) described above) subjected to approximation (that is, linear approximation), in which terms of a second order and higher are neglected after the Tayler expansion, and the graphite potential $V_{gra}$ subjected to the same approximation are equal to each other (see Expression (68) described above). The values are substituted in the terms of Expression (75), whereby convergence computation is not needed, and the amount of change in lithium $\Delta\theta_{Si}$ can be calculated through simple multiplication and division. Therefore, according to Embodiment 3, it is possible to further reduce the computation load and amount of memory of the ECU 100 compared to the lithium amount calculation processing in Embodiment 2.

The lithium precipitation suppression control described in Modification Example 2 of Embodiment 1 may be combined with the potential calculation processing in Embodiment 2 or may be combined with the potential calculation processing in Embodiment 3. That is, the negative electrode potential $V_2$ may be calculated by a method in which the three-particle model in Embodiment 1 is more simplified, and allowable charging electric power $I_{win}$ may be calculated according to the calculated negative electrode potential $V_2$ according to the flowchart shown in FIG. 19.

In Embodiments 1 to 3 (and Modification Examples 1 and 2 of Embodiment 1), an example where the silicon-based material is used as the negative electrode active substance having a large amount of change in volume with charging and discharging is large has been described. However, the negative electrode active substance having a large amount of change in volume with charging and discharging is not limited thereto. In the specification, "the negative electrode active substance having a large amount of change in volume" means a material having a large amount of change in volume compared to an amount of change in volume (about 10%) of graphite with charging and discharging. As such a negative electrode material of the lithium-ion secondary battery, a tin-based compound (Sn, SnO, or the like), a germanium (Ge)-based compound, or a lead (Pb)-based compound is exemplified. The lithium-ion secondary battery is not limited to a liquid system, and may be a polymer system or an all-solid system.

The secondary battery to which the above-described potential calculation processing is applicable is not limited to the lithium-ion secondary battery, and may be other secondary batteries (for example, a nickel-hydrogen battery).

The embodiment disclosed herein is to be considered merely illustrative and not restrictive in all respects. The scope of the present disclosure is defined by the terms of the claims, rather than the above description of the embodiment, and is intended to include any modifications within the scope and meaning equivalent to the terms of the claims.

What is claimed is:

1. A secondary battery system comprising:
a secondary battery having a positive electrode including a positive electrode active substance and a negative electrode including first and second negative electrode active substances; and
a control device configured to estimate an internal state of the secondary battery based on an active substance model of the secondary battery, wherein:
an amount of change in volume of the first negative electrode active substance with change in charge carrier amount in the first negative electrode active substance is greater than an amount of change in volume of the second negative electrode active substance with change in charge carrier amount in the second negative electrode active substance;
the control device is configured to, under a condition that the first negative electrode active substance and the second negative electrode active substance are at the same potential, calculate a charge carrier amount in the first negative electrode active substance based on a first active substance model;
the control device is configured to calculate an amount of change in an open circuit potential of the first negative electrode active substance based on surface stress of the first negative electrode active substance to be determined according to the charge carrier amount in the first negative electrode active substance;
the control device is configured to calculate an open circuit potential of the negative electrode from the open circuit potential of the first negative electrode active substance and the amount of change in open circuit potential of the first negative electrode active substance in a state in which surface stress is not generated in the first negative electrode active substance;
the control device is configured to control charging and discharging of the secondary battery according to a result of a control device calculation based on the open circuit potential of the negative electrode;
the control device is configured to, under a condition that the first negative electrode active substance and the second negative electrode active substance are at the same potential, separately calculate a current flowing in the first negative electrode active substance and a current flowing in the second negative electrode active substance through convergence computation processing such that a predetermined convergence condition is established;
the control device is configured to calculate a concentration distribution of charge carriers in the first negative electrode active substance and the second negative electrode active substance by solving a diffusion equation under a boundary condition relating to the current flowing in the first negative electrode active substance and the second negative electrode active substance; and
the control device is configured to calculate the charge carrier amount in the first negative electrode active substance and the second negative electrode active substance from the concentration distribution of the charge carriers in the first negative electrode active substance and the second negative electrode active substance.

2. The secondary battery system according to claim 1, further comprising a voltage sensor configured to detect a voltage between the positive electrode and the negative electrode, wherein:
the control device is configured to calculate a concentration distribution of charge carriers in the positive electrode active substance by solving a diffusion equation under a boundary condition relating to a current flowing in the positive electrode active substance;
the control device is configured to calculate a charge carrier amount in the positive electrode active substance from the concentration distribution of the charge carriers in the positive electrode active substance;
the control device is configured to calculate a potential of the positive electrode based on an open circuit potential of the positive electrode active substance to be determined according to the charge carrier amount in the positive electrode active substance;
the control device is configured to calculate a potential of the negative electrode based on the open circuit potential of the negative electrode; and
the control device is configured to calculate the current flowing in the first negative electrode active substance with a condition that a potential difference between the potential of the positive electrode and the potential of the negative electrode coincides with the voltage detected by the voltage sensor as the convergence condition.

3. The secondary battery system according to claim 1, wherein:
the control device is configured to divide the current flowing in the first negative electrode active substance into a reaction current involved in insertion and desorption of the charge carriers and a capacitor current uninvolved in insertion and desorption of the charge carriers, and calculate a reaction overvoltage of the first negative electrode active substance by substituting the reaction current in a Butler-Volmer's relational expression; and
the control device is configured to calculate the potential of the negative electrode from the open circuit potential of the negative electrode and the reaction overvoltage of the first negative electrode active substance.

4. The secondary battery system according to claim 1, wherein:
the control device is configured to calculate a total amount of charge carriers in the first and second negative electrode active substances from a charge carrier amount in the positive electrode active substance according to a relational expression in which a relationship to be established between the charge carrier amount in the positive electrode active substance and the total amount of the charge carriers in the first and second negative electrode active substances is defined using a capacity ratio of a capacity of the positive electrode to a capacity of the negative electrode; and
the control device is configured to calculate the charge carrier amount in the first negative electrode active substance and the second negative electrode active substance using a charge amount conservation law to be established between an amount of temporal change of the total amount of the charge carriers in the first and second negative electrode active substances and a current flowing in the positive electrode active substance.

5. The secondary battery system according to claim 1, wherein:
the control device is configured to calculate a total amount of charge carriers in the first and second negative electrode active substances from a charge carrier amount in the positive electrode active substance according to a relational expression in which a relationship to be established between the charge carrier amount in the positive electrode active substance and the total amount of the charge carriers in the first and second negative electrode active substances is defined using a capacity ratio of a capacity of the positive electrode to a capacity of the negative electrode; and
the control device is configured to calculate the charge carrier amount in the first negative electrode active substance and the second negative electrode active substance from an amount of temporal change in the total amount of the charge carriers in the first and second negative electrode active substances according to a predetermined relational expression approximating that a potential of the first negative electrode active substance changes linearly with the change in the charge carrier amount in the first negative electrode active substance and approximating that a potential of the second negative electrode active substance changes linearly with the change in the charge carrier amount in the second negative electrode active substance.

6. The secondary battery system according to claim 1, wherein:
the secondary battery is a lithium-ion secondary battery; and
the control device is configured to, in a case where a potential of the negative electrode to be calculated from the open circuit potential of the negative electrode falls below a predetermined potential higher than a potential of metallic lithium, charge electric power to the secondary battery less than in a case where the potential of the negative electrode exceeds the predetermined potential.

7. The secondary battery system according to claim 1, wherein:
the first negative electrode active substance is a silicon-based material; and
the second negative electrode active substance is a carbon-based material.

8. A method of estimating an internal state of a secondary battery, the secondary battery having a positive electrode including a positive electrode active substance and a negative electrode including first and second negative electrode active substances, an amount of change in volume of the first negative electrode active substance with change in charge carrier amount in the first negative electrode active substance being greater than an amount of change in volume of the second negative electrode active substance with change in charge carrier amount in the second negative electrode active substance, and the method being a method of estimating the internal state of the secondary battery based on an active substance model, the method comprising:
under a condition that the first negative electrode active substance and the second negative electrode active substance are at the same potential, calculating a charge carrier amount in the first negative electrode active substance based on a first active substance model;
calculating an amount of change in an open circuit potential of the first negative electrode active substance based on surface stress of the first negative electrode active substance to be determined according to the charge carrier amount in the first negative electrode active substance;
calculating an open circuit potential of the negative electrode from the open circuit potential of the first negative electrode active substance and the amount of change in open circuit potential of the first negative electrode active substance in a state in which surface stress is not generated in the first negative electrode active substance;
controlling charging and discharging of the secondary battery according to a result of a control device calculation based on the open circuit potential of the negative electrode,
under a condition that the first negative electrode active substance and the second negative electrode active substance are at the same potential, separately calculating a current flowing in the first negative electrode active substance and a current flowing in the second negative electrode active substance through convergence computation processing such that a predetermined convergence condition is established;
calculating a concentration distribution of charge carriers in the first negative electrode active substance and the second negative electrode active substance by solving a diffusion equation under a boundary condition relating to the current flowing in the first negative electrode active substance and the second negative electrode active substance; and calculating the charge carrier amount in the first negative electrode active substance and the second negative electrode active substance from the concentration distribution of the charge carriers in the first negative electrode active substance and the second negative electrode active sub stance.

* * * * *